US011461061B2

(12) United States Patent
Hada et al.

(10) Patent No.: US 11,461,061 B2
(45) Date of Patent: Oct. 4, 2022

(54) COMMUNICATION SYSTEM, COMMUNICATION APPARATUS, AND CONTROL METHOD USING WIRELESS COMMUNICATION

(71) Applicant: CANON KABUSHIKI KAISHA, Tokyo (JP)

(72) Inventors: Manabu Hada, Tokyo (JP); Tsunahito Nakashita, Chiba (JP); Motoki Koshigaya, Saitama (JP); Koichi Ito, Tokyo (JP); Tatsuya Ogawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/122,617

(22) Filed: Dec. 15, 2020

(65) Prior Publication Data
US 2021/0191674 A1    Jun. 24, 2021

(30) Foreign Application Priority Data

Dec. 23, 2019 (JP) .............................. JP2019-232163
Dec. 26, 2019 (JP) .............................. JP2019-236838
Oct. 5, 2020 (JP) .............................. JP2020-168733

(51) Int. Cl.
*G06F 3/12* (2006.01)
*H04N 1/327* (2006.01)
(Continued)

(52) U.S. Cl.
CPC .......... *G06F 3/1236* (2013.01); *G06F 3/1209* (2013.01); *H04N 1/00395* (2013.01);
(Continued)

(58) Field of Classification Search
CPC .... G06F 3/1236; G06F 3/1209; G06F 3/1292; H04N 1/00395; H04N 1/32765; H04W 76/14; H04W 4/80
(Continued)

(56) References Cited

U.S. PATENT DOCUMENTS 10,090,886 B1 * 10/2018 Bell .................... H02J 50/10
10,791,536 B1 * 9/2020 Murphy ............... G01S 5/0072
(Continued)

FOREIGN PATENT DOCUMENTS

JP    2009-260781 A    11/2009
JP    2013-080123 A    5/2013
(Continued)

*Primary Examiner* — Allen H Nguyen
(74) *Attorney, Agent, or Firm* — Canon U.S.A., Inc. IP Division

(57) ABSTRACT

In a communication system including a communication apparatus and a communication terminal which are able to perform wireless communication with each other, the communication apparatus includes a first wireless communication interface conforming to a Bluetooth standard and including a plurality of antennas, and the communication terminal includes a second wireless communication interface conforming to the Bluetooth standard and one or more controllers configured to acquire angle information and radio field intensity information based on a result of a plurality of radio waves respectively emitted from the plurality of antennas having been received by the second wireless communication interface, and, in response to the angle information and the radio field intensity information having satisfied a predetermined condition, transmit a request for establishment of wireless communication conforming to the Bluetooth standard to the first wireless communication interface via the second wireless communication interface.

20 Claims, 29 Drawing Sheets

(51) Int. Cl.
  *H04W 4/80*    (2018.01)
  *H04N 1/00*    (2006.01)
  *H04W 76/14*   (2018.01)
(52) U.S. Cl.
  CPC .......... *H04N 1/32765* (2013.01); *H04W 4/80* (2018.02); *H04W 76/14* (2018.02); *G06F 3/1292* (2013.01)
(58) Field of Classification Search
  USPC ..................................................... 358/1.13
  See application file for complete search history.

(56) References Cited

U.S. PATENT DOCUMENTS

| | | | | |
|---|---|---|---|---|
| 2015/0131486 | A1* | 5/2015 | Suzuki | H04L 67/12 |
| | | | | 370/254 |
| 2016/0191739 | A1* | 6/2016 | Kanzawa | G06K 9/6284 |
| | | | | 358/1.13 |
| 2017/0155794 | A1* | 6/2017 | Sei | H04N 1/00973 |
| 2018/0176776 | A1* | 6/2018 | Knaappila | H04W 12/06 |
| 2020/0162633 | A1* | 5/2020 | Ikeda | H04W 8/005 |
| 2020/0212985 | A1* | 7/2020 | Lin | H04B 7/0671 |
| 2020/0293250 | A1* | 9/2020 | Takahashi | G06F 3/1255 |
| 2020/0329052 | A1* | 10/2020 | Goyal | H04L 9/0631 |
| 2020/0388138 | A1* | 12/2020 | Miller | B01D 35/143 |
| 2020/0404357 | A1* | 12/2020 | Kulkarni | G06K 19/07709 |

FOREIGN PATENT DOCUMENTS

| | | |
|---|---|---|
| JP | 2017-040552 A | 2/2017 |
| JP | 2017-173189 A | 9/2017 |

\* cited by examiner

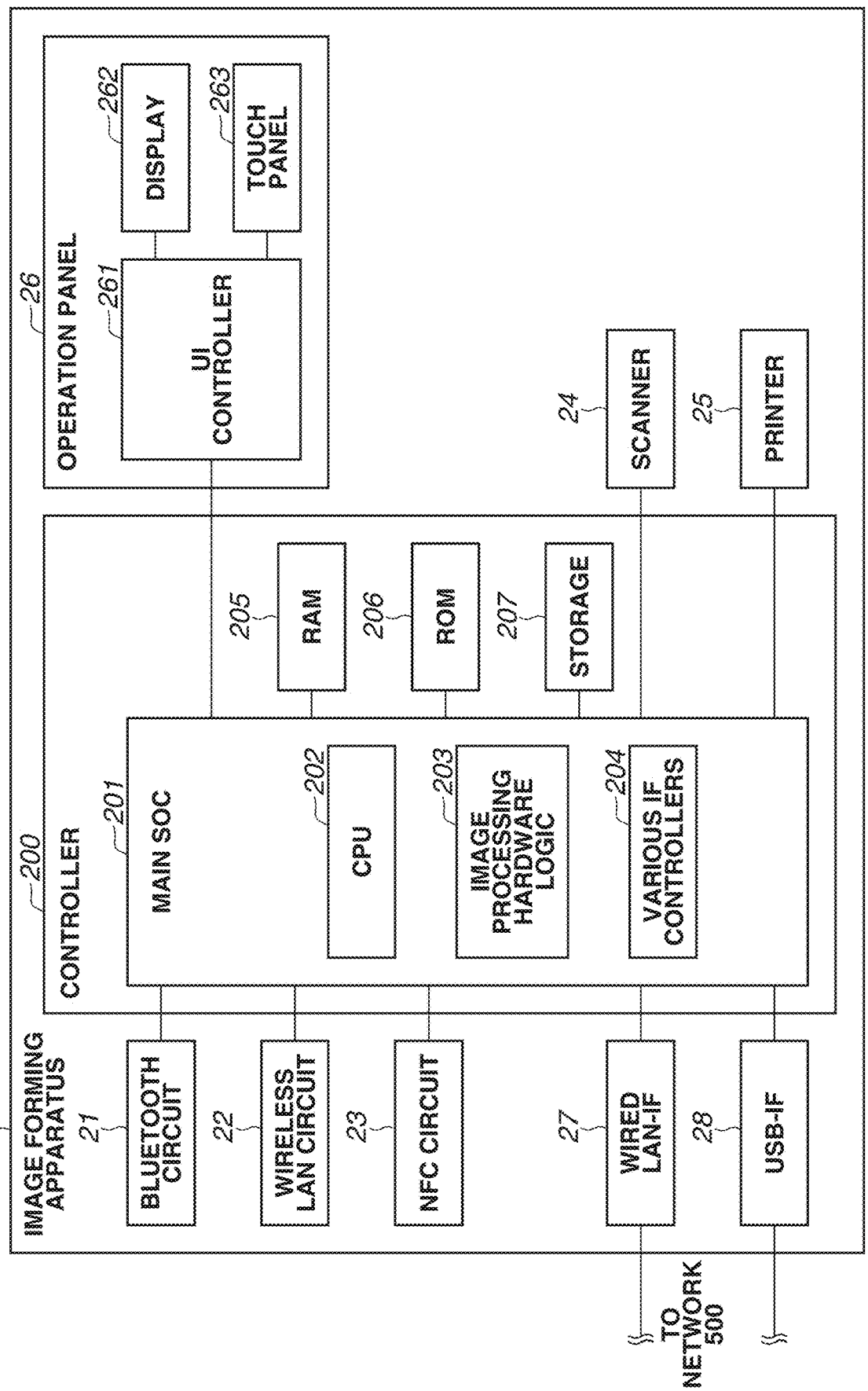

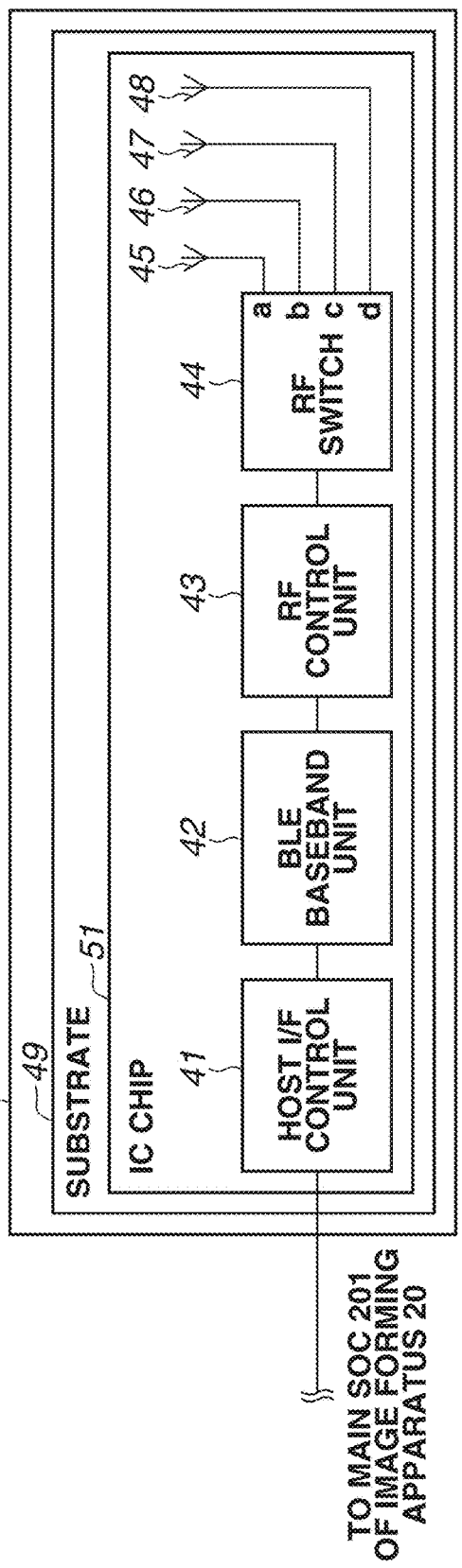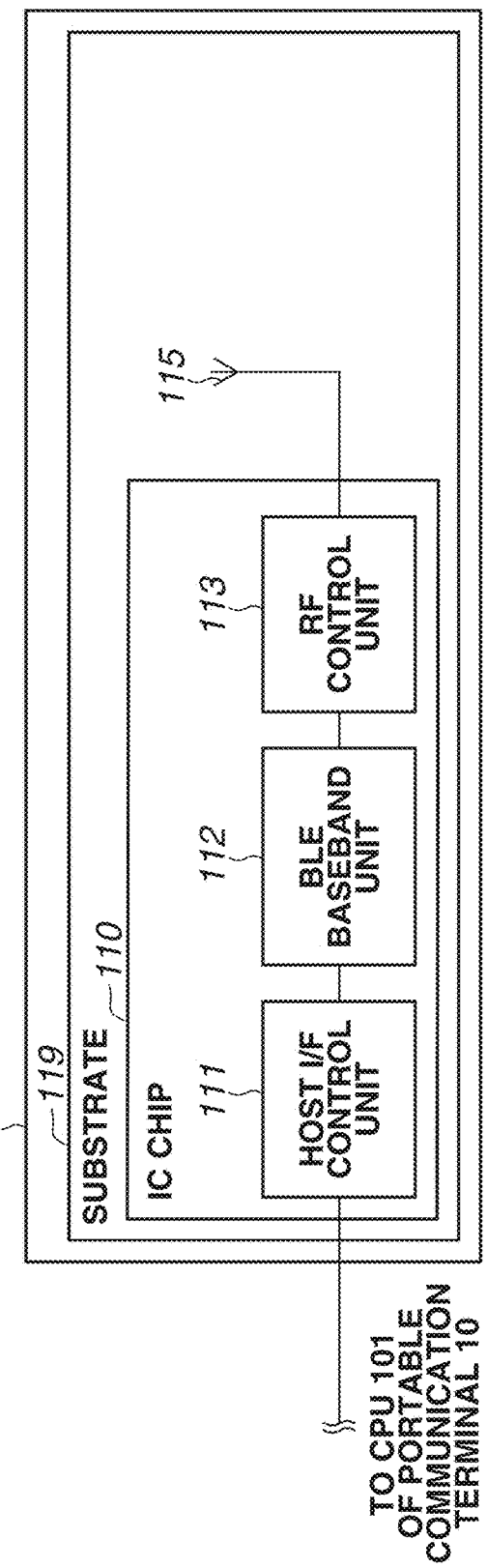

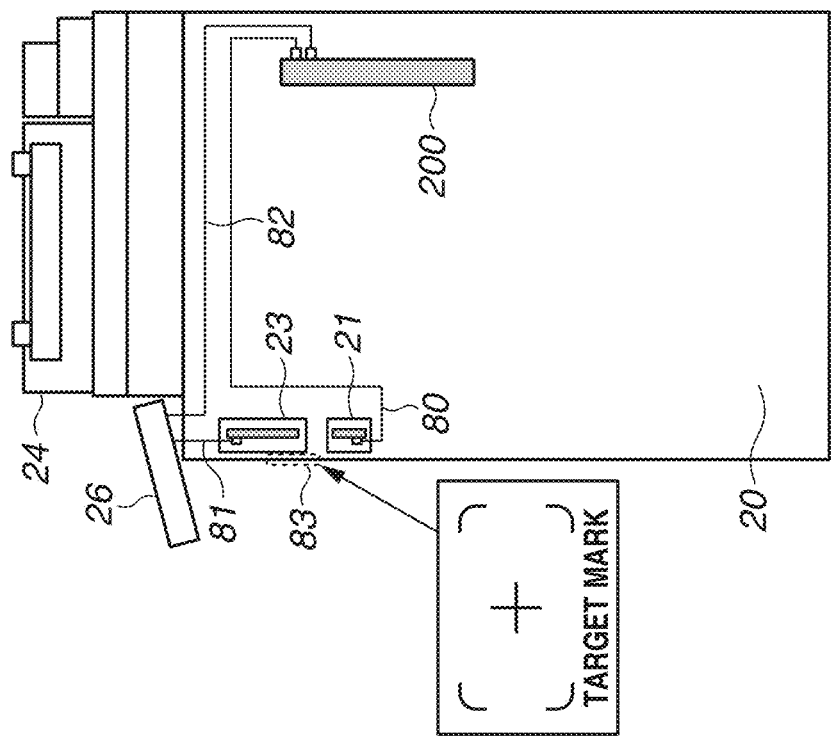
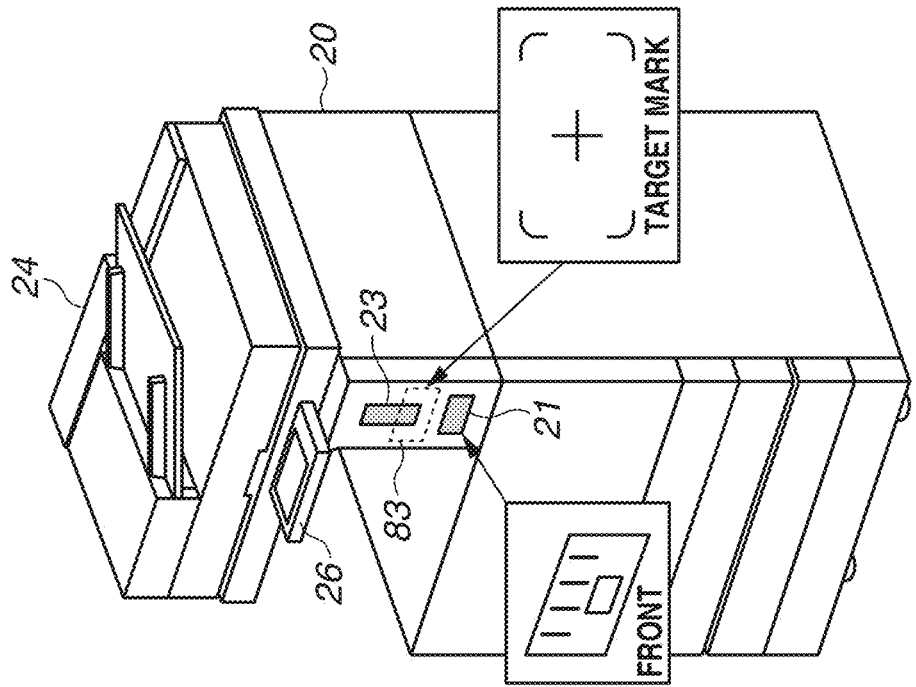

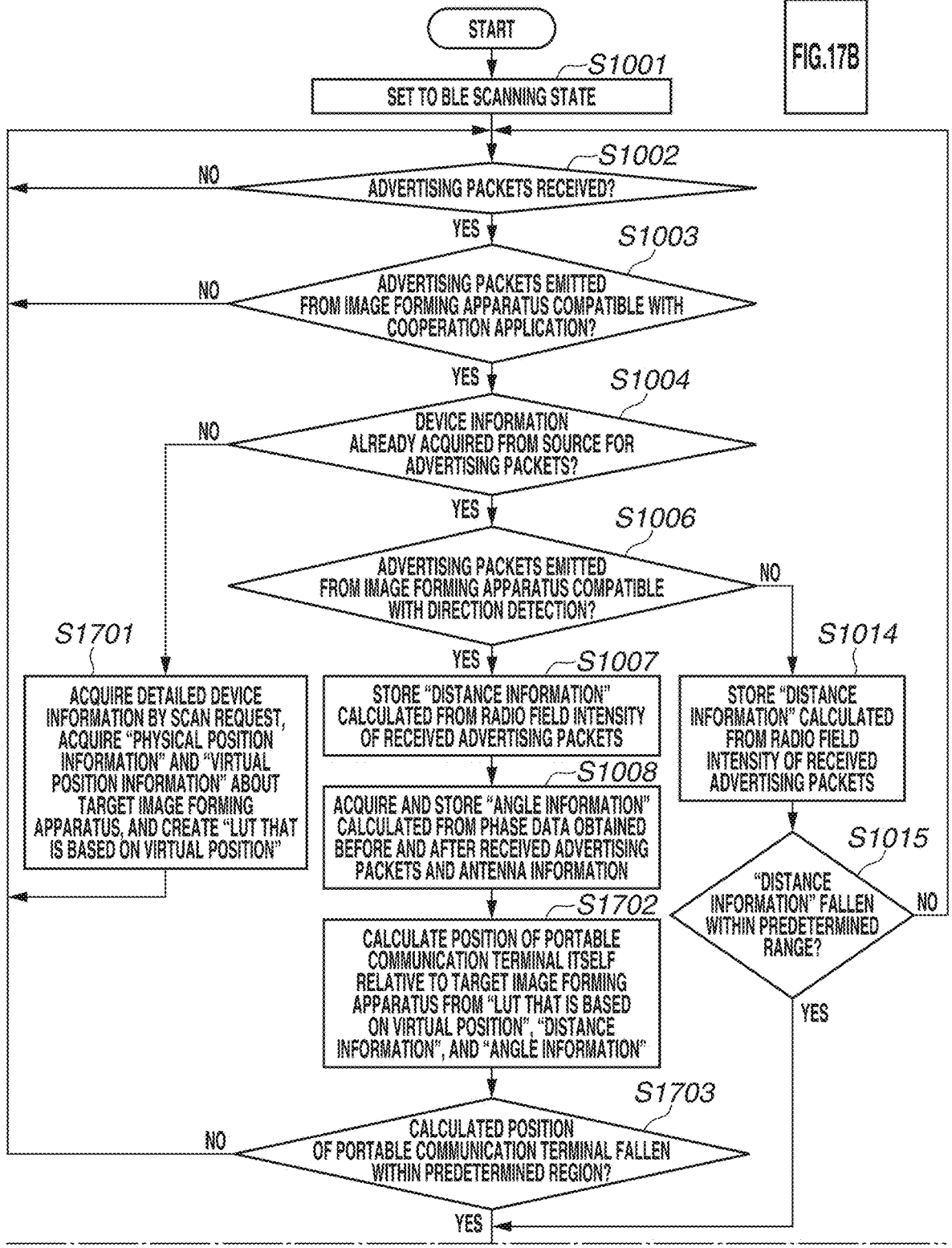

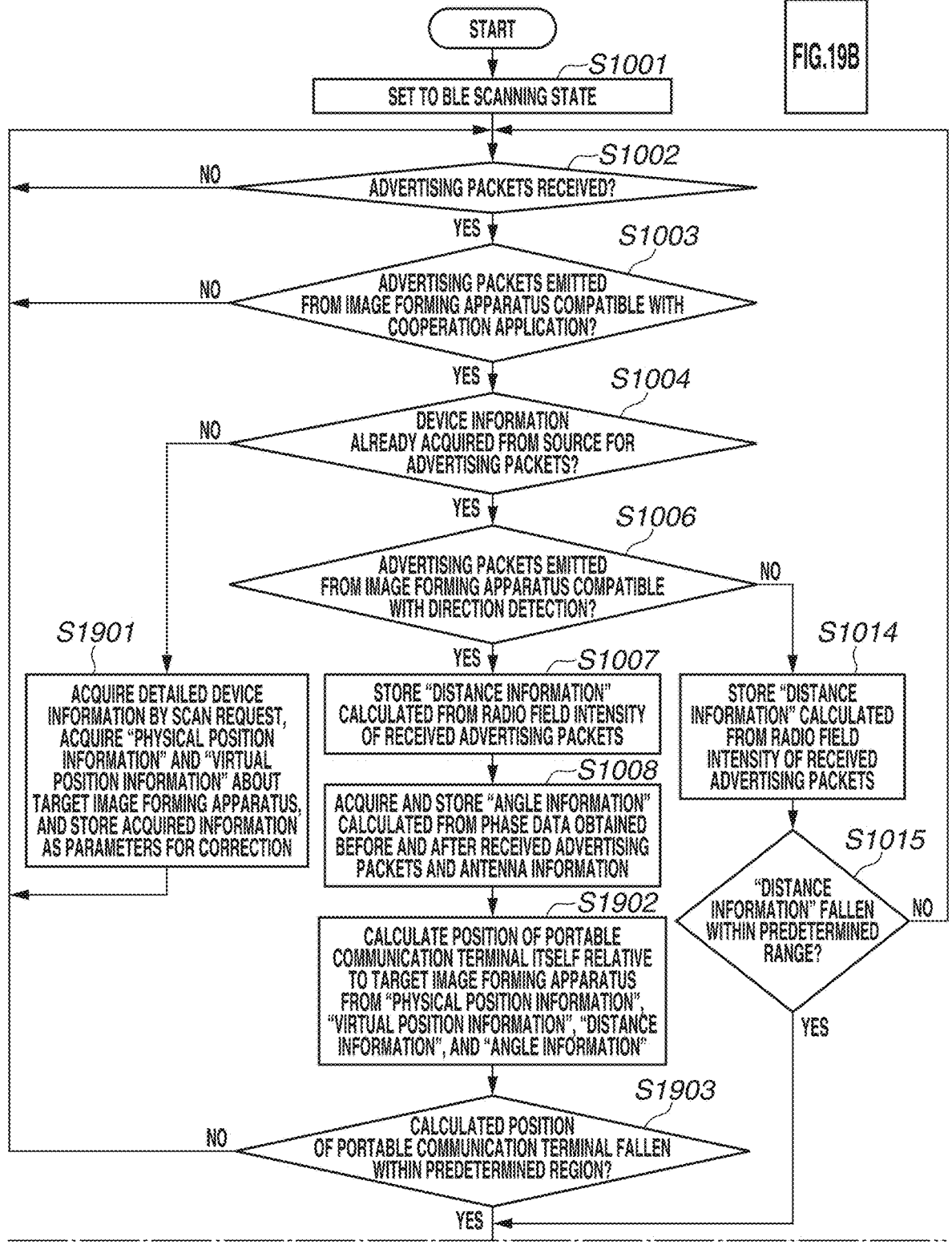

< In the case of $0° \leq \theta < 90°$ >

$R' = \sqrt{R^2 + c^2 - 2*R*c*\cos(90°-\theta+B)}$ $\theta' = \arcsin\left(\dfrac{R*\sin\theta - a}{\sqrt{R^2 + c^2 - 2*R*c*\cos(90°-\theta+B)}}\right)$ < In the case of $90° \leq \theta \leq 180°$ >

$R' = \sqrt{R^2 + c^2 - 2*R*c*\cos(B-\theta+90°)}$ $\theta' = \arcsin\left(\dfrac{R*\cos(\theta-90°) - a}{\sqrt{R^2 + c^2 - 2*R*c*\cos(B-\theta+90°)}}\right)$ (In the *case of $0° \leq \theta < 90°$)
$R*\cos(\theta) \leq 100$ cm
and
$R*\sin(\theta) \leq 70$ cm (In the *case of $90° \leq \theta \leq 180°$)
$R*\cos(180°-\theta) \leq 25$ cm
and
$R*\sin(180°-\theta) \leq 70$ cm

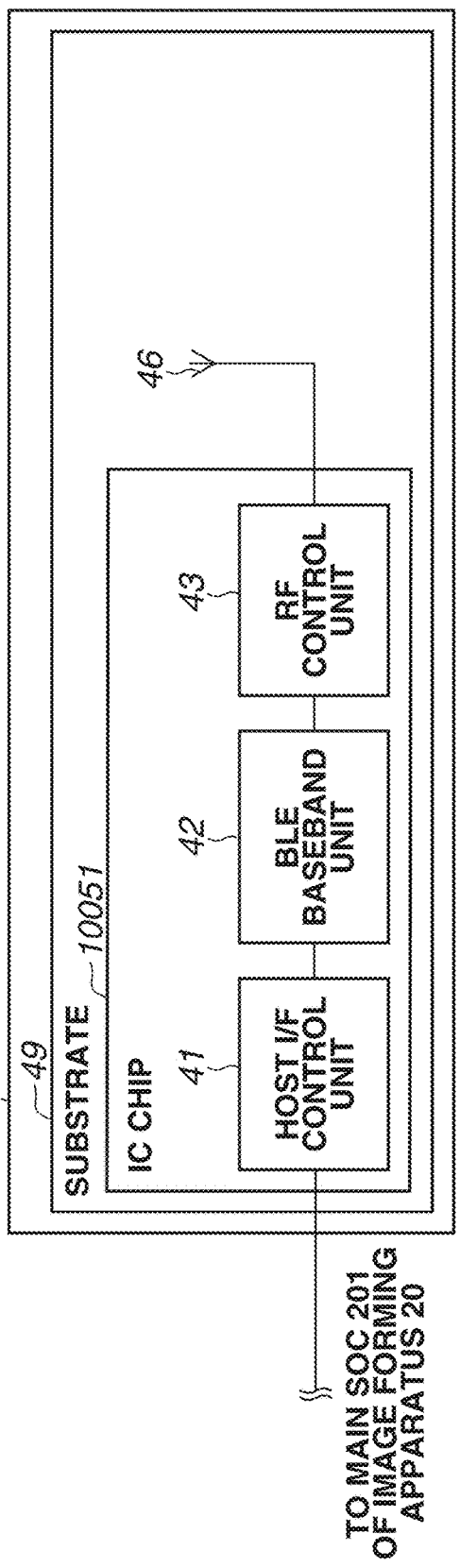
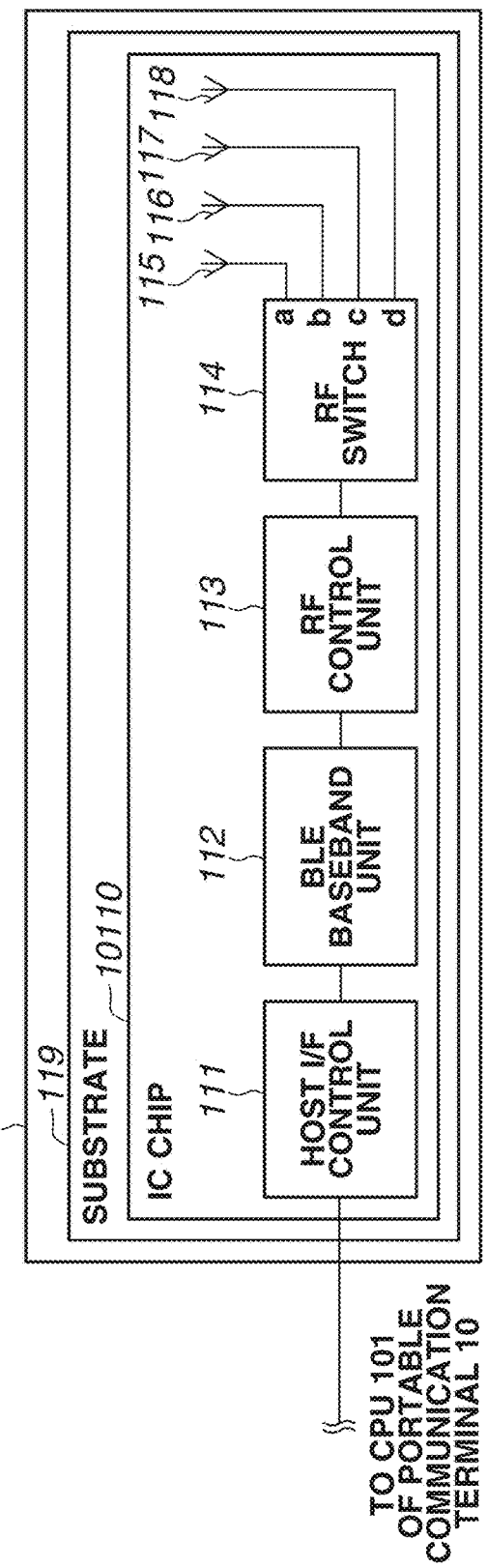

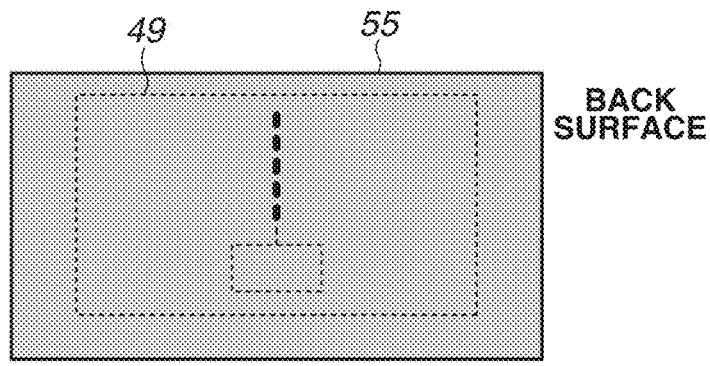
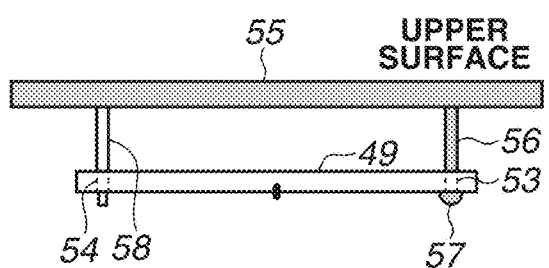
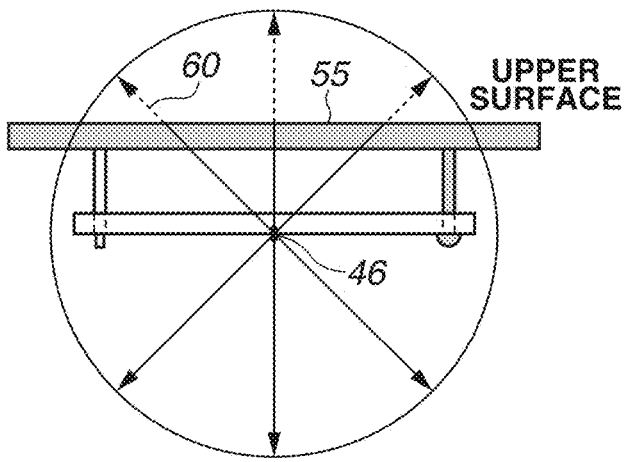
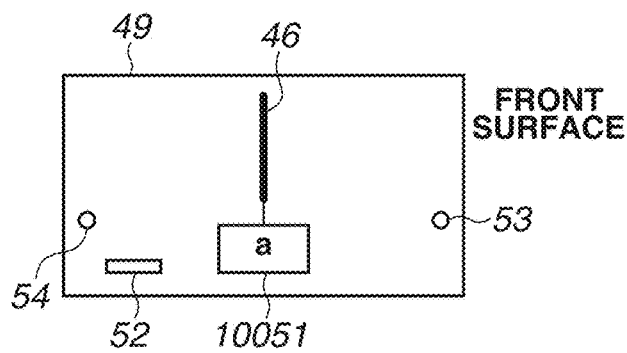

COMMUNICATION SYSTEM, COMMUNICATION APPARATUS, AND CONTROL METHOD USING WIRELESS COMMUNICATION

BACKGROUND

Field of the Disclosure

Aspects of the present disclosure generally relate to a communication apparatus capable of performing wireless communication with a terminal such as a portable communication terminal. The communication apparatus is able to be used for office equipment, such as a printer, a scanner, a facsimile (FAX) machine, a copying machine, and a multifunction peripheral acting as a combination of some or all of these machines and, additionally, a general-purpose information processing apparatus such as a personal computer (PC).

Description of the Related Art

In recent years, portable communication terminals, such as smartphones and tablet terminals, have been growing in use for business purposes. Alongside this, even in office equipment (information processing apparatuses) including printers (image forming apparatuses), an expansion of the function of cooperating with portable communication terminals is being required.

Examples of such a cooperative function include the function of performing cooperation using Bluetooth® communication, particularly, Bluetooth Low Energy (hereinafter referred to as "BLE"). Here, BLE is one of the Bluetooth standards, and is a standard for close-range wireless communication intended to provide reduced power consumption compared to Classic Bluetooth.

Japanese Patent Application Laid-Open No. 2017-173189 discusses a system which identifies a distance between an image forming apparatus and a portable communication terminal (external apparatus) with use of the radio field intensity of a BLE beacon signal which the image forming apparatus emits, and, in a case where the identified distance is sufficiently small, determines that the image forming apparatus and the portable communication terminal are apparatuses which ought to cooperate with each other and starts communications directed to cooperation.

The system discussed in Japanese Patent Application Laid-Open No. 2017-173189 has room for improvement in a method for determining apparatuses which are to cooperate with each other. This is because the system discussed in Japanese Patent Application Laid-Open No. 2017-173189 uses only information about a distance between the two apparatuses in determining apparatuses which are to cooperate with each other and, therefore, may cause apparatuses which are close in distance but ought not to cooperate with each other to inadvertently cooperate with each other. For example, in the system discussed in Japanese Patent Application Laid-Open No. 2017-173189, suppose that a distance available for cooperation has been determined in such a way as to enable an image forming apparatus to cooperate with a portable communication terminal which has come close to the front side of the image forming apparatus. In this case, the image forming apparatus may start to cooperate with even a portable communication terminal which is situated facing the back side or lateral side of the image forming apparatus as long as the portable communication terminal is present within the range of the determined distance. Therefore, cooperation may start when a user who carries the portable communication terminal has only tried to pass by the back side or lateral side of the image forming apparatus.

SUMMARY

Aspects of the present disclosure are generally directed to providing or reducing a communication system capable of preventing the occurrence of a situation in which a communication terminal and a communication apparatus may cooperate with each other via wireless communication in error. Particularly, aspects of the present disclosure are directed to providing a communication system capable of preventing or reducing the occurrence of a situation in which, in the case of performing cooperation via Bluetooth wireless communication with use of information about a distance between a communication terminal and a communication apparatus, the communication terminal and the communication apparatus may cooperate with each other in error.

According to embodiments of the present disclosure, a communication system includes a communication apparatus and a communication terminal which are able to perform wireless communication with each other, in which the communication apparatus includes a first wireless communication interface conforming to a Bluetooth standard and including a plurality of antennas, and in which the communication terminal includes a second wireless communication interface conforming to the Bluetooth standard and one or more controllers configured to acquire angle information and radio field intensity information based on a result of a plurality of radio waves respectively emitted from the plurality of antennas having been received by the second wireless communication interface, and, in response to the angle information and the radio field intensity information having satisfied a predetermined condition, transmit a request for establishment of wireless communication conforming to the Bluetooth standard to the first wireless communication interface via the second wireless communication interface.

Further features of the present disclosure will become apparent from the following description of exemplary embodiments with reference to the attached drawings.

BRIEF DESCRIPTION OF THE DRAWINGS

FIG. 3 is a diagram illustrating a hardware configuration of an image forming apparatus.

FIG. 4A is a diagram illustrating a configuration of a Bluetooth circuit included in the image forming apparatus. FIG. 4B is a diagram illustrating a configuration of a Bluetooth circuit included in the portable communication terminal.

FIG. 8A is a diagram illustrating an image forming apparatus in a first exemplary embodiment as viewed from diagonally forward right. FIG. 8B is a diagram illustrating the image forming apparatus in the first exemplary embodiment as viewed from right lateral side.

FIG. 23A is a diagram illustrating a configuration of a Bluetooth circuit included in the image forming apparatus. FIG. 23B is a diagram illustrating a configuration of a Bluetooth circuit included in the portable communication terminal.

FIG. 24A is a diagram illustrating the front surface of a Bluetooth circuit board. FIG. 24B is a diagram illustrating the upper surface of the Bluetooth circuit board. FIG. 24C is a diagram illustrating the back surface of the Bluetooth circuit board. FIG. 24D is a diagram used to explain a relationship between radio waves and a shield.

DESCRIPTION OF THE EMBODIMENTS

Various exemplary embodiments, features, and aspects of the disclosure will be described in detail below with reference to the drawings. Furthermore, configurations used to implement the present disclosure are not limited to only the configurations which are described in the following description. A part of the described configurations can be omitted or replaced with an equivalent thereof within a range in which similar advantageous effects are able to be attained.

In a first exemplary embodiment, a configuration in which an angle of emission (angle of departure (AoD)) method is employed to calculate a relative positional relationship between an image forming apparatus and a portable communication terminal is described. More specifically, a configuration in which a plurality of radio waves emitted from a plurality of antennas is received by one antenna of a portable communication terminal and the relative positional relationship is calculated based on the received radio waves is described. Particularly, in the first exemplary embodiment, a configuration in which a Bluetooth circuit 21 is mounted on the front surface side of an image forming apparatus 20 and a detection area which is limited in angle and distance around the Bluetooth circuit 21 is used is described.

<System Configuration>

Figure 1:
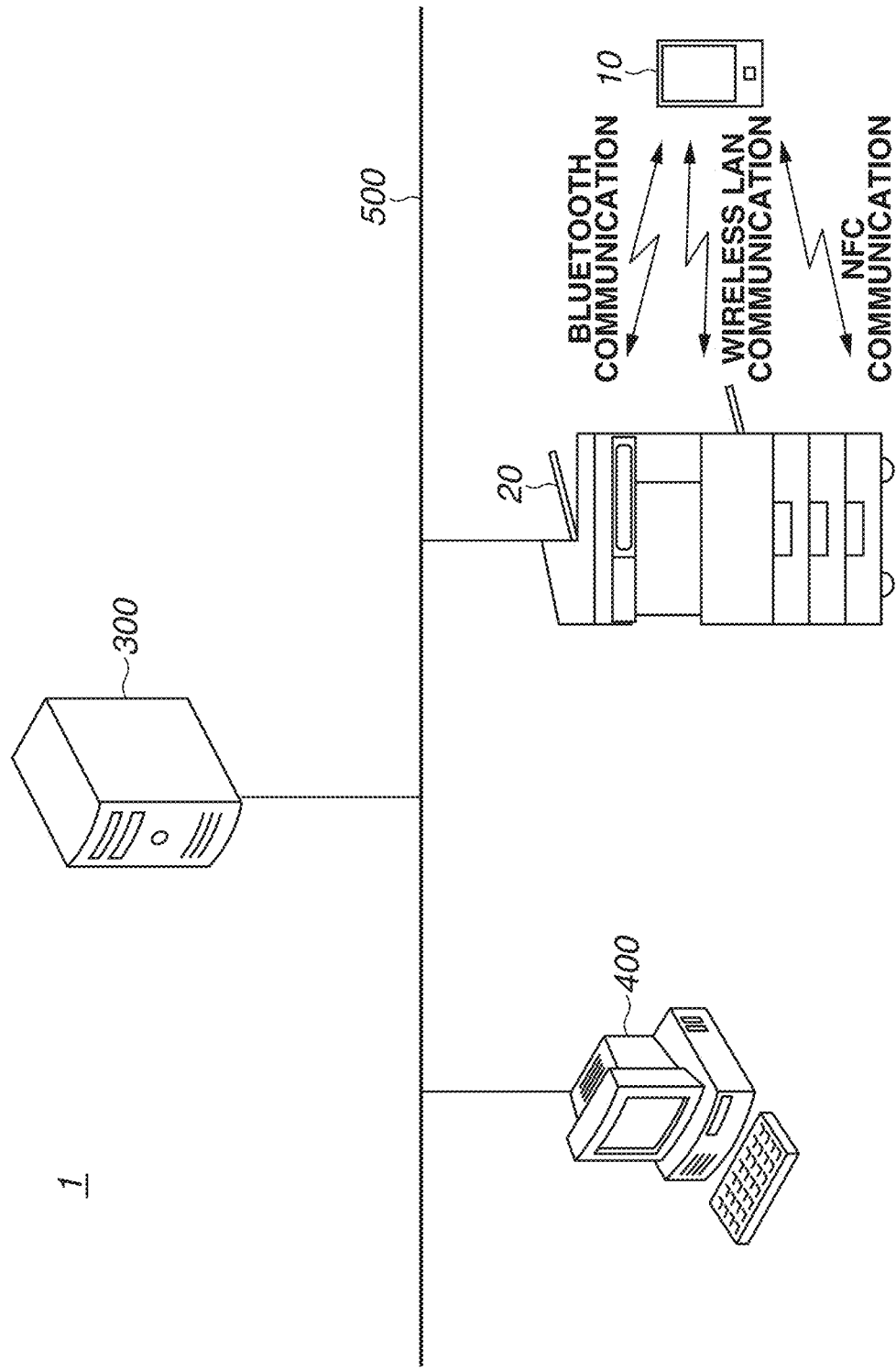
FIG. 1 is a diagram illustrating a configuration of an image processing system.

FIG. 1 is a diagram illustrating a configuration of an image processing system 1. As illustrated in FIG. 1, the image processing system 1 (communication system) includes a portable communication terminal 10, an image forming apparatus 20, a client terminal 400, and a server 300. The image forming apparatus 20, the client terminal 400, and the server 300 are interconnected via a network 500 in such a way as to be able to communicate with each other.

The image forming apparatus 20 is a communication apparatus, such as a multifunction peripheral (MFP) having a plurality of functions including, for example, a copy function, a scan function, a print function, a facsimile (FAX) function, and an e-mail transmission function, a printer having a single function (single-function printer (SFP)), or a scanner. In the image processing system 1 in the first exemplary embodiment, the image forming apparatus 20 is described as a color laser beam multifunction peripheral.

The client terminal 400 is an information processing apparatus, such as a personal computer (PC), which the user uses. The client terminal 400 issues a print job to cause the image forming apparatus 20 to print an electronic file stored in a storage included therein or an external server (not illustrated). Moreover, the client terminal 400 performs reception of image data obtained by the image forming apparatus 20 performing scanning.

The server 300 is an information processing apparatus which provides various network services to image forming apparatuses.

The server 300 provides, for example, a service for storing print data which the image forming apparatus 20 is able to download and print. The server 300 provides, for example, a service for receiving upload of an image read by the image forming apparatus 20 and storing the uploaded image. The server 300 provides, for example, an e-mail service for transmitting an e-mail output from the image forming apparatus 20 to a destination apparatus and transmitting, to the image forming apparatus 20, an e-mail addressed from an external apparatus to the image forming apparatus 20. The server 300 provides, for example, a user authentication service for managing users who use the image forming apparatus 20 with use of, for example, a user identification (ID) or a group ID.

Furthermore, the term "job" refers to a unit of serial image processing (for example, copy, scan, or print) which the image forming apparatus 20 implements using a scanner 24 and a printer 25.

The network 500 is an information communication network including, for example, a local area network (LAN) or a wide area network (WAN).

The portable communication terminal 10 is a communication apparatus, such as a mobile telephone including, for example, a smartphone, a tablet-type personal computer, a notebook-type personal computer, or a personal digital assistant (PDA). The portable communication terminal 10 is able to communicate with the image forming apparatus 20 via, for example, Bluetooth communication, wireless LAN communication, or near field communication (NFC), and has a cooperation function of cooperating with the image forming apparatus 20 using wireless communication. Examples of the cooperation function include an authentication function (login function) of performing an authentication procedure between the portable communication terminal 10 and the image forming apparatus 20 and limiting or canceling the functions of the image forming apparatus 20. Moreover, examples of the cooperation function include a printing function of transmitting, from the portable communication terminal 10, print data to be printed by the image forming apparatus 20. Moreover, examples of the cooperation function include a transmission function of transmitting, to the portable communication terminal 10, an image read by the image forming apparatus 20 from an original. Moreover, examples of the cooperation function include a confirmation function of acquiring and confirming, via the portable communication terminal 10, status information, setting information, and screen information about the image forming apparatus 20.

<Portable Communication Terminal>

Figure 2:
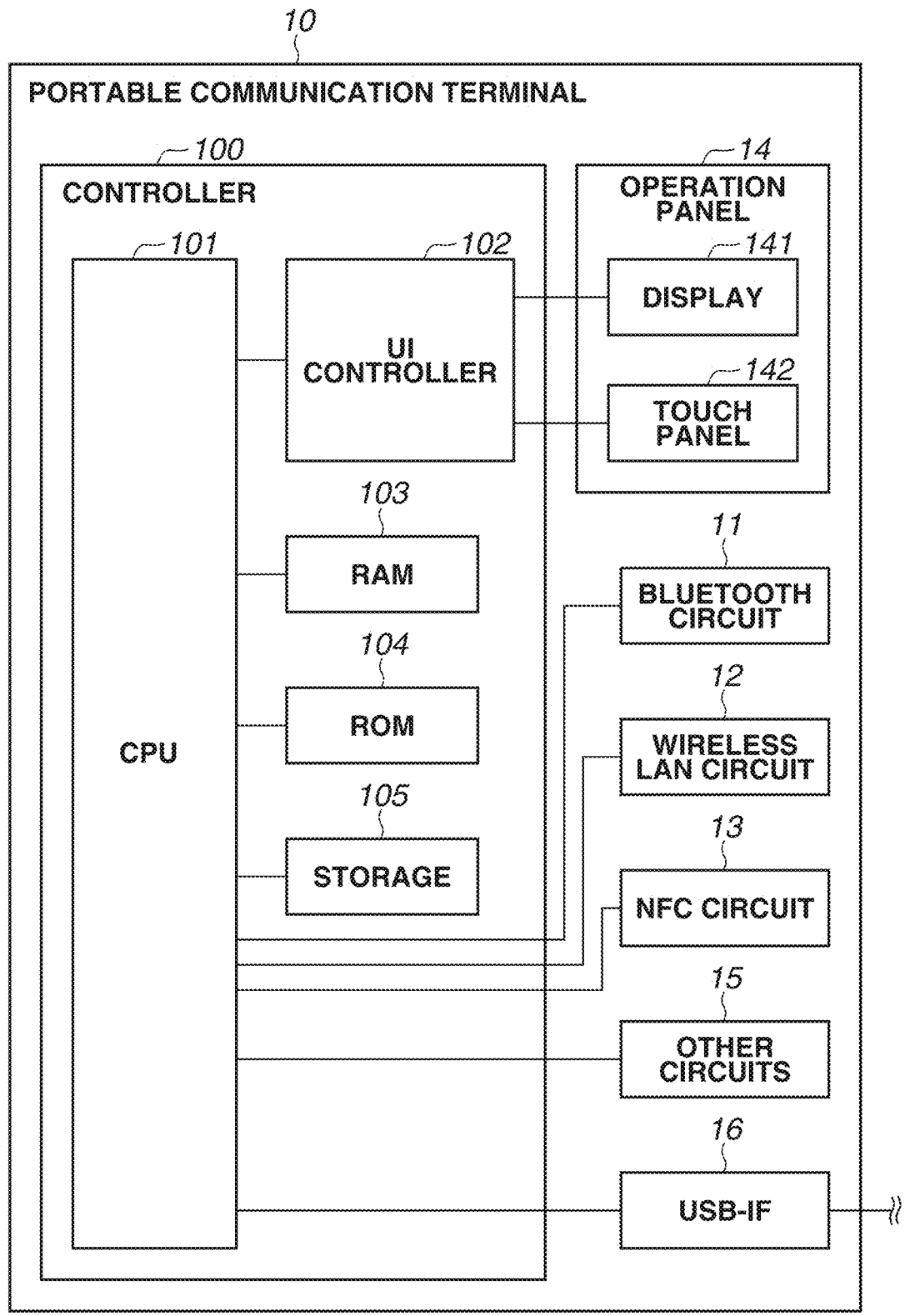
FIG. 2 is a diagram illustrating a hardware configuration of a portable communication terminal.

FIG. 2 is a diagram illustrating a hardware configuration of the portable communication terminal 10. As illustrated in FIG. 2, the portable communication terminal 10 includes, for example, a controller 100, an operation panel 14, a Bluetooth circuit 11, a wireless LAN circuit 12, an NFC circuit 13, other circuits 15, and a Universal Serial Bus interface (USB-IF) 16. Moreover, the operation panel 14, the Bluetooth circuit 11, the wireless LAN circuit 12, the NFC circuit 13, the other circuits 15, and the USB-IF 16 are connected to the controller 100 via communication paths such as buses in such a way as to be able to communicate with the controller 100.

Moreover, various wireless circuits (Bluetooth, wireless LAN, and NFC) included in the portable communication terminal 10 are able to perform wireless communication connection and exchange of data with various wireless circuits included in the image forming apparatus 20.

The Bluetooth circuit 11 is an antenna module unit (wireless communication interface) equipped with a controller compliant with a Bluetooth standard. Here, the Bluetooth circuit 11 is assumed to perform communication in conformance with the IEEE 802.15 standard (what is called Bluetooth®). Specifically, the Bluetooth circuit 11 is assumed to perform wireless communication using Bluetooth Low Energy (BLE) for low power consumption, which is a part of the Bluetooth standard and using an Industrial Scientific and Medical (ISM) band for the 2.4 GHz band. Moreover, the Bluetooth circuit 11 is assumed to conform to a BLE communication method of Bluetooth 5.1 and to be compatible with the function of detecting a direction in which the image forming apparatus 20 is situated with use of the BLE communication. A specific method for direction detection is described below with reference to FIG. 6.

The wireless LAN circuit 12 is an antenna module unit (wireless communication interface) equipped with a controller compliant with a wireless LAN standard (the Wi-Fi standard or the IEEE 802.11 standard).

The NFC circuit 13 is an antenna module unit (wireless communication interface) equipped with a controller compliant with an NFC standard (for example, ISO/IEC 14443 Type A, Type B, or FeliCa (Type F)).

The operation panel 14 is a user interface unit which is able to perform displaying and inputting of information. The operation panel 14 includes a display 141, which functions as a display unit for displaying information, and a touch panel 142, which functions as an input unit (reception unit) for receiving inputting of information.

The other circuits 15 are other circuits which constitute the portable communication terminal 10, such as a functional module for mobile phone radio waves and a functional module for the Global Positioning System (GPS). Configurations of the other circuits 15 vary with products of the portable communication terminal 10 and are, therefore, omitted from detailed description.

The USB-IF 16 is an interface for connecting to an information processing apparatus such as a personal computer and performing transmission and reception of data via communication of the USB standard.

The controller 100 is a control unit for performing various control operations for the portable communication terminal 10. The controller 100 includes a central processing unit (CPU) 101, a user interface (UI) controller 102, a random access memory (RAM) 103, a read-only memory (ROM) 104, and a storage 105.

The CPU 101 is a central computation unit which controls the entire portable communication terminal 10, and implements the functions of the portable communication terminal 10 by connecting to and controlling various functional units of the portable communication terminal 10.

The UI controller 102 is a UI control unit which controls the display 141 and the touch panel 142 in cooperation with the CPU 101. The UI controller 102 performs processing for recognizing an operation performed by the user on the touch panel 142. Moreover, the UI controller 102 performs processing for changing the display content of the display 141 according to an operational status on the portable communication terminal 10 or an operational status on the touch panel 142. The user is allowed to operate applications described below by using the operation panel 14.

The RAM 103 is a work memory used for the CPU 101 to operate, and stores arithmetic operation data and various programs.

The ROM 104 stores, for example, programs and image data which the CPU 101 of the portable communication terminal 10 uses and applications which run in cooperation with the image forming apparatus 20.

The storage 105 is a non-volatile secondary storage device used for storing large-volume programs and data. The stored programs and data become able to be used by being loaded onto the RAM 103. The storage 105 is a memory device (memory unit or storage unit) standardized as, for example, a Secure Digital (SD) card, an embedded MultiMediaCard (eMMC), or a solid state drive (SSD). Furthermore, a part of the function of the storage 105 can be assumed by the ROM 104.

<Image Forming Apparatus>

FIG. 3 is a diagram illustrating a hardware configuration of the image forming apparatus 20. The image forming apparatus 20 includes, for example, a controller 200, a scanner 24, a printer 25, an operation panel 26, a Bluetooth circuit 21, a wireless LAN circuit 22, a near field communication (NFC) circuit 23 (NFC unit), a wired LAN-IF 27, and a USB-IF 28. These functional units of the image forming apparatus 20 operate in conjunction with each other to implement various functions such as printing, scanning, and copying. Moreover, the respective wireless circuits (the Bluetooth circuit 21, the wireless LAN circuit 22, and the NFC circuit 23) perform wireless communication connection with the wireless circuits included in the portable communication terminal 10, thus being able to exchange data therewith.

The Bluetooth circuit 21 is an antenna module unit (wireless communication interface) equipped with a controller compliant with the Bluetooth standard. As with the portable communication terminal 10, the Bluetooth circuit 21 is assumed to perform communication in conformance with the IEEE 802.15 standard and is assumed to conform to a BLE communication method of Bluetooth 5.1. The Bluetooth circuit 21 includes a plurality of antennas in such a way as to enable the Bluetooth circuit 11 of the portable communication terminal 10 to recognize the angle of emission of the image forming apparatus 20. A specific configuration of the Bluetooth circuit 21 and a specific method for direction detection are described below.

The wireless LAN circuit 22 is an antenna module unit (wireless communication interface) equipped with a controller compliant with the wireless LAN standard (the Wi-Fi standard or the IEEE 802.11 standard).

The NFC circuit 23 is an antenna module unit (wireless communication interface) equipped with a controller compliant with the NFC standard (for example, ISO/IEC 14443 Type A, Type B, or FeliCa (Type F)).

The scanner 24 is a unit (a reading unit or a reading device) which reads an image or characters on an original with a charge-coupled device (CCD) sensor or a contact image sensor (CIS) and converts the read image or characters into image data. An original an image or characters on which are to be read can be the one placed on a document positioning glass plate or the one conveyed by an automatic document feeder (ADF).

The printer 25 is a printer engine (an image forming unit or an image forming device) which prints image data on paper (sheet). The printer 25 is of, for example, an electrophotographic type, and includes, for example, a laser scanner unit, a photosensitive drum, and a paper conveyance unit. Furthermore, a printer engine of another type, such as an inkjet type, can be employed.

The operation panel 26 is a UI unit which the user uses to operate the image forming apparatus 20. The operation panel 26 is a user interface unit which is able to perform displaying and inputting of information. The operation panel 26 includes a display 262, which functions as a display unit for displaying information, a touch panel 263, which functions as an input unit (reception unit) for receiving inputting of information, and a UI controller 261, which controls the display 262 and the touch panel 263. The UI controller 261 controls the display 262 and the touch panel 263 in cooperation with a main system on a chip (SoC) 201. The UI controller 261 performs processing for recognizing an operation performed by the user on the touch panel 263. Moreover, the UI controller 261 performs processing for changing the display content of the display 262 according to an operational status on the image forming apparatus 20 or an operational status on the touch panel 263.

The wired LAN-IF 27 is an interface used for performing network communication via a connector for LAN.

The USB-IF 28 is an interface for connecting to, for example, a personal computer and performing transmission and reception of data with the personal computer via communication of the USB standard.

The controller 200 is electrically connected to and thus controls each of the Bluetooth circuit 21, the wireless LAN circuit 22, the NFC circuit 23, the scanner 24, the printer 25, and the operation panel 26. Moreover, the controller 200 includes, in addition to the main SoC 201, for example, a RAM 205, a ROM 206, and a storage 207.

The main SoC 201 (a system on a chip) is an integrated-circuit component, and includes a CPU 202, an image processing hardware logic 203, and various interface (IF) controllers 204.

The CPU 202 is a central computation unit which controls the entire image forming apparatus 20, and implements the functions of the image forming apparatus 20 by connecting to and controlling various functional units of the image forming apparatus 20.

The image processing hardware logic 203 performs image processing, such as correction, manipulation, or editing, on image data received from, for example, the scanner 24 or the wired LAN-IF 27. Moreover, the image processing hardware logic 203 performs processing, such as color conversion, filter processing, or resolution conversion, on image data which is to be output to the printer 25.

The various IF controllers 204 are interface control controllers used for connection to, for example, the Bluetooth circuit 21, the wireless LAN circuit 22, the NFC circuit 23, the RAM 205, the ROM 206, and the storage 207. Examples of the interfaces include a USB interface, a Serial ATA (SATA) interface, and a low-voltage differential signaling (LVDS) interface. System buses used for connections of these units are included in the main SoC 201.

The RAM 205 is a system work memory used for the CPU 202 to operate, and stores arithmetic operation data and various programs for the CPU 202. Moreover, the RAM 205 is used also as an image memory which retains image data on which various image processing operations have been performed by the image processing hardware logic 203 during scanning or during printing.

The ROM 206 is a boot ROM, and stores a boot program for the controller 200.

The storage 207 is a non-volatile secondary storage device used to store large-volume programs and data, and is used with the stored programs and data loaded onto the RAM 205. For example, the storage 207 is a memory device (a memory unit or a storage unit) standardized as, for example, a hard disk drive (HDD) or an SSD. Furthermore, a part of the function of the storage 207 can be assumed by the ROM 206.

<Configurations of Bluetooth Circuits>

Configurations of the Bluetooth circuit 21 and the Bluetooth circuit 11 are described in detail with reference to FIGS. 4A and 4B, respectively. FIG. 4A is a diagram illustrating a configuration of the Bluetooth circuit 21 included in the image forming apparatus 20. The Bluetooth circuit 21 is mounted in the image forming apparatus 20, and performs wireless communication conforming to the Bluetooth standard (mainly, concerning BLE) with the portable communication terminal 10, thus controlling inputting and outputting of data between the portable communication terminal 10 and the main SoC 201. As mentioned above, the Bluetooth circuit 21 conforms to a BLE communication method of Bluetooth 5.1. The Bluetooth circuit 21 includes an integrated circuit (IC) chip 51 and BLE antennas 45 to 48, which are arranged on a substrate 49. Furthermore, while, in FIG. 4A, each antenna is illustrated as a trident, this is an expression of expediency for distinction from a solid line in the figure, and the actual shape of each antenna does not need to be a trident. The IC chip 51 includes functions of a host interface (I/F) control unit 41, a BLE baseband unit 42, a radio frequency (RF) control unit 43, and an RF switch 44 in an aggregated manner.

The host I/F control unit 41 performs inputting and outputting of data with respect to the main SoC 201 illustrated in FIG. 3 via a wired interface. Examples of the interface include an interface allowing for connection with a cable 80 (see FIG. 8B) compliant with a serial communication method, such as a Universal Serial Bus (USB). The BLE baseband unit 42 is a unit which performs baseband signal processing to effect digital signal processing in BLE communication. The RF control unit 43 is a unit which performs modulation and demodulation processing of radio waves for radio frequency (RF) communication to perform BLE communication with the portable communication terminal 10. The RF switch 44 performs switching control for connecting to the RF control unit 43 by switching between the BLE antennas 45 to 48 for connection. The RF switch 44 is assumed to include four contacts, i.e., a contact "a", a contact "b", a contact "c", and a contact "d". The BLE antenna 45 is an antenna formed to perform wireless communication and is able to be used to perform communication with the portable communication terminal 10. Furthermore, the BLE antenna 45 is a pattern antenna wired in a pattern on the substrate 49, and is regulated in such a way as to have antenna characteristics available for performing BLE communication in the 2.4 GHz band. The BLE antennas 46 to 48 are antennas formed in manners similar to that of the BLE antenna 45.

Furthermore, the BLE antennas 45 to 48 do not need to be pattern antennas formed on the substrate 49. For example, the BLE antennas 45 to 48 can be antenna components having equivalent characteristics (what is called "chip antennas") which are mounted and arranged on the substrate 49. Moreover, these antennas do not need to be arranged directly on the substrate 49. For example, the antenna terminals "a", "b", "c", and "d" of the IC chip 51 can be provided with terminal connectors, so that external antennas which are connectable to these connectors can be used.

The BLE antennas 46 to 48 are regulated in such a way as to have antenna characteristics equivalent to those of the BLE antenna 45. Specifically, four BLE antennas having equivalent characteristics are evenly arranged on the substrate 49. The BLE antenna 45 is connected to the contact "a" of the RF switch 44, and, similarly, the BLE antennas 46 to 48 are connected to the contact "b", the contact "c", and the contact "d" of the RF switch 44, respectively. Thus, the RF switch 44 is configured to be able to perform switching as to which BLE antenna of the four BLE antennas 45 to 48 to connect to the RF control unit 43.

FIG. 4B is a diagram illustrating a configuration of the Bluetooth circuit 11 included in the portable communication terminal 10. The Bluetooth circuit 11 is mounted in the portable communication terminal 10, and performs wireless communication compliant with the Bluetooth standard (mainly, concerning BLE) with the image forming apparatus 20, thus controlling inputting and outputting of data between the image forming apparatus 20 and the CPU 101. While the Bluetooth circuit 21 includes a plurality of antennas mounted therein, the Bluetooth circuit 11 includes a single antenna mounted therein. The Bluetooth circuit 11 includes an IC chip 110 and a BLE antenna 115, which are arranged on a substrate 119. The IC chip 110 includes functions of a host I/F control unit 111, a BLE baseband unit 112, and an RF control unit 113 in an aggregated manner.

The host I/F control unit 111 is configured to perform inputting and outputting of data with respect to the CPU 101 via a wired interface.

The BLE baseband unit 112 is configured to perform baseband signal processing to effect digital signal processing in BLE communication.

The RF control unit 113 is configured to perform modulation and demodulation processing of radio waves for radio frequency (RF) communication to perform BLE communication with the image forming apparatus 20.

The BLE antenna 115 is an antenna formed to perform wireless communication and is able to be used to perform communication with the image forming apparatus 20. Moreover, the BLE antenna 115 is a pattern antenna wired in a pattern on the substrate 119, and is regulated in such a way as to have antenna characteristics available for performing BLE communication in the 2.4 GHz band.

The Bluetooth circuit 11 includes a single antenna mounted therein, but is assumed to conform to the BLE communication method of Bluetooth 5.1 so as to support a function for detecting a direction in which the image forming apparatus 20 is situated. Furthermore, the Bluetooth circuit 11 can be configured to include a plurality of antennas as with the Bluetooth circuit 21.

<Antennas and Shield>

Next, a relationship between the antennas of the Bluetooth circuit 21 and a shield is described. As mentioned above, the Bluetooth circuit 21 includes a plurality of antennas. As illustrated in FIG. 5A, the BLE antennas 45 to 48 are formed in pattern wiring on the substrate 49. FIG. 5A is a diagram illustrating a front surface of the Bluetooth circuit board. In this way, including a plurality of antennas enables performing direction detection (described below in detail) compliant with the Bluetooth standard. The BLE antennas 45 to 48 are connected to the IC chip 51. Specifically, the BLE antennas 45, 46, 47, and 48 are connected to the contact "a", the contact "b", the contact "c", and the contact "d" of the RF switch 44, respectively. Moreover, on the substrate 49 of the Bluetooth circuit 21, there is provided a connector 52 which is connectable to the controller 200 with a cable 80 (see FIG. 8B) for interface connection with the controller 200. The connector 52 is connected to the host I/F control unit 41 of the IC chip 51.

On the substrate 49, there is provided a screw hole 53, via which the substrate 49 is connected to ground (GND) for electrical circuits. Usually, a wireless communication which uses radio waves in high-frequency band in, for example, BLE is able to exert maximum antenna characteristics by obtaining the electrically stabilized GND. Therefore, it is desirable that the substrate 49 be fixed to a metallic plate of the image forming apparatus 20, which serves as the electrically stabilized GND.

A method of fixing the substrate 49 is described with reference to FIG. 5B. FIG. 5B is a diagram illustrating an upper surface of the Bluetooth circuit board. A metallic plate 55 is a plate to which the substrate 49 is attached. The metallic plate 55 serves as GND for electrical circuits in the body of the image forming apparatus 20, and is grounded via, for example, a GND line. A metallic spacer 56 is a spacer used for fixing the substrate 49 to the metallic plate 55. The substrate 49 and the metallic plate 55 are physically interconnected and are connected to GND in an electrical circuit manner. A screw 57 is a metallic screw used for fixing the substrate 49 to the metallic spacer 56, and is fastened through the screw hole 53 of the substrate 49. A resin spacer 58 is a spacer formed from plastic resin and used for fixing the substrate 49 to the metallic plate 55, and is fixed to the metallic plate 55.

Moreover, the metallic plate 55 functions as a shield member which shields radio waves emitted from the BLE antennas 45 to 48.

Figure 5C:
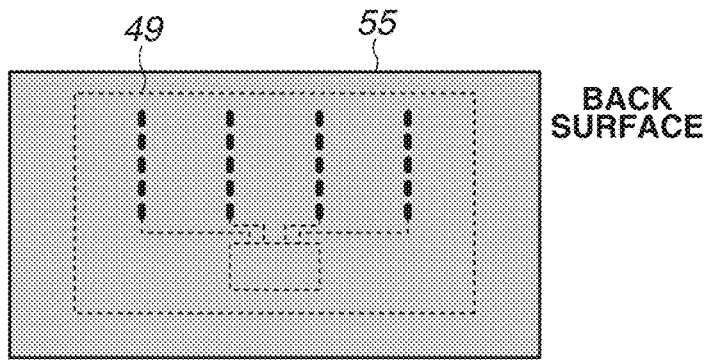
FIG. 5C is a diagram illustrating the back surface of the Bluetooth circuit board.
Figure 5B:
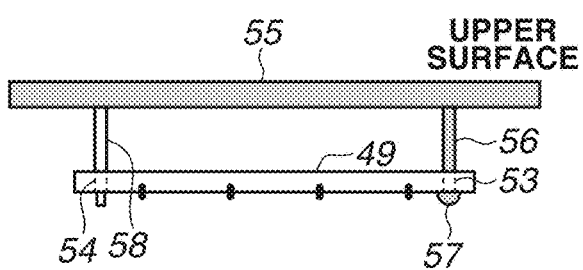
FIG. 5B is a diagram illustrating the upper surface of the Bluetooth circuit board.
Figure 5D:
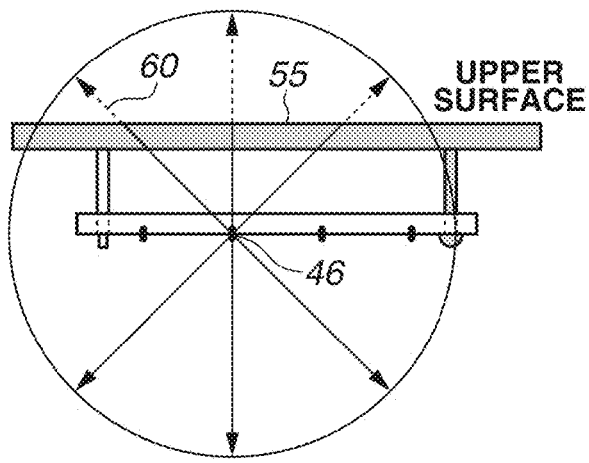
FIG. 5D is a diagram used to explain a relationship between radio waves and a shield.
Figure 5A:
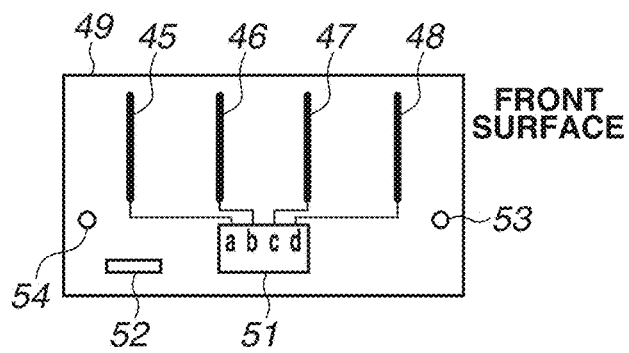
FIG. 5A is a diagram illustrating the front surface of a Bluetooth circuit board.

FIG. 5C is a diagram illustrating a back surface of the Bluetooth circuit board. As illustrated in FIG. 5C, on the back surface side of the substrate 49, the entire substrate 49 including a region in which the BLE antennas 45 to 48 are arranged is covered with the metallic plate 55. The metallic plate 55, which is in the above-mentioned positional relationship, exerts an influence on the range of radio waves emitted from the BLE antennas 45 to 48. FIG. 5D is a diagram used to explain a relationship between radio waves and a shield. As with FIG. 5B, FIG. 5D illustrates the Bluetooth circuit 21 as viewed from the upper surface thereof. Moreover, FIG. 5D illustrates the behavior of radio waves emitted from the BLE antenna 46, which is taken as a representative of the BLE antennas 45 to 48. As understandable from FIG. 5D, the metallic plate 55 is located on the back surface side of the substrate 49. Therefore, radio waves emitted toward the back surface side of the substrate 49 out of radio waves emitted from the BLE antenna 46 are blocked by the metallic plate 55. Since the blocked radio waves are reflected or absorbed, radio waves do not travel to portions indicated by dashed arrows 60. In a precise sense, radio waves may travel due to multipath propagation caused by diffracted waves or reflected radio waves, but, since the radio field intensity thereof is greatly attenuated, can be treated as the ones which does not affect distance detection or direction detection described below.

These characteristics are taken advantage of to limit the propagation area of radio waves emitted from a BLE antenna from a concentric area to a semicircular area. This enables, while preventing or reducing the image forming apparatus 20 from cooperating with a portable communication terminal 10 which is coming close to the back surface side of the image forming apparatus 20, the image forming apparatus 20 to appropriately cooperate with a portable communication terminal 10 which is coming close to the front surface side of the image forming apparatus 20.

<Communication Establishment Processing>

Figure 7:
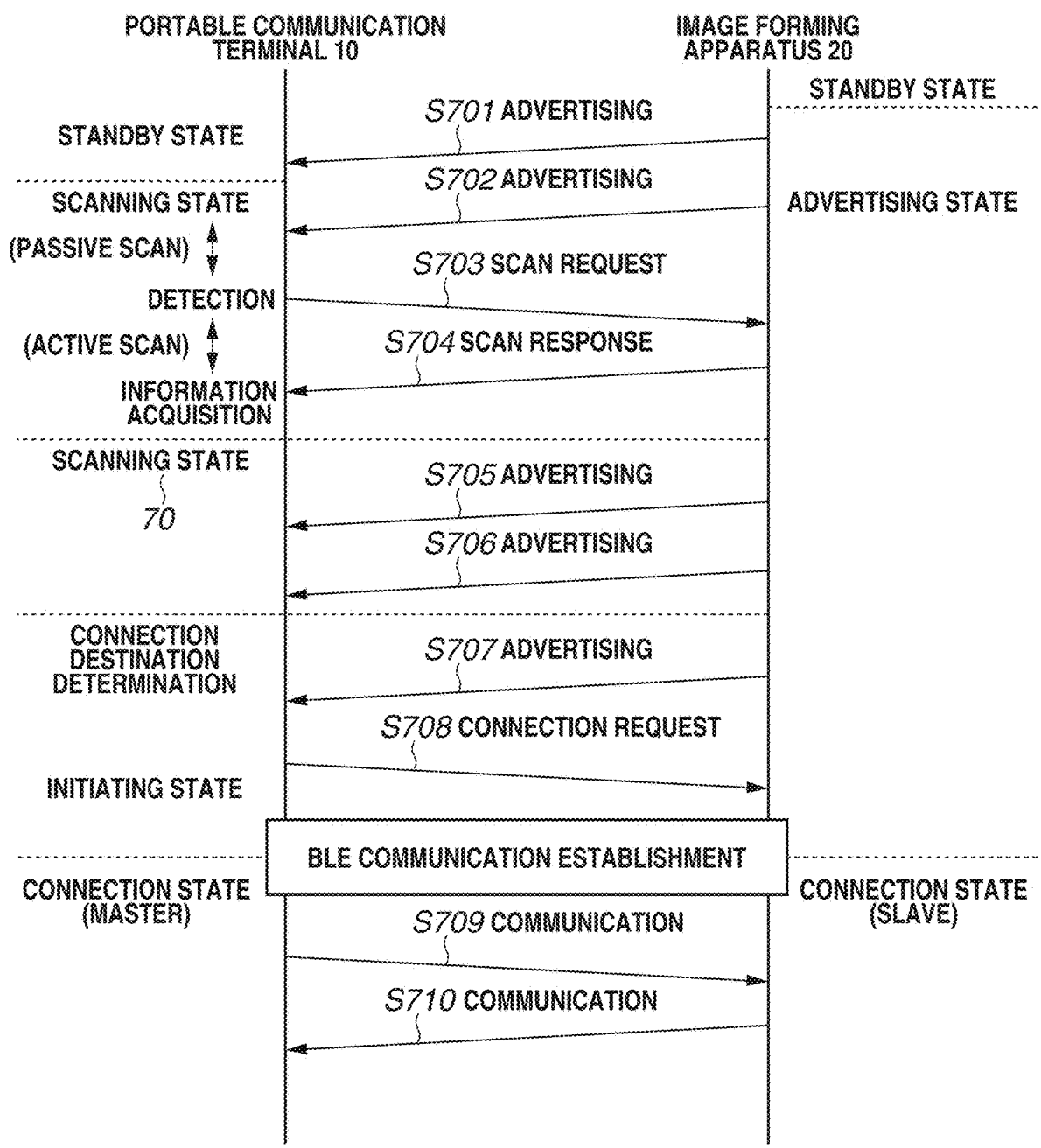
FIG. 7 is a diagram illustrating a flow for establishment of communication between the portable communication terminal and the image forming apparatus using BLE.

Next, establishment of communication (communication establishment processing starting with discovery and leading to connection) in BLE is described. FIG. 7 is a diagram illustrating a flow of communication establishment between the portable communication terminal 10 and the image forming apparatus 20 using BLE. The state transition occurring from the time when the portable communication terminal 10 discovers the image forming apparatus 20 to the time when a connection for BLE communication between the portable communication terminal 10 and the image forming apparatus 20 becomes established is as follows.

As illustrated in FIG. 7, each of the link layers of the portable communication terminal 10 and the image forming apparatus 20 is in a standby state at the beginning. The standby state is a state in which neither transmission nor reception is being performed. In step S701, when executing a program, the image forming apparatus 20 transitions to an advertising state, thus coming to transmit advertising packets with a predetermined period. Furthermore, processing in step S701 refers to one set of processing for emitting the respective packets from the BLE antennas 45 to 48 (four packets in total). This also applies to steps S702, S705, S706, and S707 described below.

The advertising packet is broadcasting, and is not radio wave transmission with a designated address. Moreover, the type of a packet (protocol data unit type) used for the advertising packet is ADV_IND (connectable undirected advertising) because a reply as a connection request from the portable communication terminal 10 is supposed. The advertising packet includes information about, for example, a universally unique identifier (UUID) indicating, for example, a device name and a device function and a TX power level.

The portable communication terminal 10 transitions to a scanning state in response to the progress of processing for a program (cooperation application). In the scanning state, the portable communication terminal 10 performs reception of advertising packets from the image forming apparatus 20. In this way, a scanning state for receiving advertising packets is referred to as "passive scan". Depending on a processing process of the program, the portable communication terminal 10 can enter into a state not included in the scanning state. In that case, the portable communication terminal 10 does not enter into passive scan and, therefore, does not receive broadcasting from the image forming apparatus 20.

Here, if the cooperation application is activated in the portable communication terminal 10 and the Bluetooth function of the portable communication terminal 10 is enabled, the portable communication terminal 10 is treated as having entered into the scanning state.

In step S702, in the state of passive scan, when the portable communication terminal 10 receives advertising packets from the image forming apparatus 20 (advertiser), processing for the cooperation application progresses. In step S703, the portable communication terminal 10 transmits a scan request (SCAN_REQ) to the image forming apparatus 20, thus trying to acquire further information. A scan state in which such acquisition of information is performed is referred to as "active scan". In step S704, the portable communication terminal 10 receives a scan response from the image forming apparatus 20 and then stores information obtained by scanning in a storage included therein. The information which has been acquired here includes, in addition to device information about the image forming apparatus 20, for example, information required for implementing the direction detection function in Bluetooth 5.1, such as an interval d between a plurality of antennas and a wavelength $\lambda$ of radio waves. Then, in steps S705 and S706, the portable communication terminal 10 continues to periodically receive advertising packets emitted from the image forming apparatus 20. When being in a scanning state 70, the portable communication terminal 10 is able to acquire an angle of emission θ by calculating a direction from advertising packets emitted from the image forming apparatus 20. Moreover, the portable communication terminal 10 is able to acquire a distance from the radio field intensity of the received radio waves.

In step S707, the portable communication terminal 10 receives advertising packets emitted from the image forming apparatus 20, and, when it turns out that the portable communication terminal 10 is present within a specific detection region from angle information and distance information acquired by reception of advertising packets, the portable communication terminal 10 transitions to an initiating state. Then, in step S708, the portable communication terminal 10 transmits a connection request (CONNECT_REQ) to the image forming apparatus 20 and performs negotiation therewith, thus transitioning to a connection state. Upon completion of connection for BLE communication, the portable communication terminal 10 comes to serve as a master and the image forming apparatus 20 comes to serve as a slave, so that, in steps S709 and S710, the portable communication terminal 10 and the image forming apparatus 20 become able to transmit and receive data with respect to each other. Thus far is a serial procedure for establishment of communication for BLE.

<Direction Detection>

Figure 6:
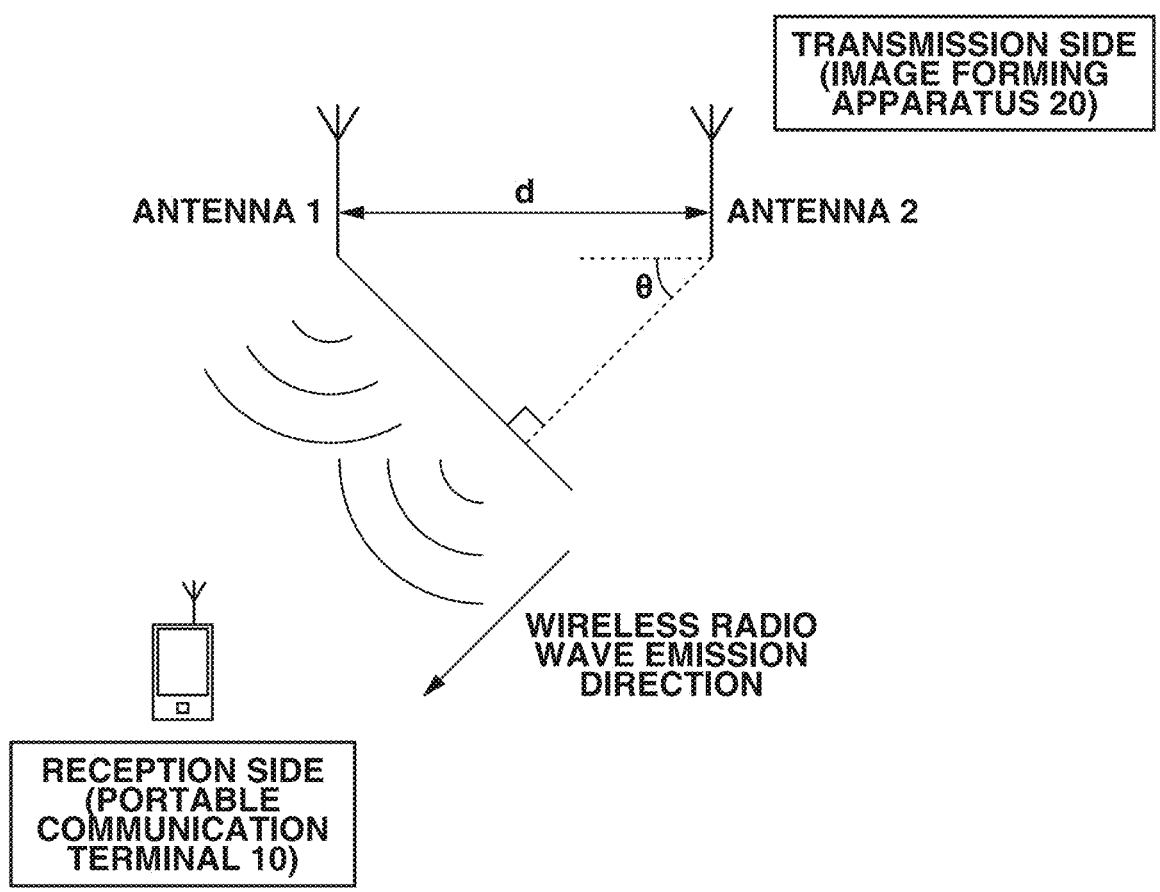
FIG. 6 is a diagram used to explain direction detection which is performed with use of Bluetooth Low Energy (BLE).

Next, a method for direction detection using a plurality of antennas is described. A method of detecting a direction by causing a transmission side including a plurality of antennas to emit radio waves for BLE communication and causing a reception side including a single antenna to receive radio waves for BLE communication is described with reference to FIG. 6. FIG. 6 is a diagram used to explain direction detection using BLE. In FIG. 6, the transmission side for radio waves is equivalent to the Bluetooth circuit 21 of the image forming apparatus 20, and the reception side for radio waves is equivalent to the Bluetooth circuit 11 of the portable communication terminal 10. The present method is a method of detecting an angle of emission called an angle of departure (AoD) or a direction of departure (DoD), in which a positional relationship between two apparatuses is expressed by the angle of emission θ. While, in the Bluetooth circuit 21, four antennas are used, for ease of explanation, here, for descriptive purposes, description is performed with use of two antennas, i.e., an antenna 1 and an antenna 2.

First, as a premise, the image forming apparatus 20 serving as the transmission side is assumed to periodically emit advertising packets (advertisement packets). At this time, the image forming apparatus 20 serving as the transmission side emits advertising packets while sequentially switching between the antenna 1 and the antenna 2. Then, two types of radio waves, i.e., a radio wave emitted from the antenna 1 and a radio wave emitted from the antenna 2, come to arrive at the portable communication terminal 10 serving as the reception side. Here, since there is provided an interval between the antenna 1 and the antenna 2, the distance between the antenna 1 and the portable communication terminal 10 differs from the distance between the antenna 2 and the portable communication terminal 10. Accordingly, as a result, a very slight difference occurs between a time required for a wireless radio wave emitted from the antenna 1 to arrive at the portable communication terminal 10 and a time required for a wireless radio wave emitted from the antenna 2 to arrive at the portable communication terminal 10. This very slight difference in time is able to be detected as a phase difference occurring when the portable communication terminal 10 has received radio waves. Here, the interval between the antenna 1 and the antenna 2 is denoted by d, the angle of emission of a wireless radio wave emitted from each of the antenna 1 and the antenna 2 is denoted by θ, and the wavelength of the wireless radio wave is denoted by λ. In this instance, when the above-mentioned phase difference is denoted by φ, the following relationship holds.

$$\varphi = (2\pi d^* \cos(\theta))/\lambda$$

Accordingly, the angle of emission θ of a radio wave is calculated as shown below.

$$\theta = \arccos((\varphi\lambda)/(2\pi d))$$

As just described, if radio waves emitted from a plurality of antennas are received by a single antenna and a phase difference between the received plurality of radio waves is able to be accurately detected, a positional relationship between the transmission side and the reception side for radio waves is able to be calculated as the angle of emission θ. Furthermore, to calculate an accurate phase difference, it is desirable that the antenna 1 and the antenna 2 have equivalent radio properties. Therefore, as mentioned above, the BLE antennas 45 to 48 are configured to have equivalent radio properties. Moreover, to calculate an accurate phase difference, it is desirable that a radio wave emitted from the antenna 1 and a radio wave emitted from the antenna 2 be direct waves which linearly come through the same propagation path to arrival at a single antenna serving as the reception side. Determining whether a plurality of radio waves received by the portable communication terminal 10 have passed through the same propagation path (are direct waves) can be enabled by, for example, comparing the respective reception intensities of two radio waves.

Furthermore, to perform the above-mentioned calculation, the interval d between the antenna 1 and the antenna 2 serving as the transmission side and the wavelength λ, of a wireless radio wave are required. Accordingly, in a case where the portable communication terminal 10 is configured to calculate the angle of emission, the portable communication terminal 10 is required to acquire these parameters in advance. Therefore, such information about the interval d and the wavelength λ, can be configured to be included in an advertising packet (or a response to a scan request) which the image forming apparatus 20 emits.

The subsequent description is performed on the premise that the angle of emission θ is able to be acquired. Moreover, calculation of the angle of emission is assumed to be performed by the RF control unit 113 included in the IC chip 110 based on the specifications of the Bluetooth standard. Accordingly, the controller 100 only needs to acquire information about the angle of emission which is output from the Bluetooth circuit 11. Furthermore, the angle of emission θ can also be calculated by the controller 100.

<Distance Detection>

Figure 12:
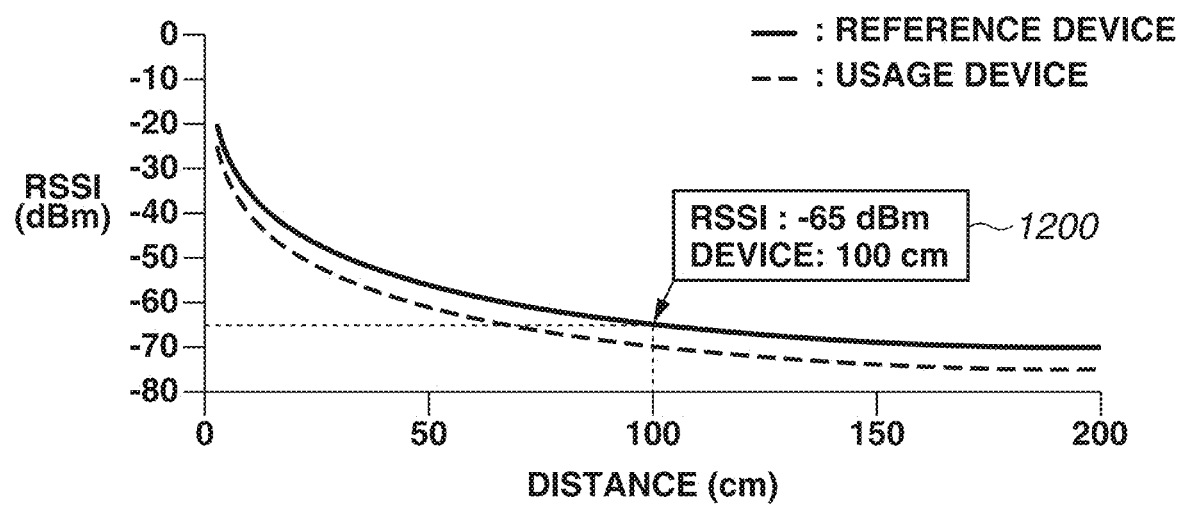
FIG. 12 is a diagram illustrating a relationship between radio field intensity and distance in a look-up table (LUT) which is used for conversion.

Next, distance detection using the radio field intensity is described. FIG. 12 is a diagram illustrating a relationship between the radio field intensity (received signal strength indication (RSSI)) and the distance in a look-up table (LUT) used for conversion. The distance between the transmission side and the reception side for radio waves is able to be estimated based on information indicating how much a radio wave has attenuated from the time of being emitted to the time of being received. The attenuation of a radio wave is able to be calculated based on the output radio field intensity (first radio field intensity information) obtained when the transmission side emits the radio wave and the reception radio field intensity (second radio field intensity information) obtained when the reception side receives the radio wave.

Here, a general calculating formula for a propagation loss L of radio wave in free space is shown below.

$$L = P - \mathrm{RSSI} \tag{1}$$

L: propagation loss
P: output radio field intensity
RSSI: measured radio field intensity Then, the distance is calculated from the propagation loss. The calculation of a propagation loss is defined by, for example, a calculating formula (2). Upon conversion of the calculating formula (2), a calculating formula (3) for calculating the distance is obtained.

$$L = (4\Pi d/\lambda)^2 \tag{2}$$

$$d = (\lambda(\sqrt{L}))/(4\Pi) \tag{3}$$

d: distance between the transmission side and the reception side
λ: wavelength of radio wave
Π: pi (the ratio of the circumference of a circle to its diameter)

Accordingly, if the wavelength of a radio wave, the output radio field intensity, and the reception radio field intensity are obtained, the distance is able to be calculated. In a case where calculation of the distance is performed by the portable communication terminal 10, since the reception radio field intensity is measured at the time of reception of a radio wave, the wavelength of a radio wave and the output radio field intensity only need to be acquired as an advertising packet (or a response to a scan request).

However, a value which is obtained by the above-mentioned calculation is a calculated value obtained under ideal circumstances, and some errors may be observed in the value of distance depending on differences in various usage environments including individual differences of, for example, the arrangement of antennas and the shapes of apparatuses. Therefore, a table (LUT) can be created based on a relationship between distances obtained at the time of designing apparatuses and the reception radio field intensity and then be used for determining a communication establishment region. With this method used, the radio field intensity characteristics specific for the model of the image forming apparatus 20 are able to be reflected without having to be expressed by, for example, coefficients for calculating formulae. Furthermore, in the case of an operation using an LUT, an LUT associated with the model of the image forming apparatus 20 can be acquired from device information included in an advertising packet.

FIG. 12 is a diagram illustrating a relationship between the reception radio field intensity and the distance in a conversion table which is used in the image forming apparatus 20. As indicated by a conversion example 1200 illustrated in FIG. 12, in the conversion table which is used in the image forming apparatus 20, a distance "100 cm" is output with respect to inputting of an RSSI value "−65 dBm". As understandable from FIG. 12, as an RSSI value larger than "−65 dBm" is input, a distance shorter than "100 cm" is output. On the other hand, as an RSSI value smaller than "−65 dBm" is input, a distance longer than "100 cm" is output. Moreover, as understandable from FIG. 12, there is a tendency that, as the distance is loner, the amount of change of the radio field intensity becomes smaller. This means that, as the position is farther, it becomes more difficult to determine the distance. Therefore, in the case of intending to accurately determine the distance with respect to the far position, the output radio field intensity can be set higher on the side of the image forming apparatus 20. In a case where the output radio field intensity has been adjusted, the value of the output radio field intensity can be caused to be included in an advertising packet as TX power information. Using this information enables the portable communication terminal 10 to calculate or convert a distance associated with TX power. For example, in a case where TX power has been adjusted, switching or correction of an LUT to be used is performed in the portable communication terminal 10.

Furthermore, the above-mentioned conversion table is created on the assumption of the case of using an ideal portable communication terminal 10 (a reference device). Therefore, in a case where a portable communication terminal in user environment having model-specific radio field intensity characteristics (a usage device) has been used, a deviation may be caused between the output distance information and the actual distance. For example, as indicated by a dashed line illustrated in FIG. 12, the usage device may have such characteristics that the RSSI value is output at values lower (by about −5 dBm) than those in the reference device. Therefore, to perform high-accuracy distance detection, it is desirable to previously store such characteristic information (individual value information) and then correct the RSSI value before performing conversion using the above-mentioned conversion table. Furthermore, such characteristic information (calibration information) is able to be obtained by calibration processing. The calibration processing is performed by locating the usage device at a specific position with respect to the image forming apparatus 20 and measuring the reception radio field intensity of a radio wave received in that state. The specific position is, for example, the position at a distance of 0 cm or the position at a distance of 100 cm from a target mark included in the image forming apparatus 20. Furthermore, the calibration processing does not necessarily need to be performed. Moreover, it is desirable that the calibration processing be performed at a position suitable for the use application. Moreover, the calibration processing can be performed at a plurality of positions to enable performing higher-accuracy correction. Moreover, a variation may occur in reception radio field intensity depending on the timing of acquisition thereof. Therefore, it is favorable to acquire reception radio field intensities at a plurality of timings and average the acquired reception radio field intensities to obtain an average reception radio field intensity to be used.

The first exemplary embodiment is characterized in that the Bluetooth circuit 21 is located on the front surface side of the image forming apparatus 20 and a detection area limited in angle and distance around the Bluetooth circuit 21 is used.

<Antenna Arrangement>

FIG. 8A is a diagram illustrating the image forming apparatus 20 in the first exemplary embodiment as viewed from diagonally forward right. The user who uses the image forming apparatus 20 has a high probability of coming close to the vicinity of the operation panel 26 when, for example, using the scanner 24 or coming to pick up printed paper output from the printer 25. Therefore, the first exemplary embodiment is configured to locate the Bluetooth circuit 21 in a region on the front surface near the operation panel 26, thus increasing the detection accuracy for the portable communication terminal 10.

Moreover, for the same reason, the NFC circuit 23 is located in the vicinity of the Bluetooth circuit 21. Additionally, a target mark 83 is located in the vicinity of the NFC circuit 23.

The target mark 83 is a mark which guides the user in such a way as to bring the portable communication terminal 10 close to (into contact with) the position of the target mark 83 when the NFC circuit 23 and the NFC circuit 13 are caused to communicate with each other. Moreover, the target mark 83 is also used as a target for the user who carries a portable communication terminal to come close to a detection area located around the Bluetooth circuit 21.

FIG. 8B is a diagram illustrating the image forming apparatus 20 in the first exemplary embodiment as viewed from right lateral side. As illustrated in FIG. 8B, the NFC circuit 23 is connected to the operation panel 26 via a cable 81, and the operation panel 26 is electrically connected to the controller 200 via a cable 82. On the other hand, the Bluetooth circuit 21 is electrically connected to the controller 200 via a cable 80. Each of the NFC circuit 23 and the Bluetooth circuit 21 implements the respective functions by being controlled by a program which is executed by the controller 200.

<Detection Area>

Figure 13A:
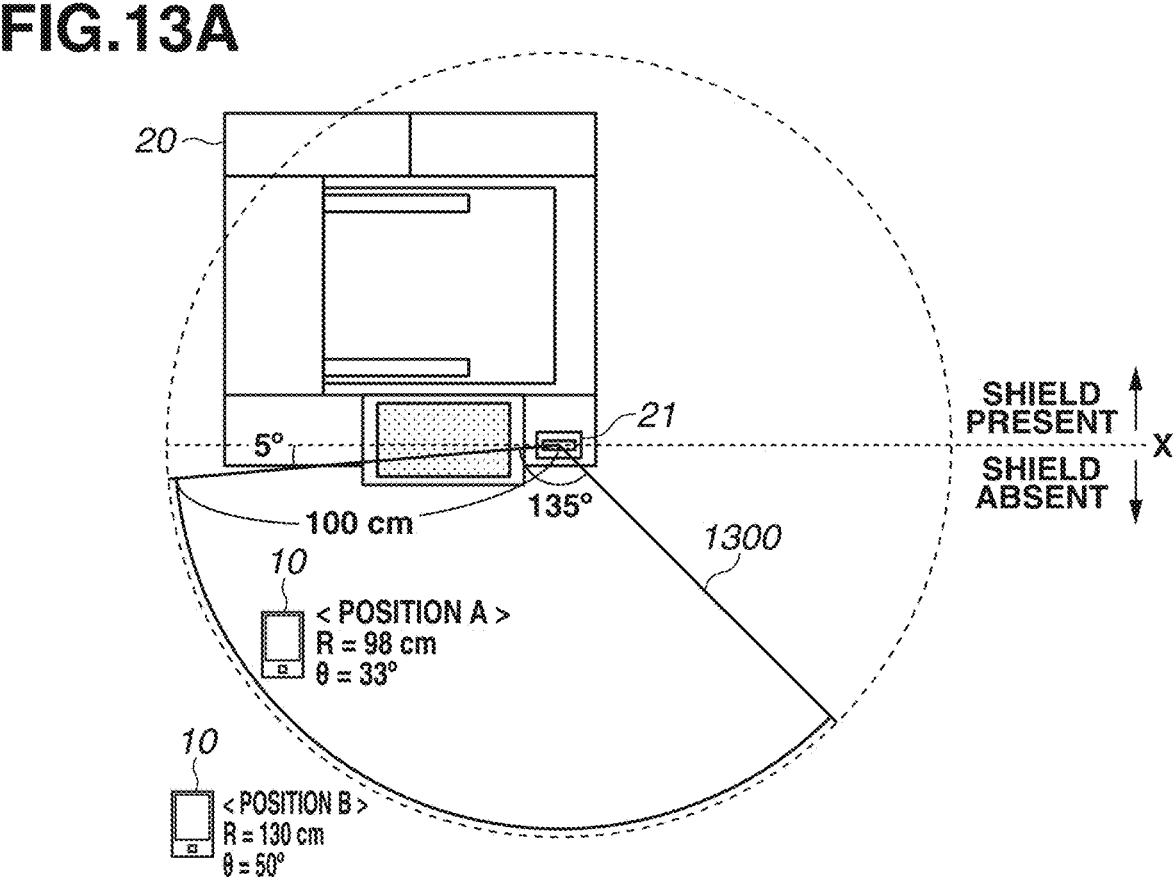
FIG. 13A is a diagram used to explain a communication establishment region in the first exemplary embodiment.

A detection area (communication establishment region) in the first exemplary embodiment is described. FIG. 13A is a diagram used to explain a communication establishment region in the first exemplary embodiment. In the case of intending to define a communication establishment region by only distance information that is based on the radio field intensity, as in conventional art, the communication establishment region becomes a circular range centering on the Bluetooth circuit 21. This circular range is expressed as a circle shown by a dashed line. The circle shown by a dashed line is formed at a position at a distance of about 100 cm from the Bluetooth circuit 21. On the other hand, a communication establishment region 1300 in the first exemplary embodiment is expressed as a region surrounded by a sectoral solid line. Threshold values for the range of such a region are expressed as follows. For example, these threshold values are assumed to be previously registered with a cooperation application. Furthermore, these threshold values can be managed on the side of the image forming apparatus 20 and then be transmitted to the portable communication terminal 10 while being included in the above-mentioned scan response.

$$R \leq 100 \text{ cm, and } 5° \leq \theta \leq 135°$$

Thus, the first exemplary embodiment is configured to narrow the communication establishment region down to a specific direction by using not only distance information that is based on the radio field intensity but also angle information which is obtained based on radio waves emitted from a plurality of antennas. In this way, limiting the communication establishment region enables preventing or reducing the unintended occurrence of communication establishment.

<Usage Sequence>

Figure 9:
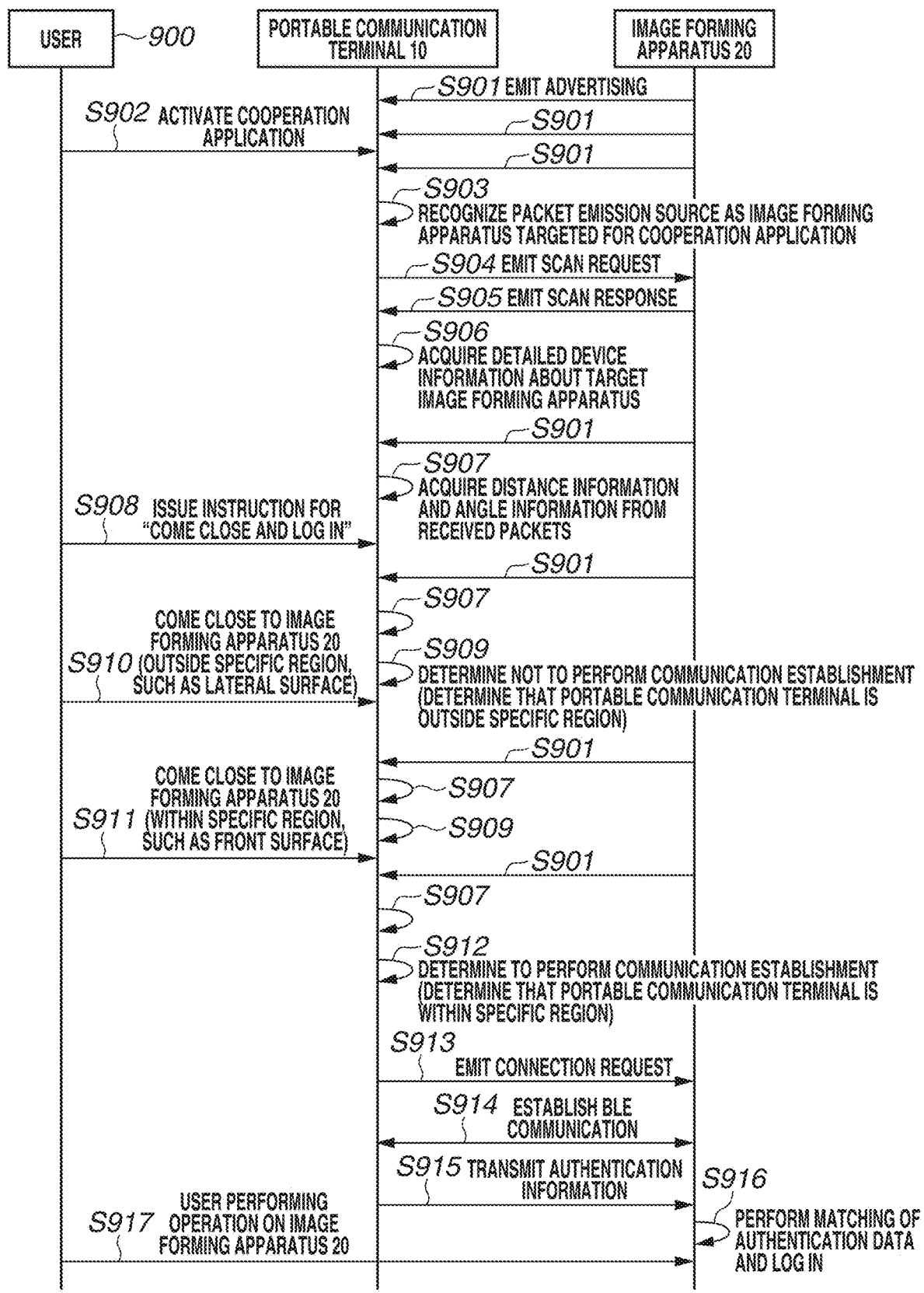
FIG. 9 is a diagram illustrating the entire flow of respective operations of the user, the portable communication terminal, and the image forming apparatus in the first exemplary embodiment.

First, the flow of usage of the system described in the first exemplary embodiment is described. FIG. 9 is a diagram illustrating the entire flow of the respective operations of the user 900, the portable communication terminal 10, and the image forming apparatus 20 in the first exemplary embodiment. Here, the entire flow is described, and details of the processing are described with reference to the processing flowcharts of FIG. 9 and FIG. 10. FIG. 9 is used to describe a case where setting of the function "come close and log in" has been performed as an example.

A state in which the user 900, who carries the portable communication terminal 10, stands at a position away from the image forming apparatus 20 is premised. In this state, in step S901, the image forming apparatus 20 continues to periodically emit advertising packets until implementing establishment of BLE communication (communication establishment). In step S902, the user 900, which wants to cause the image forming apparatus 20 and the portable communication terminal 10 to cooperate with each other, operates the portable communication terminal 10 to issue an activation instruction for the cooperation application. The portable communication terminal 10 activates the cooperation application in response to the activation instruction. When the cooperation application is activated, the portable communication terminal 10 becomes able to respond to advertising packets emitted from the image forming apparatus 20.

Figure 21A:
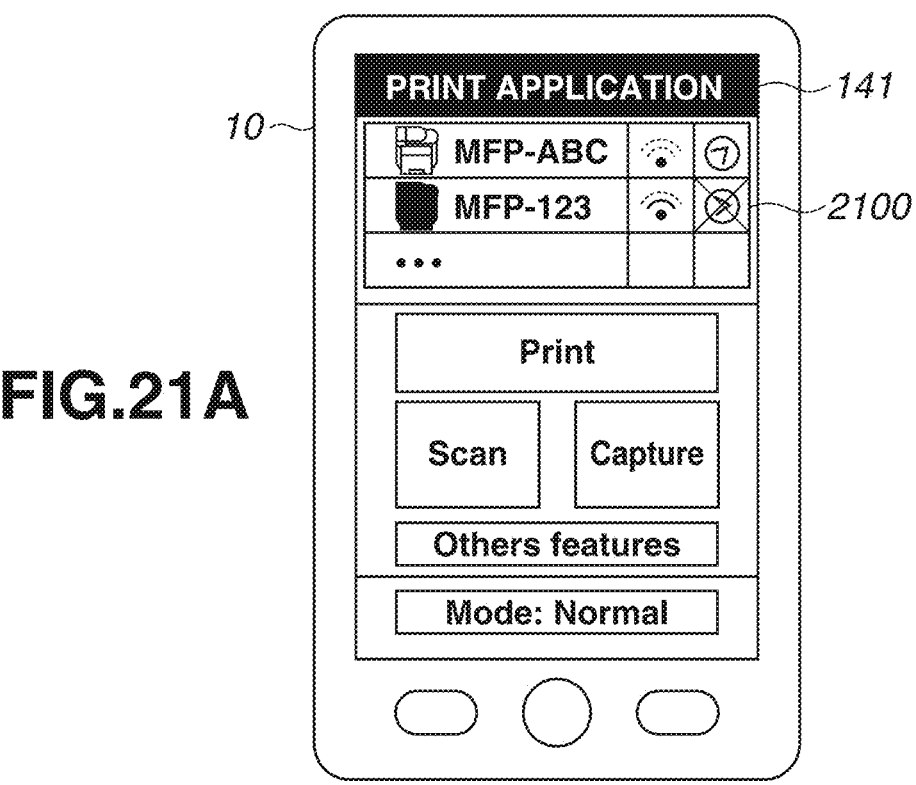
FIGS. 21A, 21B, 21C, 21D, 21E, and 21F are diagrams illustrating examples of screens each of which is displayed on the portable communication terminal.

Furthermore, in a state in which the cooperation application is activated, a screen for the cooperation application is displayed on the display 141 of the portable communication terminal 10. FIGS. 21A, 21B, 21C, 21D, 21E, and 21F are diagrams illustrating examples of screens each of which is displayed on the portable communication terminal 10. FIG. 21A illustrates a top screen for the cooperation application, which is a screen used for selecting a function to be effected in cooperation with the image forming apparatus 20. The user is allowed to select a desired function, such as print or scan, via the top screen. Moreover, the user is allowed to designate a device selection function from among other features, thus causing the portable communication terminal 10 to display a device selection screen 2101 illustrated in FIG. 21B.

Figure 21B:
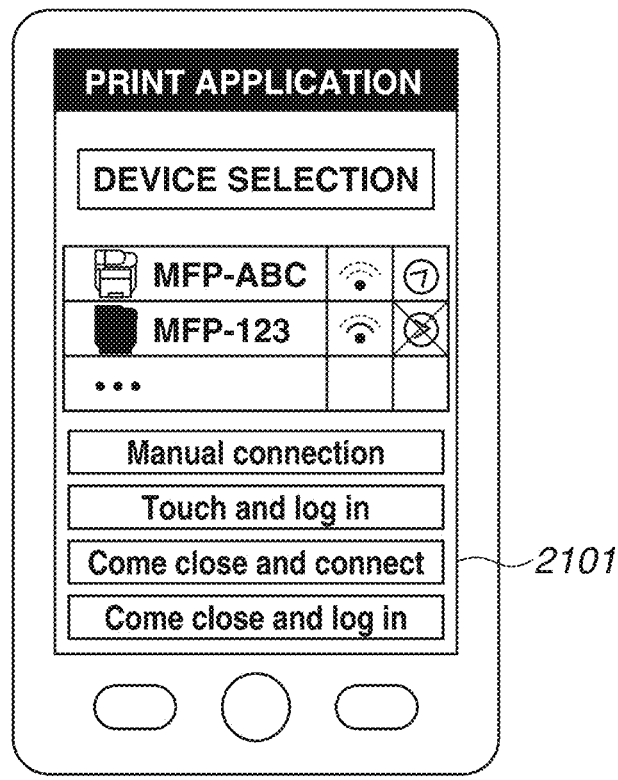
Figure 21C:
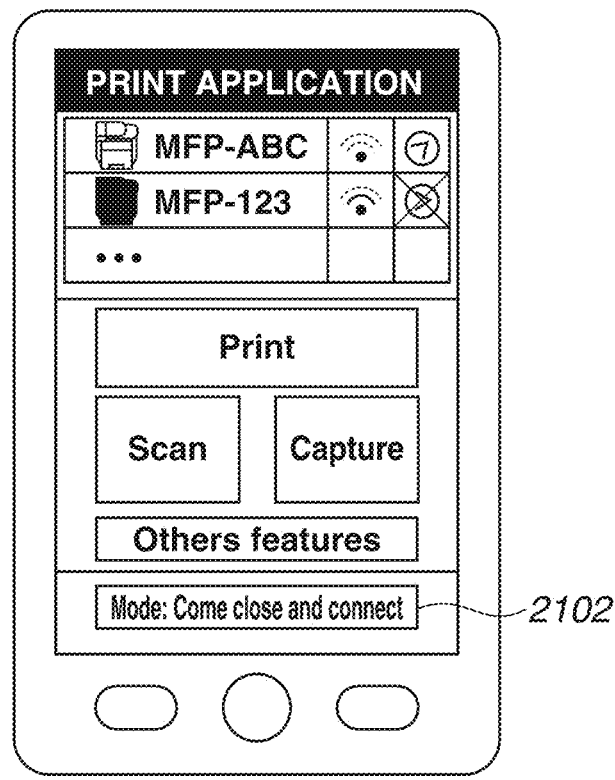
Figure 21D:
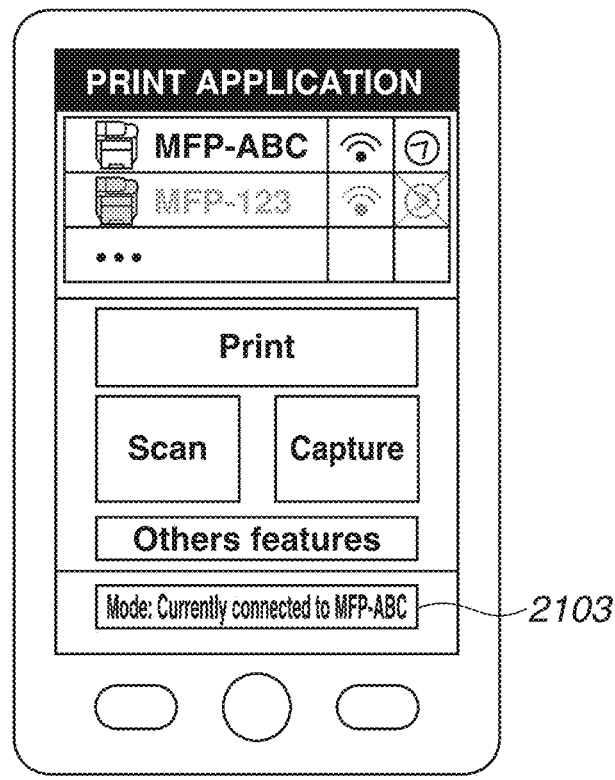

Referring to FIG. 21B, in the device selection screen 2101, there are located a button used for performing a function "manual connection", a button used for performing a function "touch and log in", a button used for performing a function "come close and connect", and a button used for performing a function "come close and log in". The function "manual connection" is a function of selecting a device from a device list on the screen, performing a Bluetooth communication establishment procedure, and exchanging wireless LAN connection information via Bluetooth communication, thus establishing wireless LAN communication (Wi-Fi direct communication).

The function "touch and log in" is a function of causing the portable communication terminal 10 to touch (come close to) the target mark of the image forming apparatus 20, performing a Bluetooth communication establishment procedure, and exchanging user authentication information via Bluetooth communication. This enables logging in to the image forming apparatus 20.

The function "come close and connect" is a function of coming close to a distance of about 100 cm from the image forming apparatus 20, performing a Bluetooth communication establishment procedure, and exchanging wireless LAN connection information via Bluetooth communication. This enables establishing wireless LAN communication (Wi-Fi direct communication).

The function "come close and log in" is a function of coming close to a distance of about 100 cm from the image forming apparatus 20, performing a Bluetooth communication establishment procedure, and exchanging user authentication information via Bluetooth communication, thus logging in to the image forming apparatus 20.

When, in step S901, receiving advertising packets emitted from the image forming apparatus 20 in a state in which the cooperation application is activated, then in step S903, the portable communication terminal 10 recognizes the received advertising packets as packets received from a cooperation target apparatus. Then, in step S904, the portable communication terminal 10 emits a scan request to the image forming apparatus 20, and, in step S905, receives a scan response from the image forming apparatus 20. As a result, in step S906, the portable communication terminal 10 acquires detailed device information about the image forming apparatus 20. Then, the portable communication terminal 10 displays a list of apparatuses available for Bluetooth cooperation based on the detailed device information. Additionally, when, in step S901, receiving advertising packets, then in step S907, the portable communication terminal 10 acquires distance information and angle information from information obtained at the time of acquisition of the advertising packets. Then, the portable communication terminal 10 uses these pieces of information to display, in the screen 2100, information about, for example, the radio field intensity, the direction detection state, and the direction detection corresponding state, and updates displaying of such information as needed.

After that, when, in step S908, the user 900 selects the function "come close and log in" in the device selection screen 2101, the portable communication terminal 10 switches to a mode of determining a connection destination device based on the distance information and angle information.

In this mode, in step S907, the portable communication terminal 10 acquires position information about the portable communication terminal 10 with respect to the image forming apparatus 20 from distance information and angle information calculated from the advertising packets. Then, the portable communication terminal 10 determines whether the portable communication terminal 10 itself is situated within a detection area in which the portable communication terminal 10 starts cooperation, based on the acquired position information.

In a case where the user 900 is situated at an initial position, the portable communication terminal 10 is sufficiently away from the image forming apparatus 20 and, therefore, in step S909, determines that the portable communication terminal 10 is situated outside the communication establishment region 1300. Moreover, in a case where, in step S910, the user 900 has moved to the lateral surface side or back surface side of the image forming apparatus 20, since the angle is not appropriate, then in step S909, the portable communication terminal 10 determines that the portable communication terminal 10 is situated outside the communication establishment region 1300. On the other hand, in a case where the user 900 has come close to the front surface of the image forming apparatus 20, since the angle and distance are appropriate, then in step S912, the portable communication terminal 10 determines that the portable communication terminal 10 is situated within the communication establishment region 1300.

In a case where the portable communication terminal 10 has become situated within the communication establishment region 1300, then in step S913 and step S914, the portable communication terminal 10 emits a connection request to the image forming apparatus 20 and establishes BLE communication. Upon establishment of BLE communication, in step S915, the portable communication terminal 10 transmits authentication information used for performing the function "come close and log in" to the image forming apparatus 20. Upon receiving the authentication information, in step S916, the image forming apparatus 20 performs matching of authentication data and, if successful, executes a login procedure. In step S917, the user 900, who has been logged in, is allowed to operate the image forming apparatus 20 depending on the authenticated authority. Thus far is the entire flow in the first exemplary embodiment.

<Control Flow for Image Forming Apparatus>

Figure 11:
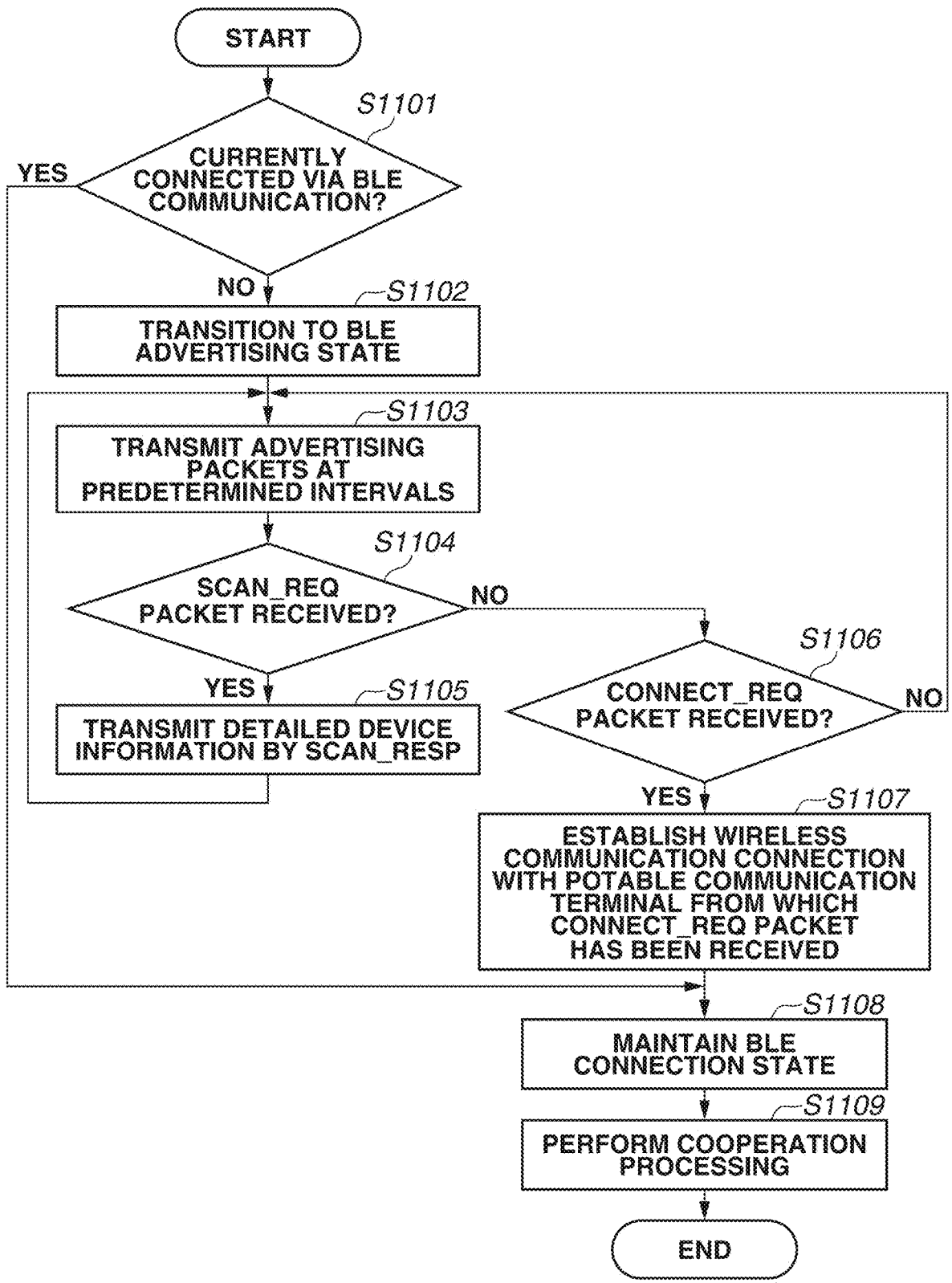
FIG. 11 is a flowchart illustrating processing which the image forming apparatus performs.

To implement the above-described entire flow, the image forming apparatus 20 performs control illustrated in the flowchart of FIG. 11. FIG. 11 is a flowchart illustrating processing which the image forming apparatus 20 performs. Furthermore, the control illustrated in this flowchart is executed by the controller 200. Specifically, the above-mentioned control is implemented by the CPU 202 loading a program stored in the ROM 206 onto the RAM 205 and executing the program.

First, in step S1101, the controller 200 determines whether the Bluetooth circuit 21 of the image forming apparatus 20 is in a connection state. If it is determined that the portable communication terminal 10 is already in a BLE connection state (YES in step S1101), without transmitting advertising packets, the controller 200 advances the processing to step S1108, in which the controller 200 maintains the BLE connection state. In the first exemplary embodiment, the image forming apparatus 20 is connected as a slave. Therefore, here, the image forming apparatus 20 should not perform broadcast transmission of advertising packets. On the other hand, if it is determined that there is no portable communication terminal 10 which is in a BLE connection state (NO in step S1101), the controller 200 advances the processing to step S1102.

In step S1102, the controller 200 controls the Bluetooth circuit 21 to perform transition to an advertising state. In the advertising state, in step S1103, the image forming apparatus 20 performs broadcast transmission of advertising packets with a predetermined period. This state is referred to as an advertising state. The advertising state is a waiting state in which the image forming apparatus 20 waits for reception of a connection request from the portable communication terminal 10. In the advertising state, the Bluetooth circuit 21 emits packets while switching between a plurality of BLE antennas 45 to 48. Packet emission operations performed four times by such four antennas are treated as one set of advertising packet emission.

In step S1104, the controller 200 determines whether a SCAN_REQ packet serving as a response to the advertising packets has been received. If it is determined that the SCAN_REQ packet has been received (YES in step S1104), the controller 200 advances the processing to step S1105, and, if it is determined that no SCAN_REQ packet has been received (NO in step S1104), the controller 200 advances the processing to step S1106.

In step S1105, the controller 200 transmits data of SCAN_RESP in response to SCAN_REQ. The data of SCAN_RESP includes device information such as model name, color or monochrome, and paper handling. Moreover, the data of SCAN_RESP also includes information about, for example, an interval d between a plurality of antennas and the wavelength $\lambda$, of a radio wave required to implement the direction detection function in Bluetooth 5.1.

In step S1106, the controller 200 determines whether a CONNECT_REQ packet has been received. If it is determined that no CONNECT_REQ packet has been received (NO in step S1106), the controller 200 returns the processing to step S1103, thus continuing to transmit advertising packets. If it is determined that the CONNECT_REQ packet has been received (YES in step S1106), the controller 200 advances the processing to step S1107.

In step S1107, the controller 200 performs negotiation processing with a portable communication terminal 10 from which a connection request has been received. Then, the controller 200 transitions to a connection state to establish BLE communication, thus completing communication establishment.

In step S1108, the controller 200 maintains BLE communication in which communication establishment is completed. In step S1109, the controller 200 performs cooperation processing with the portable communication terminal 10 using Bluetooth communication. Then, the controller 200 ends a series of operations of the processing.

<Control Flow for Portable Communication Terminal>

Figure 10:
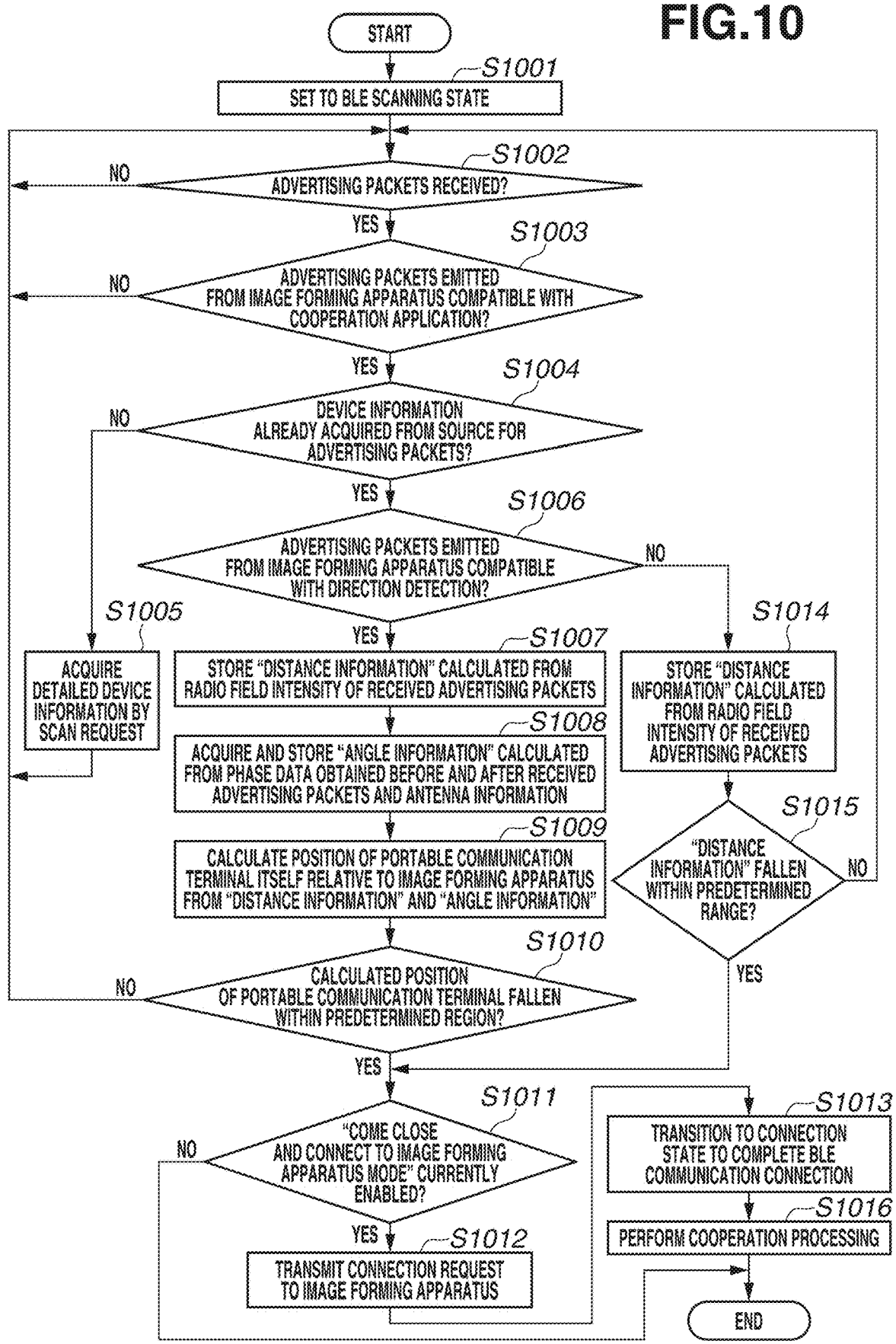
FIG. 10 is a flowchart illustrating processing which the portable communication terminal in the first exemplary embodiment performs.

To implement the above-described entire flow, the portable communication terminal 10 performs control illustrated in the flowchart of FIG. 10. FIG. 10 is a flowchart illustrating processing which the portable communication terminal 10 performs in the first exemplary embodiment. Furthermore, the control illustrated in this flowchart is performed by the controller 100. Specifically, the above-mentioned control is implemented by the CPU 101 loading a program stored in the ROM 104 onto the RAM 103 and executing the program. Furthermore, the program which is executed by the CPU 101 is a program for a cooperation application installed on the portable communication terminal 10.

When the cooperation application is activated, in step S1001, the controller 100 sets the Bluetooth circuit 11 to a scanning state.

In step S1002, the controller 100 waits for advertising packets emitted from another BLE-compliant device to be received by the Bluetooth circuit 11, which has been set to a scanning state. The advertising packets are being emitted in a broadcast manner from the image forming apparatus 20 as illustrated in FIG. 7. Upon receiving advertising packets (YES in step S1002), the controller 100 advances the processing to step S1003.

In step S1003, the controller 100 determines whether an emission source for the received advertising packets is an apparatus compliant with the cooperation application. The advertising packets are radio waves standardized to be able to be used by various apparatuses and, therefore, may be received from an apparatus not compliant with the cooperation application. Therefore, it is desirable that the controller 100 perform processing for making a discrimination of the emission source for advertising packets.

The discrimination is performed with use of data included in advertising packets. Examples of the data included in advertising packets include an address used for discriminating an advertiser, a UUID, or an identifier discriminable by the cooperation application embedded as optional data. Using such data enables discriminating an image forming apparatus 20 which is an apparatus capable of performing cooperation using the cooperation application.

In step S1004, the controller 100 determines whether detailed device information has already been acquired from the emission source for advertising packets. If it is determined that the device information has not yet been acquired (NO in step S1004), the controller 100 advances the processing to step S1005, and, if it is determined that that the device information has already been acquired (YES in step S1004), the controller 100 advances the processing to step S1006.

In step S1005, the controller 100 transmits, to the image forming apparatus 20, a SCAN_REQ packet in reply to the received advertising packets, thus requesting further detailed information about the image forming apparatus 20. Then, since the image forming apparatus 20 transmits data of SCAN_RESP as a response to the SCAN_REQ packet, the controller 100 acquires the data of SCAN_RESP. The SCAN_RESP includes device information about the image forming apparatus 20. The device information includes, in addition to the functions and status of the image forming apparatus 20, for example, an interval d between a plurality of antennas and the wavelength λ, of a radio wave. These pieces of data are optional data of the coded form. The acquired optional data can be used as information used for monitoring various functions of a device in a device list screen such as the screen 2100. The acquired device information is then stored in the RAM 103 of the portable communication terminal 10, and is used for, for example, calculation of the angle of emission for BLE communication of the image forming apparatus 20. Moreover, the acquired device information can be stored in the ROM 104 or the storage 105 in such a way as to be able to be called up later.

Furthermore, code to be embedded as optional data can be created in any method as long as matching is able to be established between the image forming apparatus 20 and the portable communication terminal 10. Moreover, in a case where target code is added as optional data due to an increase in, for example, new models, a mechanism of, for example, taking measures in such a way as to be able to make a discrimination by updating of the cooperation application or performing matching on a network server can be adopted.

In step S1006, the controller 100 acquires, from the acquired device information, a discrimination result indicating whether the image forming apparatus 20 is compatible with the direction detection function in Bluetooth 5.1. The discrimination result can be acquired from a result obtained by performing matching on device information or can be acquired from a result obtained by the Bluetooth circuit 11 discriminating a Bluetooth-compliant version included in packets. If it is determined that the image forming apparatus 20 is compatible with the direction detection function (YES in step S1006), the controller 100 advances the processing to step S1007. If it is determined that the image forming apparatus 20 is not compatible with the direction detection function (NO in step S1006), the controller 100 advances the processing to step S1014.

In step S1007, the controller 100 calculates a distance from the radio field intensity of the received advertising packets and stores the distance as distance information. Specifically, the controller 100 acquires, as radio field intensity information, the value of RSSI (dBm) which is the reception radio field intensity obtained when advertising packets have been received, and inputs the acquired value to a conversion table (LUT) for conversion into an actual distance, thus acquiring distance information R (cm). The acquired distance information is then stored in the RAM 103 of the portable communication terminal 10, and is used for calculation of positional information about the portable communication terminal 10 itself relative to the image forming apparatus 20.

In step S1008, the controller 100 calculates the angle of emission θ by the method described with reference to FIG. 6 based on the received advertising packets. The controller 100 stores the angle of emission θ of a radio wave emitted from the image forming apparatus 20 as angle information. The acquired angle information is then stored in the RAM 103 of the portable communication terminal 10, and is used for calculation of positional information about the portable communication terminal 10 itself with respect to the image forming apparatus 20.

In step S1009, the controller 100 calculates at which position the portable communication terminal 10 itself, which is executing the cooperation application, is located relative to the image forming apparatus 20 from the distance R and the angle of emission θ. In step S1010, the controller 100 determines whether the position expressed by the distance R and the angle of emission θ has fallen within a previously-set predetermined region. For example, in a case where the portable communication terminal 10 is located at a position A illustrated in FIG. 13A, the position expressed by the distance R and the angle of emission θ becomes R=98 cm and θ=33°. Since this position is within a threshold value (YES in step S1010), the controller 100 advances the processing to step S1011 to execute communication establishment. Moreover, in a case where the portable communication terminal 10 is located at a position B illustrated in FIG. 13A, the position expressed by the distance R and the angle of emission θ becomes R=130 cm and θ=50°. Since this position is outside the threshold value (NO in step S1010), the controller 100 returns the processing to step S1002 without executing communication establishment.

In step S1011, the controller 100 determines whether "come close and connect type mode" is currently enabled. Furthermore, "come close and connect type mode" mentioned here is a mode with a concept comprehensively including the function "come close and connect", the function "touch and log in", and the function "come close and log in". Moreover, "connect" mentioned here refers to BLE communication being established as communication.

In step S1012, the controller 100 controls and causes the Bluetooth circuit 11 to transmit a connection request (CONNECT_REQ) to the Bluetooth circuit 21 of the image forming apparatus 20 targeted for connection.

In step S1013, the controller 100 performs negotiation processing with the image forming apparatus 20. This causes the Bluetooth circuit 11 to transition to a connection state in which BLE communication is allowed, thus completing communication establishment.

In step S1016, the controller 100 performs cooperation processing with the image forming apparatus 20 with use of Bluetooth communication. Then, the controller 100 ends a series of operations of the processing.

As described above, the portable communication terminal 10 and the image forming apparatus 20 are mutually compatible with the direction detection function in Bluetooth 5.1, entering a specific region in the above-mentioned way enables implementing communication establishment for BLE communication. On the other hand, in a case where a communication of the version not compatible with the specifications of Bluetooth 5.1 is used, it is not possible to perform detection of a communication establishment region using a combination of distance information and angle information. In this case (NO in step S1006), the controller 100 performs processing in step S1014 and subsequent steps to perform conventional detection using only distance information.

In step S1014, as with step S1007, the controller 100 calculates a distance from the radio field intensity of the received advertising packets and stores the calculated distance as distance information. In this flow, the controller 100 is unable to treat angle information. Therefore, the controller 100 uses the calculated distance information to detect a range concentrically extending from the Bluetooth circuit 21.

In step S1015, the controller 100 determines whether the distance information has fallen within a predetermined range. If it is determined that the distance information has not fallen within the predetermined range (NO in step S1015), the controller 100 maintains the scanning state and returns the processing to step S1002. If it is determined that the distance information has fallen within the predetermined range (YES in step S1015), the controller 100 advances the processing to step S1011 to perform a procedure for communication establishment.

<Cooperation Processing>

Cooperation processing which the image forming apparatus 20 and the portable communication terminal 10 perform in step S1109 and step S1016, respectively, is described. As illustrated in, for example, FIG. 21A or 21B, the portable communication terminal 10 is able to use various cooperation functions using the cooperation application.

As a function in common with various functions, there is a power return function of the image forming apparatus 20. If, in a normal power state (standby state), the image forming apparatus 20 does not receive a user operation or an execution job during a predetermined time, the image forming apparatus 20 transitions to a power saving state (sleep state). The power saving state is a state which is lower in power consumption than the normal power state. In the power saving state, a part or the whole of electric power supply to the operation panel 26 is stopped, so that, for example, a backlight of the display 262 is turned off. Here, in the power saving state, electrical power supply to the Bluetooth circuit 21 is assumed not to be stopped. If communication establishment for BLE communication is completed with respect to the image forming apparatus 20, which is currently in the power saving state, the image forming apparatus 20 transitions (returns) from the power saving state to the normal power state.

In a case where the function "come close and log in" or "touch and log in" is used out of various functions, exchange of authentication is performed via BLE communication. Specifically, first, the portable communication terminal 10 transmits authentication information about a previously-registered user (for example, a user ID and a password) to the image forming apparatus 20 via BLE communication. Upon verifying registration information corresponding to the received authentication information, the image forming apparatus 20 manages user information associated with the registration information as logged-in user information, and makes a part or all of the functions included in the image forming apparatus 20 available based on user information about the logged-in user. For example, if login is successful, the login screen transitions to the menu screen, so that an operation on the menu screen is enabled. Furthermore, a configuration in which authentication processing is performed by the server 300 can be employed.

In a case where, for example, the function "print", "scan", or "come close and connect" is used out of various functions, exchange of wireless LAN connection information is performed via BLE communication, so that processing for switching wireless communication from BLE communication to wireless LAN communication (handover processing) is performed. Furthermore, while, to perform establishment of BLE communication, a notification for bringing the portable communication terminal 10 close to the image forming apparatus 20 is issued, such a notification can be issued before reception of an execution instruction for each of the various functions or can be issued after reception of an execution instruction for each of the various functions.

Specifically, first, the portable communication terminal 10 transmits a handover request (a request for switching of wireless communication) to the image forming apparatus 20 via BLE communication. Upon receiving the request, the image forming apparatus 20 transmits, to the portable communication terminal 10, connection information used for connecting to the wireless LAN circuit 22 (for example, an Internet Protocol (IP) address, a service set identifier (SSID), and a password). Upon receiving the connection information, the portable communication terminal 10 performs switching of settings based on the connection information, and transmits a request for establishment of connection from the wireless LAN circuit 12 to the wireless LAN circuit 22. The wireless LAN circuit 22 performs a procedure in response to the request for establishment of connection, so that wireless LAN communication is established.

After establishment of wireless LAN communication, for example, a print function (printing function), which transmits, from the portable communication terminal 10, print data to be printed to the image forming apparatus 20, is executed. Furthermore, the print function can include a function in which the portable communication terminal 10 issues an instruction for starting printing of print data transmitted from the client terminal 400 to the image forming apparatus 20 and then stored in the image forming apparatus 20. Moreover, the print function can also include a function in which the portable communication terminal 10 issues an instruction for starting processing for downloading print data stored in the server 300 to the image forming apparatus 20 and printing the print data.

Moreover, after establishment of wireless LAN communication, for example, a scan function (reading function), which transmits, to the portable communication terminal 10, an image read from an original by the image forming apparatus 20, is executed. Furthermore, the scan function can include a function in which the portable communication terminal 10 issues an instruction for starting processing for uploading an image read from an original by the image forming apparatus 20 to the server 300 or the client terminal 400.

Moreover, after establishment of wireless LAN communication, for example, a confirmation function in which the portable communication terminal 10 acquires and confirms status information (toner remaining amount information, error information, print count information, and electric power information), setting information (print setting and scan setting), and screen information about the image forming apparatus 20 is executed. The confirmation function can be implemented by a method in which the portable communication terminal 10 accesses a web server provided by the image forming apparatus 20, acquires web page information from the web server, and displays the web page information by a browser function of the cooperation application, or a method in which such web page information is communicated to a browser application included in the portable communication terminal 10. In that case, the portable communication terminal 10 performs processing for acquiring Uniform Resource Locator (URL) information about a web server provided by the image forming apparatus 20 in a process for any one of BLE communication and wireless LAN communication.

<Remarks>

As described above, the first exemplary embodiment determines the timing of start of communication establishment for BLE communication between the portable communication terminal 10 and the image forming apparatus 20 based on the angle of emission and radio field intensity of advertising packets which the image forming apparatus 20 emits. Using the angle of emission and radio field intensity enables the portable communication terminal 10 having entered a specific region such as the communication establishment region 1300 to automatically proceed with a procedure for communication establishment (communication establishment in BLE).

Particularly, the first exemplary embodiment uses the angle of emission of an advertising packet to narrow down a region based on which to start communication establishment. Therefore, the first exemplary embodiment is able to distinguish between a region based on which to perform communication establishment and a region based on which not to perform communication establishment even if the distances thereof from an antenna are the same. This enables avoiding mistakenly performing communication establishment with a portable communication terminal carried by a user who has come close to the lateral surface side or back surface side of the image forming apparatus 20.

Furthermore, in the description of step S908, the function "come close and log in" is taken as an example, but can be replaced with the function "come close and connect" or "touch and log in".

Moreover, the first exemplary embodiment is able to prevent or reduce careless communication establishment with the image forming apparatus 20 and, therefore, enables preventing or reducing the occurrence of a situation in which the image forming apparatus 20 accidentally recovers from a power saving state and thus wastes electric power.

Moreover, the first exemplary embodiment is able to prevent or reduce careless communication establishment with the image forming apparatus 20 and, therefore, enables preventing or reducing the occurrence of a situation in which the maximum number of devices allowed to simultaneously perform BLE communication or the maximum number of devices allowed to simultaneously perform wireless direct communication is carelessly reached.

Moreover, the first exemplary embodiment is able to prevent or reduce careless login to the image forming apparatus 20 and, therefore, enables preventing or reducing the occurrence of a situation in which, while a user is operating the image forming apparatus 20, another user carelessly logs in and thus causes an erroneous operation.

On the assumption of the above-described basic configuration, a second exemplary embodiment is described as a specific example. The second exemplary embodiment is characterized in that the Bluetooth circuit 21 is located on the back surface side (a side opposite to the front surface) of the image forming apparatus 20 and a detection area (communication establishment region) limited in angle and distance which is in the vicinity of a specific position on the front surface side of the image forming apparatus 20 is used. Thus, in the second exemplary embodiment, a method in which the Bluetooth circuit 21 does not need to be located at a nearby position which defines a detection area is described.

Furthermore, configurations and processing operations in the second exemplary embodiment are partially in common with the configurations and processing operations described in the first exemplary embodiment. Therefore, similar configurations and processing operations are assigned the respective same reference characters and the detailed description thereof is omitted here.

<Antenna Arrangement>

It is desirable that the Bluetooth circuit 21 be located at a position most appropriate in consideration of, for example, radio properties in such a way as to satisfy a condition of use of a function to be implemented. In a case where various conditions are considered, the vicinity of the operation panel 26 on the front surface side of the image forming apparatus 20 such as that described in the first exemplary embodiment may not be necessarily an optimum position.

Figure 14A:
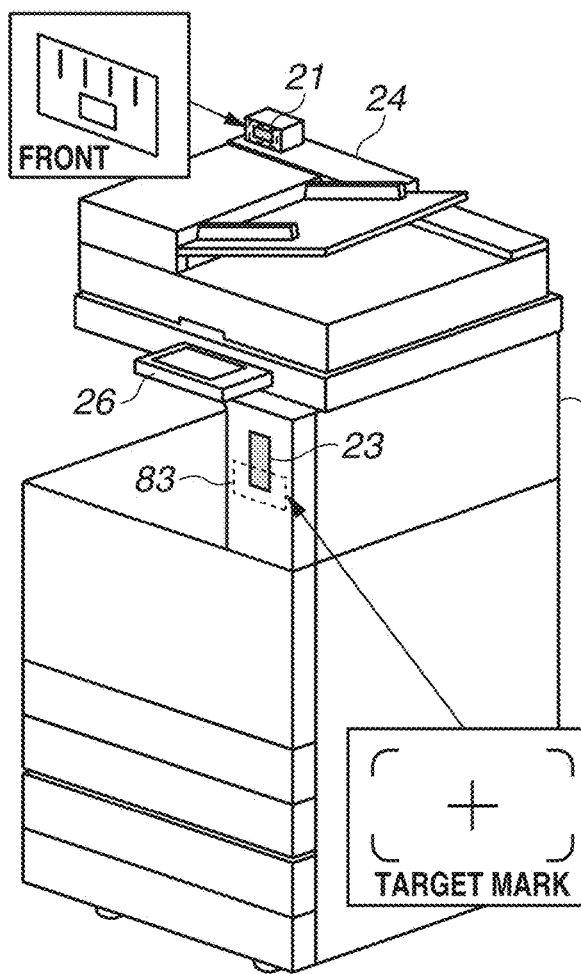
FIG. 14A is a diagram illustrating an image forming apparatus in each of a second exemplary embodiment and a third exemplary embodiment as viewed from diagonally forward right.
Figure 14B:
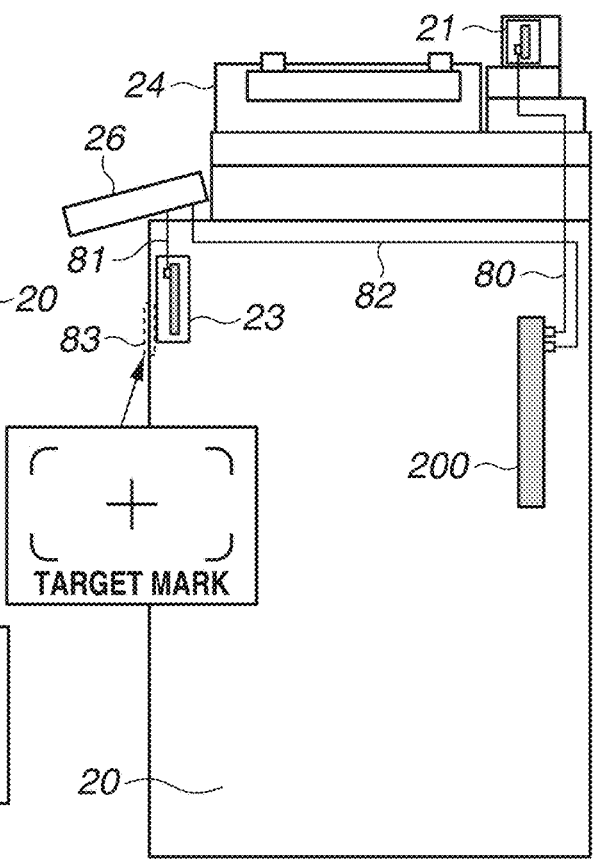
FIG. 14B is a diagram illustrating the image forming apparatus in each of the second exemplary embodiment and the third exemplary embodiment as viewed from right lateral side.
Figure 14C:
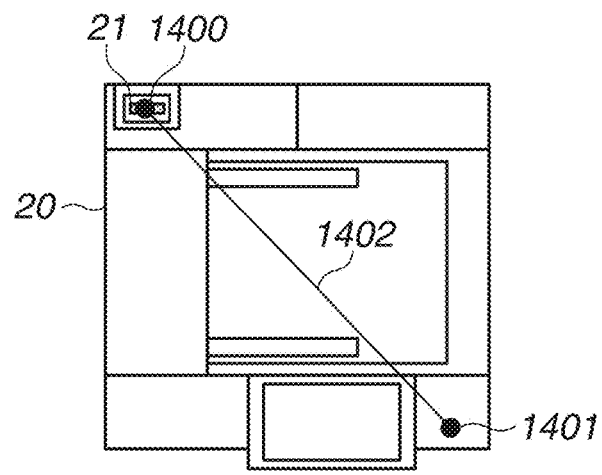
FIG. 14C is a diagram illustrating the image forming apparatus in each of the second exemplary embodiment and the third exemplary embodiment as viewed from upper side.

In the second exemplary embodiment, the Bluetooth circuit 21 is located at a position illustrated in FIGS. 14A, 14B, and 14C as a position favorable in terms of radio property. FIG. 14A is a diagram illustrating an image forming apparatus 20 in each of the second exemplary embodiment and a third exemplary embodiment as viewed from diagonally forward right. FIG. 14B is a diagram illustrating the image forming apparatus 20 in each of the second exemplary embodiment and the third exemplary embodiment as viewed from right lateral side. FIG. 14C is a diagram illustrating the image forming apparatus 20 in each of the second exemplary embodiment and the third exemplary embodiment as viewed from upper side. As illustrated in FIG. 14C, the Bluetooth circuit 21 is located at a position near the back surface side of the image forming apparatus 20. This position is referred to a "physical position 1400". On the other hand, the second exemplary embodiment performs control such that the center of a specific region based on which to perform communication establishment for BLE communication is set to a position near the front surface side of the image forming apparatus 20. This position is referred to a "virtual position 1401". The physical position 1400 and the virtual position 1401 are arranged in a positional relationship expressed by a width across corners 1402. Furthermore, the NFC circuit 23 is assumed to be located at a position similar to that illustrated in FIGS. 8A and 8B, and the target mark 83 is also assumed to be located at a position similar to that illustrated in FIGS. 8A and 8B.

<Detection Area>

The second exemplary embodiment, as with the first exemplary embodiment, uses a distance R detected by the radio field intensity and the angle of emission θ detected by direction detection, which are calculated centering on the physical position 1400 of the Bluetooth circuit 21 of the image forming apparatus 20. The second exemplary embodiment uses, in addition to the distance R and the angle of emission θ, an LUT and threshold value information associated with a communication establishment region centering on the virtual position 1401.

Figure 15A:
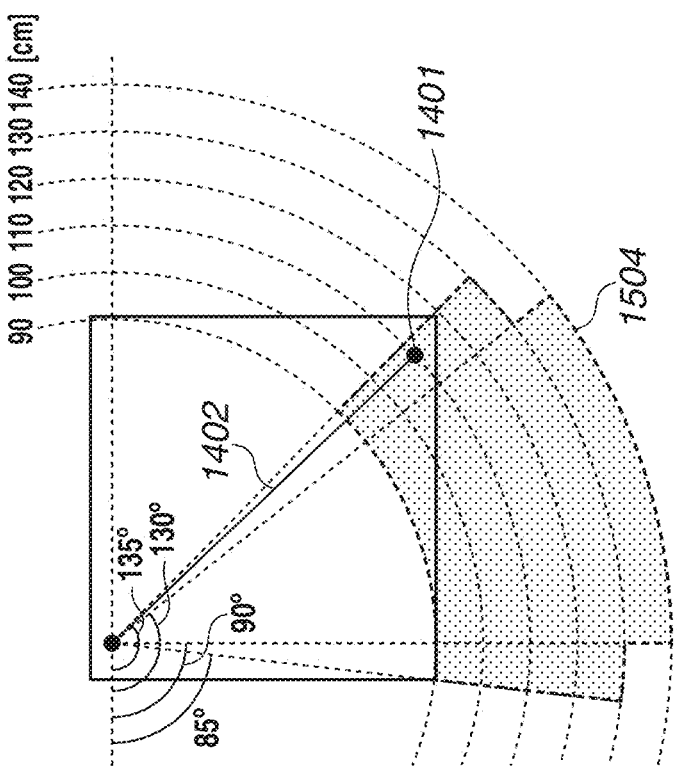
FIG. 15A is a diagram used to explain a communication establishment region in the second exemplary embodiment.

In the second exemplary embodiment, in a case where the function "touch and log in" has been selected, a region 1503 illustrated in FIG. 15A serves as a communication establishment region. Furthermore, in FIG. 15A, each circle expressed by a dashed line indicates a distance centering on the Bluetooth circuit 21 and calculated from the radio field intensity for descriptive purposes. The communication establishment region 1503 is a region in which the calculated distance R and the calculated angle of emission θ take values satisfying 110 cm≤R≤120 cm and 125°≤θ≤135°. Furthermore, this region is a region defined based on the virtual position 1401. Specifically, the communication establishment region 1503 is defined as a region which becomes "+0 cm to +10 cm" and "−8° to +2°" based on the virtual position 1401. Here, since the distance from the physical position 1400 to the virtual position 1401 is 110 cm and the angle of the virtual position 1401 relative to the physical position 1400 is 133°, the communication establishment region 1503 becomes a region illustrated in FIG. 15A. FIG. 15A is a diagram used to explain a communication establishment region for use in the second exemplary embodiment. When the portable communication terminal 10 has entered the communication establishment region 1503, communication using BLE is established. Since the communication establishment region 1503 is a region which overlaps the position of the target mark 83, when the user brings the portable communication terminal 10 close to the position of the target mark 83 in such a way as to touch the target mark 83, communication in BLE is established. In this way, using the distance information R and the angle information θ to limit a specific region to a region near the target mark 83 enables the target mark 83 for the NFC circuit 13 to be also used as a position targeted for touching. With this setting, even in a case where the user uses a wireless communication of any one of the BLE and NFC standards, the user is enabled to use the wireless communication with the same sense of use.

Figure 15B:
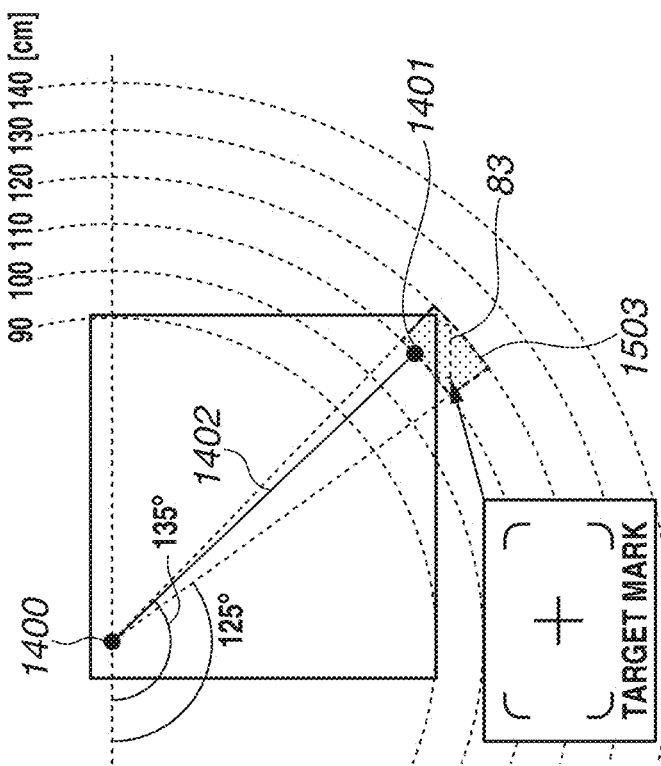
FIG. 15B is a diagram used to explain a communication establishment region in a modification example of the second exemplary embodiment.

In the second exemplary embodiment, in a case where the function "come close and log in" has been selected, a region 1504 illustrated in FIG. 15B serves as a communication establishment region. Furthermore, in FIG. 15B, each circle expressed by a dashed line indicates a distance centering on the Bluetooth circuit 21 and calculated from the radio field intensity for descriptive purposes. The communication establishment region 1504 is a region in which the calculated distance R and the calculated angle of emission θ take values satisfying 90 cm≤R≤130 cm and 85°≤θ≤135° or a region in which the calculated distance R and the calculated angle of emission θ take values satisfying 130 cm≤R≤140 cm and 90°≤θ≤130°. This region is a region defined based on the virtual position 1401. Specifically, the communication establishment region 1504 is defined as a region which becomes "−20 cm to +20 cm" and "−48° to +2°" based on the virtual position 1401 or a region which becomes "+20 cm to +30 cm" and "−43° to −3°" based on the virtual position 1401. Here, since the distance from the physical position 1400 to the virtual position 1401 is 110 cm and the angle of the virtual position 1401 relative to the physical position 1400 is 133°, the communication establishment region 1504 becomes a region illustrated in FIG. 15B. FIG. 15B is a diagram used to explain a communication establishment region for use in a modification example of the second exemplary embodiment.

When the portable communication terminal 10 has entered the communication establishment region 1504, communication using BLE is established. Since the communication establishment region 1504 is a region which overlaps the position of the target mark 83, when the user brings the portable communication terminal 10 close to the position of the target mark 83 while carrying the portable communication terminal 10, communication in BLE is established.

In this way, using the distance information R and the angle information θ to limit a specific region to a region near the target mark 83 enables the target mark 83 for the NFC circuit 13 to be set as a guide for a BLE communication establishment position.

Figure 21E:
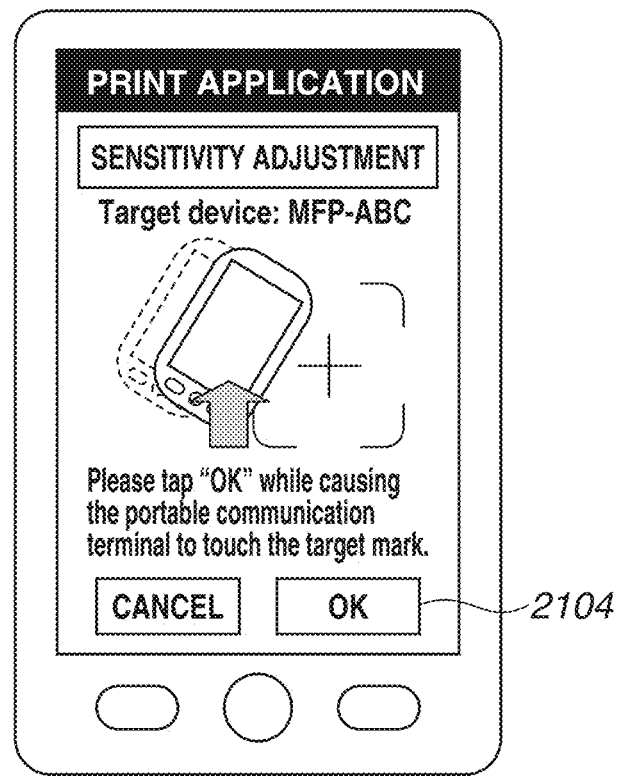

Furthermore, as explained with reference to FIG. 12, with regard to the portable communication terminal 10, which is used in user environments, an individual difference may occur in radio property. Therefore, in a case where a communication establishment region is defined based on information about a previously determined virtual position (the radio field intensity corresponding to the distance 110 cm and the angle 133°), even if the portable communication terminal 10 is brought close to the target mark 83, the portable communication terminal 10 may not be detected in a normal way. To cope with such a case, the cooperation application can be configured to allow calibration processing to be used for correction. FIG. 21E illustrates an example of a screen used to correct a distance used for the function "touch and log in". The present calibration prompts the user to bring the portable communication terminal 10 close to the target mark 83 near the virtual position 1401 and causes the user to press an OK button 2104, thus measuring the radio field intensity and the angle at that position. Then, in a case where there is a difference from the previously determined virtual position (the radio field intensity corresponding to the distance 110 cm and the angle 133°), the present calibration stores such difference information. Then, at the timing of measuring the position, the present calibration performs correction of an error using the stored difference information. Furthermore, the present calibration can directly store information about a virtual position obtained by calibration and perform measurement of the position using such information. In the second exemplary embodiment, information to be acquired by calibration includes, in addition to information about the radio field intensity, information about the angle.

Figure 21F:
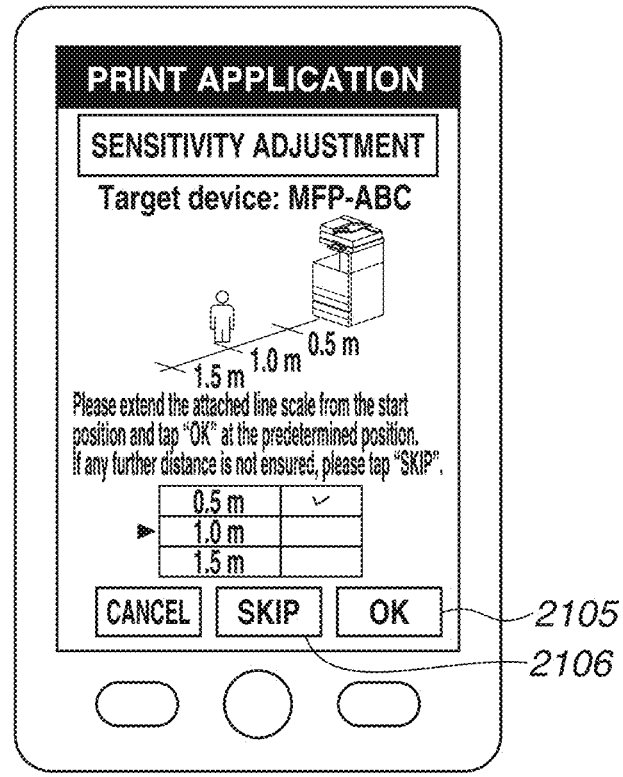

Moreover, in the case of the function "come close and log in", not only a calibration for the reference position but also a calibration for each distance can be performed. The present calibration previously provides a line scale to a main body of the image forming apparatus 20, for example, in an attached manner and causes the user to press an OK button 2105 illustrated in FIG. 21F at a predetermined position on the line scale, thus measuring the radio field intensity at such a position. Since, depending on a placement space for the image forming apparatus 20, a distance may be unable to be ensured, the radio field intensity only needs to be measured only in a region which the user is able to enter. Therefore, a skip button 2106 used for skipping unnecessary measurement is provided as illustrated in FIG. 21F. In a case where there is a difference with respect to an LUT used for conversion between the distance and the radio field intensity, the present calibration previously stores such difference information. Then, at the timing of measuring the position, the present calibration performs correction of an error using the stored difference information. Furthermore, the present calibration can directly store information about a virtual position obtained by calibration and perform measurement of the position using such information.

<Differences in Usage Sequence and Flow>

Figure 16:
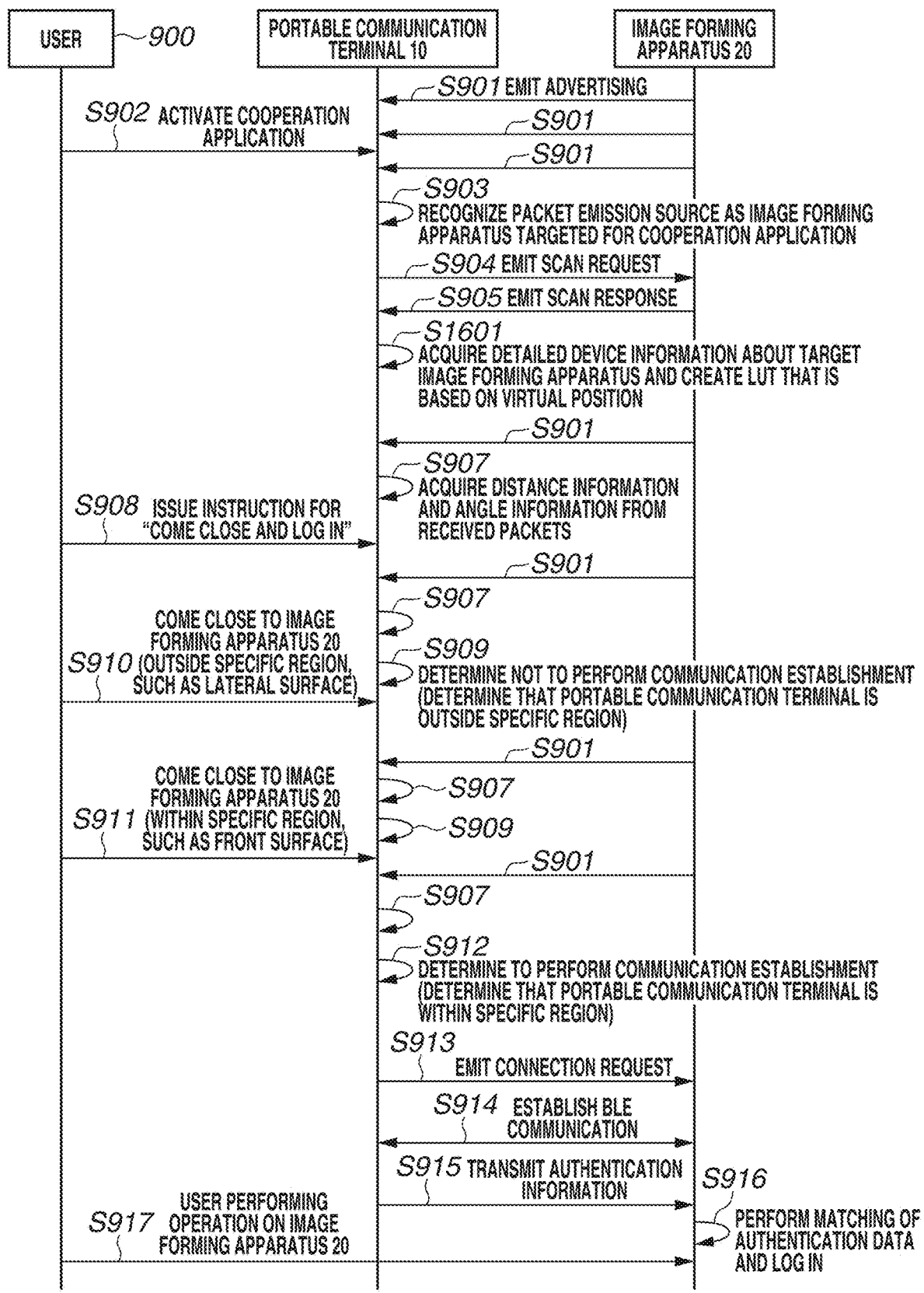
FIG. 16 is a diagram illustrating the entire flow of respective operations of the user, the portable communication terminal, and the image forming apparatus in the second exemplary embodiment.

The usage sequence and the control flow for the image forming apparatus 20 and the portable communication terminal 10 in the second exemplary embodiment are the same in content as those in the first exemplary embodiment except for characterizing portions. Therefore, here, only differences are described in detail, and the other duplicated portions are omitted from detailed description. FIG. 16 is a diagram illustrating the entire flow of respective operations of the user 900, the portable communication terminal 10, and the image forming apparatus 20 in the second exemplary embodiment.

Referring to FIG. 16, in step S901, the image forming apparatus 20 in the second exemplary embodiment continues to emit advertising packets until performing establishment of BLE communication (communication establishment) as with the first exemplary embodiment. In a state in which, in step S902, the cooperation application is activated in the portable communication terminal 10, then in step S903, the portable communication terminal 10 receives advertising packets emitted from the image forming apparatus 20. Then, in steps S904, S905, and S1601, the portable communication terminal 10 requests and acquires detailed device information from the image forming apparatus 20. In step S1601 in the second exemplary embodiment, unlike step S906, the device information to be acquired further includes information about the physical position 1400 and information about the virtual position 1401. Moreover, in step S1601, the portable communication terminal 10 creates an LUT that is based on the virtual position with use of these pieces of information and, in steps S909 and S912, the portable communication terminal 10 uses the LUT to determine whether the portable communication terminal 10 is currently present within the communication establishment region.

Figure 17B:
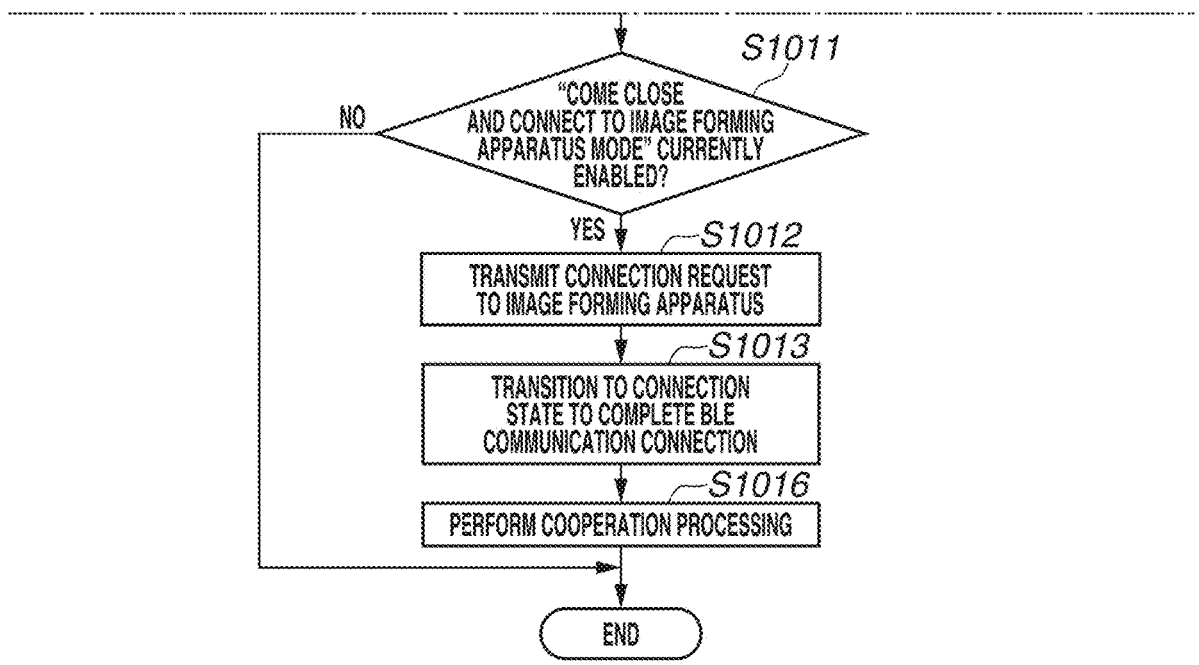
FIG. 17, which is composed of FIGS. 17A and 17B, is a flowchart illustrating processing which the portable communication terminal in the second exemplary embodiment performs.

The processing to be performed here is equivalent to processing in step S1701 illustrated in FIG. 17, which is composed of FIGS. 17A and 17B. FIG. 17 is a flowchart illustrating processing which the portable communication terminal 10 performs in the second exemplary embodiment. When acquiring the detailed device information from the image forming apparatus 20, the controller 100 of the portable communication terminal 10 further acquires information about the physical position of the Bluetooth circuit 21 and information about the virtual position thereof. Then, the controller 100 creates an LUT that is based on the virtual position with use of range information (for example, "+0 cm to +10 cm" and "−8° to +2°″") previously stored by the cooperation application, information about the physical position, and information about the virtual position. At this time, in processing in step S1105, which is performed by the image forming apparatus 20, the image forming apparatus 20 is assumed to transmit, as a response, information about the physical position and virtual position of the Bluetooth circuit 21 in addition to the device information described in the first exemplary embodiment. Then, the controller 100 stores the created LUT in the RAM 103 of the portable communication terminal 10 and, in steps S1702 and S1703, the controller 100 uses the LUT to perform determination for execution of communication establishment for BLE communication with the image forming apparatus 20. Moreover, the controller 100 can store the LUT that is based on the virtual position in the ROM 104 or the storage 105 in such a way as to enable such an LUT to be also used for later activation timing.

<Remarks>

As described above, the second exemplary embodiment determines the timing of start of communication establishment for BLE communication between the portable communication terminal 10 and the image forming apparatus 20 based on the angle of emission and radio field intensity of advertising packets which the image forming apparatus 20 emits and the LUT that is based on the virtual position. In this way, in the second exemplary embodiment, using a communication establishment region that is based on the virtual position enables using a special communication establishment region in which, if the portable communication terminal 10 comes too close to the Bluetooth circuit 21, communication establishment is not performed.

Furthermore, in the description of step S908, the function "come close and log in" is taken as an example, but can be replaced with the function "come close and connect" or "touch and log in".

Moreover, information such as range information (for example, "+0 cm to +10 cm" and "−8° to +2°″") can be not information previously stored by the cooperation application but information which is transmitted from the image forming apparatus 20 at the timing of, for example, a scan response.

A third exemplary embodiment is characterized in that the Bluetooth circuit 21 is located on the back surface side of the image forming apparatus 20 and a detection area (communication establishment region) limited in angle and distance centering on a specific position on the front surface side of the image forming apparatus 20 is used. Thus, in the third exemplary embodiment, a method in which the Bluetooth circuit 21 does not need to be located at a reference position for the detection area is described.

Furthermore, configurations and processing operations in the third exemplary embodiment are partially in common with the configurations and processing operations described in the second exemplary embodiment. Therefore, similar configurations and processing operations are assigned the respective same reference characters and the detailed description thereof is omitted here.

<Detection Area>

In the third exemplary embodiment, as with the second exemplary embodiment, the Bluetooth circuit 21 is located at a position illustrated in FIGS. 14A, 14B, and 14C. Moreover, as with the second exemplary embodiment, a communication establishment region is formed at a position away from the Bluetooth circuit 21. On the other hand, the third exemplary embodiment has a feature different from that of the second exemplary embodiment with regard to the shape of a detection area.

Figure 20A:
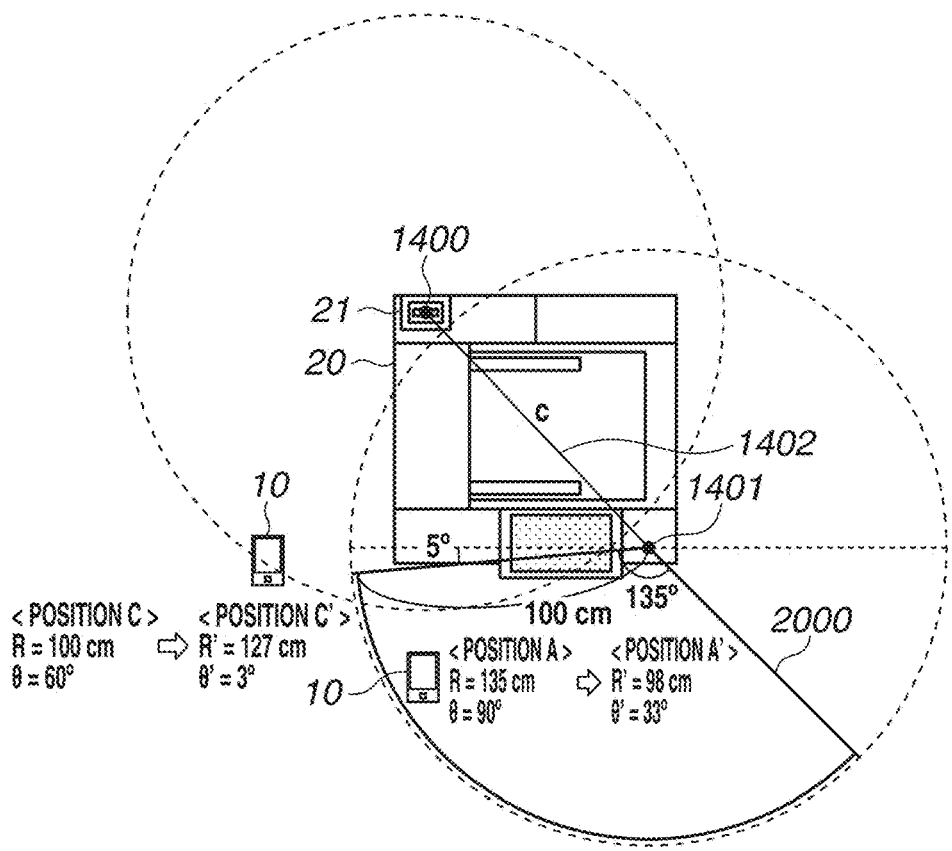
FIG. 20A is a diagram used to explain a communication establishment region in the third exemplary embodiment.

FIG. 20A is a diagram used to explain a communication establishment region in the third exemplary embodiment. The position of the Bluetooth circuit 21 in this case is assumed to be a physical position 1400, as with FIGS. 14A to 14C, and a position away from the physical position 1400 is assumed to be a virtual position 1401. In the third exemplary embodiment, a region surrounded by a sectoral solid line and centering on the virtual position 1401 serves as a communication establishment region 2000. The communication establishment region 2000 is a region of the shape similar to that of the communication establishment region 1300 described with reference to FIG. 13A.

<Calculation of Corrected Distance and Corrected Angle>

The third exemplary embodiment performs calculation for converting the distance R and the angle of emission θ centering on the physical position 1400 of the Bluetooth circuit 21 of the image forming apparatus 20 into a corrected distance R' and a corrected angle of emission θ' centering on the virtual position 1401. This conversion is assumed to be performed on the cooperation application, which the portable communication terminal 10 executes.

The corrected distance is denoted by R' and the corrected angle of emission is denoted by θ'. Then, division into cases is performed depending on the detected angle of emission θ, and the following correction conversion is performed in each case.

(In the case of 0°≤θ≤90°)

$$R' = \sqrt{R^2 + c^2 - 2*R*c*\cos(90° - \theta + B)}$$

$$\theta' = \arcsin\left(\frac{R*\sin\theta - a}{\sqrt{R^2 + c^2 - 2*R*c*\cos(90° - \theta + B)}}\right)$$

(In the case of 90°≤θ≤180°)

$$R' = \sqrt{R^2 + c^2 - 2*R*c*\cos(B - \theta + 90°)}$$

$$\theta' = \arcsin\left(\frac{R*\cos(\theta - 90°) - a}{\sqrt{R^2 + c^2 - 2*R*c*\cos(B - \theta + 90°)}}\right)$$

The corrected distance R' and the corrected angle of emission θ' are able to be expressed in the above formulae. All of the variables including, for example, the distance R, the angle of emission θ, a side "a", a side "c", and an angle B, which are used for the above calculation, are values which are acquired in a processing flow described below.

Furthermore, while, here, a trigonometric function is used as a method of converting the distance R and the angle of emission θ into the corrected distance R' and the corrected angle of emission θ', the use of a trigonometric function is merely an example, and another method can be employed as the above-mentioned method for conversion.

<Differences in Usage Sequence and Control Flow>

Figure 18:
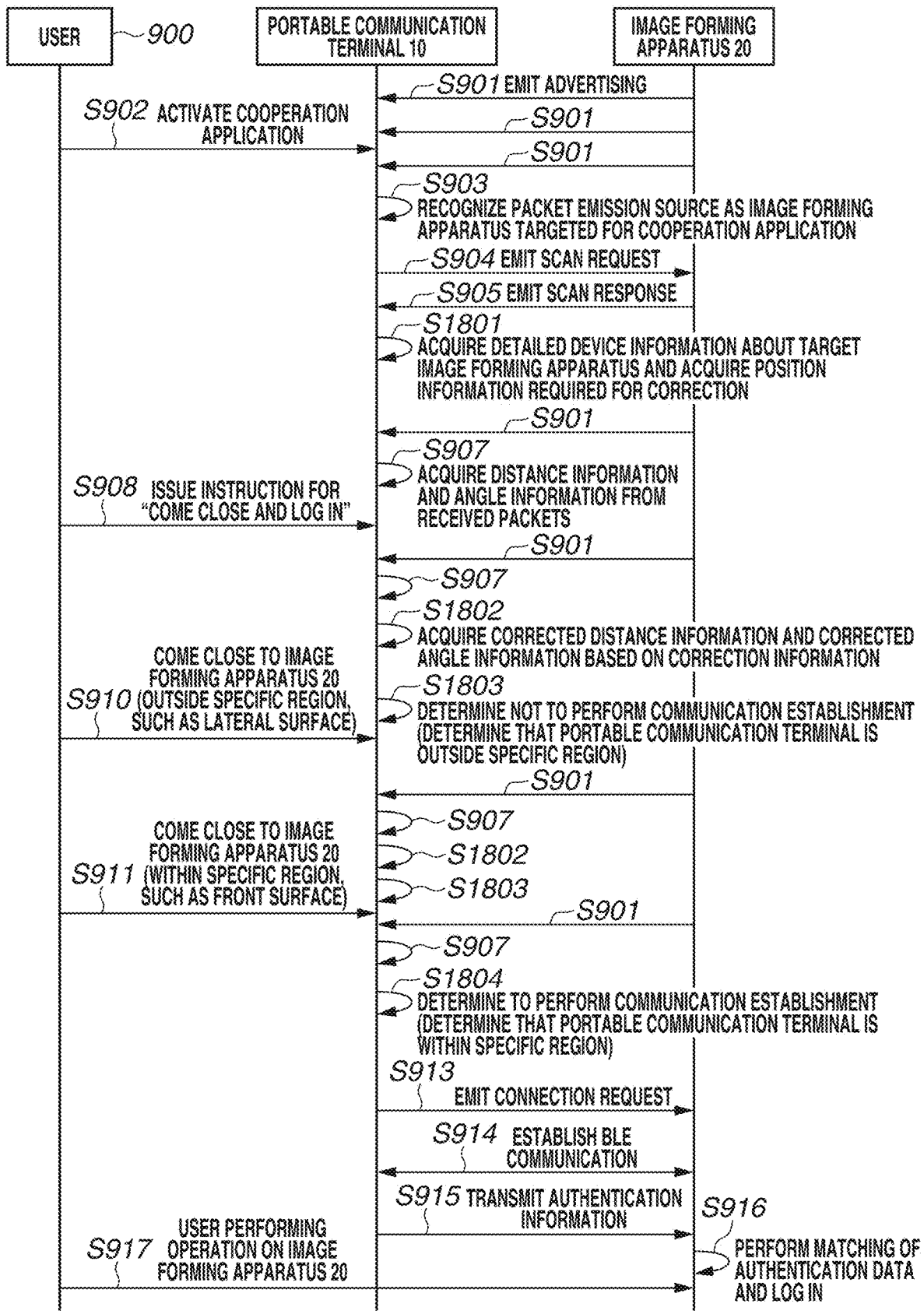
FIG. 18 is a diagram illustrating the entire flow of respective operations of the user, the portable communication terminal, and the image forming apparatus in the third exemplary embodiment.

The usage sequence and the control flow for the image forming apparatus 20 and the portable communication terminal 10 in the third exemplary embodiment are the same in content as those in the second exemplary embodiment except for characterizing portions. Therefore, here, only differences are described in detail, and the other duplicated portions are omitted from detailed description. FIG. 18 is a diagram illustrating the entire flow of respective operations of the user 900, the portable communication terminal 10, and the image forming apparatus 20 in the third exemplary embodiment.

Referring to FIG. 18, in step S901, the image forming apparatus 20 in the third exemplary embodiment continues to emit advertising packets until performing establishment of BLE communication (communication establishment) as with the first and second exemplary embodiments. In a state in which, in step S902, the cooperation application is activated in the portable communication terminal 10, then in step S903, the portable communication terminal 10 receives advertising packets emitted from the image forming apparatus 20. Then, in steps S904, S905, and S1801, the portable communication terminal 10 requests and acquires detailed device information from the image forming apparatus 20. In step S1801 in the third exemplary embodiment, unlike S906, the device information to be acquired further includes information about the physical position 1400 and information about the virtual position 1401.

Figure 19B:
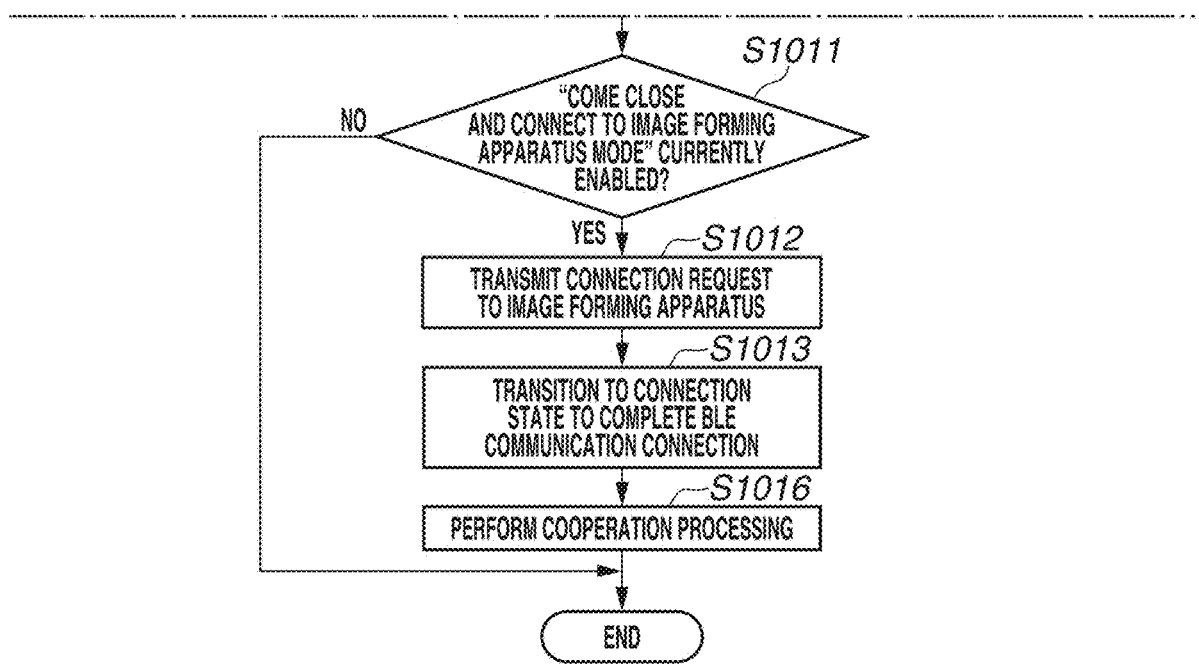
FIG. 19, which is composed of FIGS. 19A and 19B, is a flowchart illustrating processing which the portable communication terminal in the third exemplary embodiment performs.
Figure 20B:
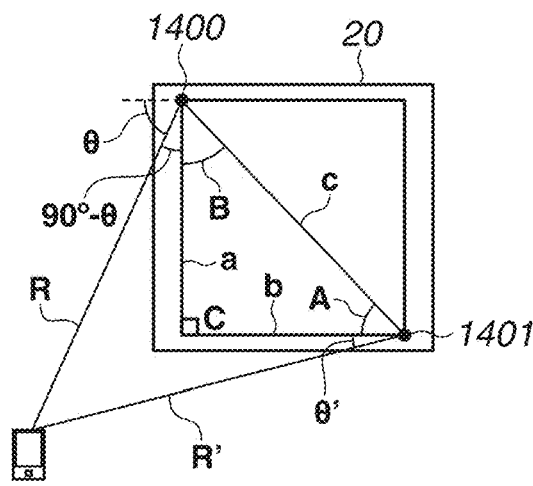
FIG. 20B is a diagram used to explain a method for calculating the communication establishment region in the third exemplary embodiment.
Figure 20C:
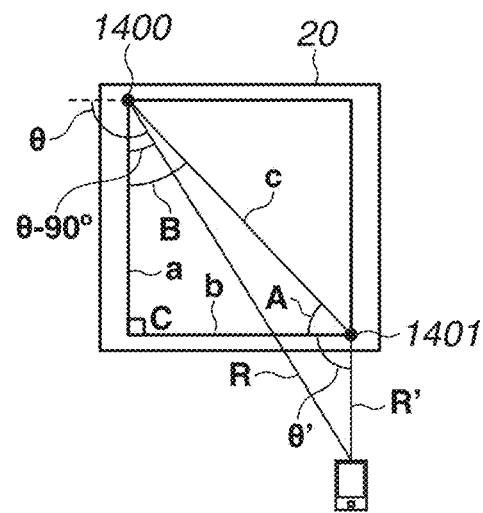
FIG. 20C is a diagram used to explain a method for calculating the communication establishment region in the third exemplary embodiment.

The processing to be performed here is equivalent to processing in step S1901 illustrated in FIG. 19, which is composed of FIGS. 19A and 19B. FIG. 19 is a flowchart illustrating processing which the portable communication terminal 10 performs in the third exemplary embodiment. In this processing, the controller 100 transmits a SCAN_REQ packet in response to the received advertising packets, thus requesting detailed information about the image forming apparatus 20. This enables the controller 100 to receive the device information. At this time, in processing in step S1105, which is performed by the image forming apparatus 20, the image forming apparatus 20 is assumed to transmit, as a response, information about the physical position 1400 and information about the virtual position 1401 included in the image forming apparatus 20 itself in addition to the device information described in the first exemplary embodiment. These pieces of information are numerical data available to express a positional relationship including sides "a", "b", and "c" and angles A, B, and C of a triangle given by the physical position 1400 and the virtual position 1401 illustrated in FIG. 20B or 20C. FIG. 20B is a diagram used to explain a method of calculating a communication establishment region in the third exemplary embodiment. FIG. 20C is also a diagram used to explain a method of calculating a communication establishment region in the third exemplary embodiment. These pieces of information are assumed to be stored in the ROM 206 or the storage 207 of the image forming apparatus 20 in advance. The controller 100 stores the device information required for the above-mentioned correction in the RAM 103 of the portable communication terminal 10 and uses such device information to perform determination for execution of communication establishment for BLE communication with the image forming apparatus 20. Moreover, the controller 100 can store such device information in the ROM 104 or the storage 105 in such a way as to enable such device information to be called up at the time of later activation. This way enables the portable communication terminal 10 to receive information about the physical position 1400 and the virtual position 1401 and use such information for correction processing with the cooperation application.

After acquiring information required for the above-mentioned calculation, then in step S907, the portable communication terminal 10 acquires distance information and angle information from the radio field intensity and the angle of emission of the received advertising packets.

When, in step S908, the user 900 selects the function "come close and log in" as a function of the cooperation application, the portable communication terminal 10 discriminates the position of the portable communication terminal 10 itself relative to the image forming apparatus 20 from distance information and angle information calculated from the advertising packets. In step S1802, the portable communication terminal 10, which has acquired distance information and angle information in step S907, calculates corrected distance information and corrected angle information based on the device information acquired in the above-mentioned way. The processing to be performed here is equivalent to processing in step S1902 illustrated in FIG. 19. In step S1902, the controller 100 performs correction processing using the distance R calculated in step S1007 and the angle of emission θ calculated in step S1008.

In step S1903, the controller 100 uses numerical values obtained by the above-mentioned correction processing to determine whether the portable communication terminal 10 has entered the predetermined region.

The region serving as threshold values used for determination is a region such as that illustrated in FIG. 20A. At this time, threshold values used for determining whether to perform communication establishment are as follows. Such threshold information is assumed to be previously stored by the cooperation application.

$$R' \leq 100 \text{ cm and } 5° \leq \theta' \leq 135°$$

For example, in a case where the portable communication terminal 10 is situated at a position C illustrated in FIG. 20A, since the corrected position obtained by the above-mentioned correction becomes R'=127 cm and θ'=3° and, therefore, the condition for the specific region is not satisfied, then in step S1803, the portable communication terminal 10 determines that the portable communication terminal 10 is outside the specific region. If the calculated corrected values are outside the range for the condition (NO in step S1903), the controller 100 returns the processing to step S1002, thus continuing the scanning state and continuing to repeat position determination.

Suppose that, after step S910, then in step S911, the user 900 moves the portable communication terminal 10 to a position close to the front surface of the image forming apparatus 20, such as a position A illustrated in FIG. 20A (as with FIG. 13A). In this case, since the Bluetooth circuit 21 is present at the physical position 1400, the position expressed by the distance R and the angle of emission θ becomes R=135 cm and θ=90°. If calculation is performed on such a position based on the above-mentioned conversion formulae, values of R'=98 cm and θ'=33° are derived. These values are similar to the values acquired at the position A illustrated in FIG. 13A.

Referring to FIG. 20A, in the position A, the corrected values indicate R'=98 cm and θ'=33°. Thus, in the position A, the condition of R'≤100 cm and 5°≤θ'≤135° is satisfied. Therefore, in step S1804, the controller 100 determines that the portable communication terminal 10 is present within the communication establishment region for communication establishment (YES in step S1903). Then, the controller 100 advances the processing to step S1011 illustrated in FIG. 19 to perform communication establishment.

Subsequent processing is equivalent to the processing illustrated in FIG. 9. In steps S913 and S914, the portable communication terminal 10 emits a connection request packet to the image forming apparatus 20 and thus establishes BLE communication. Upon establishment of BLE communication, in step S915, the portable communication terminal 10 transmits authentication information used for performing the function "come close and log in" to the image forming apparatus 20. Upon receiving the authentication information, in step S916, the image forming apparatus 20 performs matching of authentication data and, if the matching result indicates success, executes a login procedure. In step S917, the user 900, who has been logged in, is allowed to operate the image forming apparatus 20. Thus far is the entire flow in the third exemplary embodiment.

<Remarks>

As described above, the third exemplary embodiment determines the timing of start of communication establishment for BLE communication between the portable communication terminal 10 and the image forming apparatus 20 as follows. Thus, the third exemplary embodiment determines such timing based on the angle of emission and radio field intensity of advertising packets which the image forming apparatus 20 emits and the corrected distance and corrected angle which are obtained by calculation. In this way, the third exemplary embodiment is able to use, as a communication establishment region, a region which is derived by a calculation that is based on the virtual position. Accordingly, for example, even in a case where the Bluetooth circuit 21 is not located on the front surface side of the image forming apparatus 20, the third exemplary embodiment is able to detect a positional relationship between the portable communication terminal 10 and the image forming apparatus 20 as if the Bluetooth circuit 21 were located on the front surface side of the image forming apparatus 20.

In the third exemplary embodiment, a determination as to whether to perform communication establishment is performed with use of not a distance that is based on the physical position but a distance that is based on the virtual position. Therefore, even in a case where the portable communication terminal 10 is situated at the position A illustrated in FIG. 20A, communication establishment is able to be performed. The position A illustrated in FIG. 20A corresponds to a distance based on which communication establishment is not performed in the case of the distance that is based on the physical position of the Bluetooth circuit 21. However, performing correction based on the virtual position enables the position A to be treated as a target for performing communication establishment. Moreover, in a case where the portable communication terminal 10 is situated at the position C illustrated in FIG. 20A, communication establishment is not performed. The position C illustrated in FIG. 20A corresponds to a distance based on which communication establishment is performed in the case of the distance that is based on the physical position of the Bluetooth circuit 21. However, performing correction based on the virtual position enables the position C to be treated as a target for not performing communication establishment.

Furthermore, in the description of step S908, the function "come close and log in" is taken as an example, but can be replaced with the function "come close and connect" or "touch and log in".

Moreover, while the position of the portable communication terminal 10 is expressed by a positional relationship in a triangle given by the physical position 1400 and the virtual position 1401, a conceivable configuration for such expression is not limited and can be, for example, coordinates, vectors, or three-dimensionally applied values as long as those are of the data format which is able to be treated by the cooperation application.

Moreover, information such as threshold value information (for example, "R'≤100 cm and 5°≤θ'≤135°") can be not information previously stored by the cooperation application but information which is transmitted from the image forming apparatus 20 at the timing of, for example, a scan response.

The above-described first exemplary embodiment employs an angle of emission (angle of departure (AoD)) method to obtain a relative positional relationship between an image forming apparatus and a portable communication terminal. On the other hand, a fourth exemplary embodiment employs an angle or reception (angle of arrival (AoA)) method to obtain a relative positional relationship between an image forming apparatus and a portable communication terminal. Thus, the fourth exemplary embodiment is configured to receive, with a plurality of antennas of the portable communication terminal, radio waves emitted from a single antenna of the image forming apparatus and use the received radio waves to obtain the relative positional relationship.

Furthermore, configurations and processing operations in the fourth exemplary embodiment are similar to the configurations and processing operations described in the first exemplary embodiment except for those associated with the above-mentioned method. Therefore, similar configurations and processing operations are assigned the respective same reference characters and the detailed description thereof is omitted here.

<Bluetooth Circuit of Portable Communication Terminal>

The Bluetooth circuit 10011 is an antenna module unit (wireless communication interface) equipped with a controller compliant with the Bluetooth standard. The Bluetooth circuit 10011 is assumed to conform to the BLE communication method of Bluetooth 5.1 and to be compatible with the function of detecting, by BLE communication, a direction in which the image forming apparatus 20 is located. Moreover, the Bluetooth circuit 10011 includes a plurality of antennas in such a way as to be able to detect the angle of reception (direction) of radio waves emitted from the image forming apparatus 20.

FIG. 23B is a diagram illustrating a configuration of the Bluetooth circuit 10011 included in the portable communication terminal 10. The Bluetooth circuit 10011 is mounted in the portable communication terminal 10, and performs wireless communication compliant with the Bluetooth standard (mainly, concerning BLE) with the image forming apparatus 20, thus controlling inputting and outputting of data between the image forming apparatus 20 and the CPU 101. While the Bluetooth circuit 10021 includes a single antenna mounted therein, the Bluetooth circuit 10011 includes a plurality of antennas mounted therein. The Bluetooth circuit 10011 includes an IC chip 10110 and BLE antennas 115, 116, 117, and 118, which are arranged on a substrate 119. The IC chip 10110 includes functions of a host I/F control unit 111, a BLE baseband unit 112, an RF control unit 113, and an RF switch 114 in an aggregated manner.

The RF control unit 113 is configured to perform modulation and demodulation processing of radio waves for radio frequency (RF) communication to perform BLE communication with the image forming apparatus 20.

The BLE antennas 115, 116, 117, and 118 are antennas formed to perform wireless communication and are able to be used to perform communication with the image forming apparatus 20. Furthermore, each of the BLE antennas 115, 116, 117, and 118 is a pattern antenna wired in a pattern on the substrate 119, and is regulated in such a way as to have antenna characteristics available for performing BLE communication in the 2.4 GHz band.

The Bluetooth circuit 10011 is assumed to conform to the BLE communication method of Bluetooth 5.1 so as to support a function for detecting a direction in which the image forming apparatus 20 is situated.

<Bluetooth Circuit of Image Forming Apparatus>

The Bluetooth circuit 10021 is an antenna module unit (wireless communication interface) equipped with a controller compliant with the Bluetooth standard. The Bluetooth circuit 10021 is assumed to perform communication in conformance with the IEEE 802.15 standard and to be compatible with the BLE communication method of Bluetooth 5.1. The Bluetooth circuit 10021 includes a single antenna.

FIG. 23A is a diagram illustrating a configuration of the Bluetooth circuit 10021 included in the image forming apparatus 20. The Bluetooth circuit 10021 is mounted in the image forming apparatus 20, and performs wireless communication conforming to the Bluetooth standard (mainly, concerning BLE) with the portable communication terminal 10, thus controlling inputting and outputting of data between the portable communication terminal 10 and the main SoC 201. As mentioned above, the Bluetooth circuit 10021 conforms to a BLE communication method of Bluetooth 5.1. The Bluetooth circuit 10021 includes an integrated circuit (IC) chip 10051 and a BLE antenna 46, which are arranged on a substrate 49. Furthermore, while, in FIG. 23A, the antenna is illustrated as a trident, this is an expression of expediency for distinction from a solid line in the figure, and the actual shape of the antenna does not need to be a trident. The IC chip 10051 includes functions of a host interface (I/F) control unit 41, a BLE baseband unit 42, and a radio frequency (RF) control unit 43 in an aggregated manner.

<Antenna and Shield>

Next, a relationship between the antenna of the Bluetooth circuit 10021 and a shield is described. As mentioned above, the Bluetooth circuit 10021 includes a single antenna. As illustrated in FIG. 24A, the BLE antenna 46 is formed in pattern wiring on the substrate 49. FIG. 24A is a diagram illustrating a front surface of the Bluetooth circuit board. FIG. 24B is a diagram illustrating an upper surface of the Bluetooth circuit board. FIG. 24C is a diagram illustrating a back surface of the Bluetooth circuit board. FIG. 24D is a diagram used to explain a relationship between radio waves and a shield.

In this way, a mechanism for performing direction detection (described below in detail) compliant with the Bluetooth standard with use of a single antenna is provided. The BLE antenna 46 is connected to the IC chip 10051. Moreover, on the substrate 49 of the Bluetooth circuit 10021, there is provided a connector 52 which is connectable to the controller 200 with a cable 80 (see FIG. 8B) for interface connection with the controller 200. The connector 52 is connected to the host I/F control unit 41 of the IC chip 10051.

Moreover, the metallic plate 55 functions as a shield member which shields radio waves emitted from the BLE antenna 46.

<Communication Establishment Processing>

Communication establishment processing is approximately the same as the content described in the first exemplary embodiment with reference to FIG. 7. However, in the fourth exemplary embodiment, processing in step S701 refers to one set of processing for receiving the respective packets by the BLE antennas 115, 116, 117, and 118. This also applies to steps S702, S705, S706, and S707 described below.

Moreover, in the fourth exemplary embodiment, the scan response which the portable communication terminal 10 receives in step S704 does not include information about an interval between a plurality of antennas.

When being in a scanning state 70, the portable communication terminal 10 is able to acquire an angle of emission θ by calculating a direction from advertising packets emitted from the image forming apparatus 20.

<Direction Detection>

Figure 25:
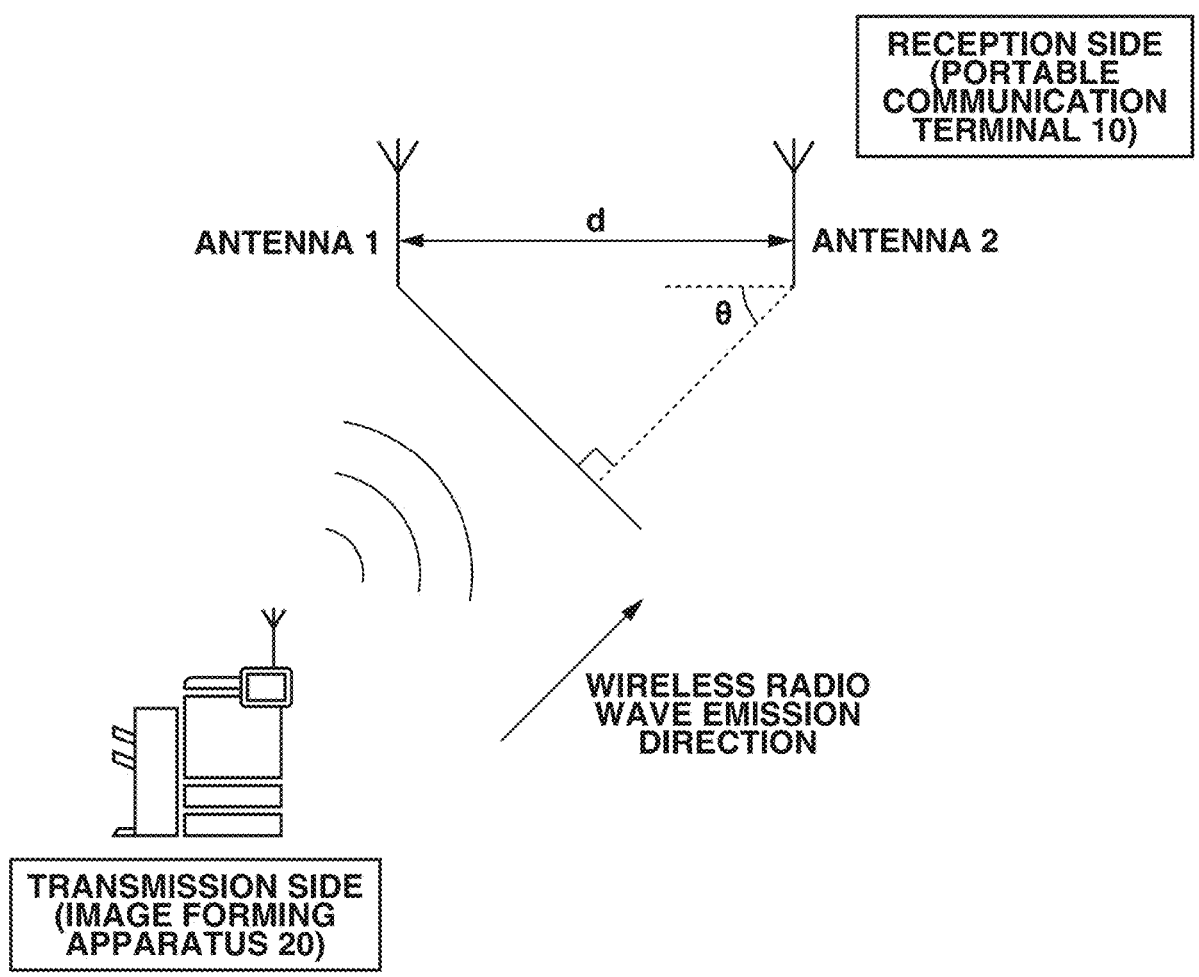
FIG. 25 is a diagram used to explain direction detection which is performed with use of BLE.

Next, a method for direction detection using a plurality of antennas is described. A method of detecting a direction by causing a transmission side including a single antenna to emit radio waves for BLE communication and causing a reception side including a plurality of antennas to receive radio waves for BLE communication is described with reference to FIG. 25. FIG. 25 is a diagram used to explain direction detection using BLE. In FIG. 25, the transmission side for radio waves is equivalent to the Bluetooth circuit 10021 of the image forming apparatus 20, and the reception side for radio waves is equivalent to the Bluetooth circuit 10011 of the portable communication terminal 10. The present method is a method of detecting an angle of reception called an angle of arrival (AoA) or a direction of arrival (DoA), in which a positional relationship between two apparatuses is expressed by the angle of reception θ. While, in the Bluetooth circuit 10011, four antennas are used, for ease of explanation, here, for descriptive purposes, description is performed with use of two antennas, i.e., an antenna 1 and an antenna 2.

First, as a premise, the image forming apparatus 20 serving as the transmission side is assumed to periodically emit advertising packets (advertisement packets). Then, radio waves emitted from the image forming apparatus 20 come to arrive at the portable communication terminal 10 serving as the reception side.

At the reception side, with two antennas, i.e., the antenna 1 and the antenna 2, focused on, the distance taken for a radio wave emitted from the transmission side to arrive at the antenna 1 is different from the distance taken for a radio wave emitted from the transmission side to arrive at the antenna 2. Accordingly, as a result, a very slight difference occurs between a time required for a wireless radio wave transmitted from the transmission to arrive at the antenna 1 and a time required for a wireless radio wave transmitted from the transmission to arrive at the antenna 2. This very slight difference in time is able to be detected as a phase difference occurring when the respective antennas of the portable communication terminal 10 have received radio waves.

Here, the interval between the antenna 1 and the antenna 2 is denoted by d, the angle of reception of a wireless radio wave received by the antenna 1 or the antenna 2 is denoted by θ, and the wavelength of the radio wave is denoted by λ. In this instance, when the above-mentioned phase difference is denoted by φ, the following relationship holds.

$$\varphi = (2\pi d \ast \cos(\theta))/\lambda$$

Accordingly, the angle of reception θ of a radio wave is calculated as shown below.

$$\theta = \arccos((\varphi\lambda)/(2\pi d))$$

As just described, if radio waves emitted from a single antenna are received by a plurality of antennas and a phase difference between the received plurality of radio waves is able to be accurately detected, a positional relationship between the transmission side and the reception side for radio waves is able to be calculated as the angle of reception θ. Furthermore, to calculate an accurate phase difference, it is desirable that the antenna 1 and the antenna 2 have equivalent radio properties. Therefore, as mentioned above, the BLE antennas 115, 116, 117, and 118 are configured to have equivalent radio properties. Moreover, to calculate an accurate phase difference, it is desirable that a radio wave emitted from a single antenna of the image forming apparatus 20 be direct waves which linearly come through the same propagation path to arrival at a plurality of antennas of the portable communication terminal 10.

Such direct waves, which have arrived at the portable communication terminal 10, are received by the respective BLE antennas 115, 116, 117, and 118. Then, signals that are based on the radio waves received by the BLE antennas 115, 116, 117, and 118 are sequentially input to the IC chip 10110 by the RF switch 114, which is sequentially switched between contacts "a" to "d".

As mentioned above, a phase difference is able to be obtained from a plurality of radio waves, and the angle of reception is able to be calculated from the obtained phase difference. Accordingly, the portable communication terminal 10 is able to detect, with the Bluetooth circuit 10011, a direction in which the image forming apparatus 20 is situated as the angle of reception θ of a wireless radio wave.

Furthermore, to perform the above-mentioned calculation, the interval d between the antenna 1 and the antenna 2 serving as the reception side and the wavelength λ of a wireless radio wave are required. Accordingly, in a case where the portable communication terminal 10 is configured to calculate the angle of reception, the portable communication terminal 10 is required to acquire these parameters in advance. For example, information about the wavelength λ can be acquired from an advertising packet (or a response to a scan request) emitted from the image forming apparatus 20. Furthermore, information about the interval d is information concerning the inside of the portable communication terminal 10 and, therefore, can also be previously stored.

The subsequent description is performed on the premise that the angle of reception θ is able to be acquired. Moreover, calculation of the angle of reception is assumed to be performed by the RF control unit 113 included in the IC chip 10110 based on the specifications of the Bluetooth standard. Accordingly, the controller 100 only needs to acquire information about the angle of reception which is output from the Bluetooth circuit 10011. Furthermore, the angle of reception θ can also be calculated by the controller 100.

<Antenna Arrangement>

The fourth exemplary embodiment is configured to locate the Bluetooth circuit 10021 in a region on the front surface near the operation panel 26, in a similar way to that illustrated in FIGS. 8A and 8B in the first exemplary embodiment.

<Detection Area>

The fourth exemplary embodiment is configured to use the communication establishment region 1300 illustrated in FIG. 13A as with the first exemplary embodiment.

<Usage Sequence>

The fourth exemplary embodiment is configured to determine the necessity or unnecessity of communication establishment for the functions "come close and log in", "come close and connect", and "touch and log in" based on a relative positional relationship between the image forming apparatus 20 and the portable communication terminal 10 as with the first exemplary embodiment. However, angle information which is used in the fourth exemplary embodiment is assumed to be based on the angle of arrival (AoA) method.

<Control Flow for Image Forming Apparatus>

In the fourth exemplary embodiment, the image forming apparatus 20 is controlled in a similar way to that illustrated in FIG. 11 in the first exemplary embodiment. However, data of SCAN_RESP does not include information about the distance d between a plurality of antennas.

<Control Flow for Portable Communication Terminal>

In the fourth exemplary embodiment, the portable communication terminal 10 is controlled in a similar way to that illustrated in FIG. 10 in the first exemplary embodiment. However, angle information which is used in the fourth exemplary embodiment is assumed to be based on the angle of arrival (AoA) method. Therefore, while, in the first exemplary embodiment, in step S1008, the controller 100 "acquires and stores 'angle information' calculated from phase data obtained before and after the received advertising packets and antenna information", in the fourth exemplary embodiment, the controller 100 "acquires and stores 'angle information' calculated from phase data about advertising packets received by the respective antennas of the portable communication terminal and antenna information".

The above-described second exemplary embodiment employs an angle of emission (angle of departure (AoD)) method to obtain a relative positional relationship between an image forming apparatus and a portable communication terminal. On the other hand, a fifth exemplary embodiment employs an angle or reception (angle of arrival (AoA)) method to obtain a relative positional relationship between an image forming apparatus and a portable communication terminal. Thus, the fifth exemplary embodiment is configured to receive, with a plurality of antennas of the portable communication terminal, radio waves emitted from a single antenna of the image forming apparatus and use the received radio waves to obtain the relative positional relationship.

Furthermore, basic configurations and processing operations in the fifth exemplary embodiment are similar to the configurations and processing operations described in the second exemplary embodiment, and processing operations and configurations concerning the above-mentioned method are similar to those in the fourth exemplary embodiment. Therefore, similar configurations and processing operations are assigned the respective same reference characters and the detailed description thereof is omitted here.

<Antenna Arrangement>

In the fifth exemplary embodiment, the Bluetooth circuit 10021 is located at the position illustrated in FIGS. 14A, 14B, and 14C as with the second exemplary embodiment. Thus, the Bluetooth circuit 10021 is located at a position near the back surface side of the image forming apparatus 20. This position is referred to a "physical position 1400".

On the other hand, the fifth exemplary embodiment performs control such that the center of a specific region based on which to perform communication establishment for BLE communication is set to a position near the front surface side of the image forming apparatus 20. This position is referred to a "virtual position 1401". The physical position 1400 and the virtual position 1401 are arranged in a positional relationship expressed by a width across corners 1402.

<Detection Area>

The fifth exemplary embodiment, as with the second exemplary embodiment, uses a distance R detected by the radio field intensity and the angle of reception θ detected by direction detection, which are calculated centering on the physical position 1400 of the Bluetooth circuit 10021 of the image forming apparatus 20. The fifth exemplary embodiment uses an LUT and threshold value information associated with a communication establishment region centering on the virtual position 1401.

<Usage Sequence>

The fifth exemplary embodiment is configured to determine the necessity or unnecessity of communication establishment for, for example, the functions "come close and log in", "come close and connect", and "touch and log in" based on a relative positional relationship between the image forming apparatus 20 and the portable communication terminal 10 as with the second exemplary embodiment. However, angle information which is used in the fifth exemplary embodiment is assumed to be based on the angle of arrival (AoA) method.

<Control Flow for Portable Communication Terminal>

In the fifth exemplary embodiment, the portable communication terminal 10 is controlled in a similar way to that illustrated in FIG. 17 in the second exemplary embodiment. However, angle information which is used in the fifth exemplary embodiment is assumed to be based on the angle of arrival (AoA) method. Therefore, while, in the second exemplary embodiment, in step S1008, the controller 100 "acquires and stores 'angle information' calculated from phase data obtained before and after the received advertising packets and antenna information", in the fifth exemplary embodiment, the controller 100 "acquires and stores 'angle information' calculated from phase data about advertising packets received by the respective antennas of the portable communication terminal and antenna information".

The above-described third exemplary embodiment employs an angle of emission (angle of departure (AoD)) method to obtain a relative positional relationship between an image forming apparatus and a portable communication terminal. On the other hand, a sixth exemplary embodiment employs an angle or reception (angle of arrival (AoA)) method to obtain a relative positional relationship between an image forming apparatus and a portable communication terminal. Thus, the sixth exemplary embodiment is configured to receive, with a plurality of antennas of the portable communication terminal, radio waves emitted from a single antenna of the image forming apparatus and use the received radio waves to obtain the relative positional relationship.

Furthermore, basic configurations and processing operations in the sixth exemplary embodiment are similar to the configurations and processing operations described in the third exemplary embodiment, and processing operations and configurations concerning the above-mentioned method are similar to those in the fourth exemplary embodiment. Therefore, similar configurations and processing operations are assigned the respective same reference characters and the detailed description thereof is omitted here.

<Detection Area>

The sixth exemplary embodiment is configured to perform communication establishment with use of the communication establishment region 2000 illustrated in FIG. 20A, as described in the third exemplary embodiment.

<Calculation of Corrected Distance and Corrected Angle>

The sixth exemplary embodiment performs calculation for converting the distance R and the angle of reception θ centering on the physical position 1400 of the Bluetooth circuit 10021 of the image forming apparatus 20 into a corrected distance R' and a corrected angle of reception θ' centering on the virtual position 1401. This conversion is assumed to be performed on the cooperation application, which the portable communication terminal 10 executes. The corrected distance is denoted by R' and the corrected angle of reception is denoted by θ'. However, angle information which is used in the sixth exemplary embodiment is assumed to be based on the angle of arrival (AoA) method.

<Usage Sequence>

The sixth exemplary embodiment is configured to determine the necessity or unnecessity of communication establishment for, for example, the functions "come close and log in", "come close and connect", and "touch and log in" based on a relative positional relationship between the image forming apparatus 20 and the portable communication terminal 10 as with the third exemplary embodiment. However, angle information which is used in the sixth exemplary embodiment is assumed to be based on the angle of arrival (AoA) method.

<Control Flow for Portable Communication Terminal>

In the sixth exemplary embodiment, the portable communication terminal 10 is controlled in a similar way to that illustrated in FIG. 19 in the third exemplary embodiment. However, angle information which is used in the sixth exemplary embodiment is assumed to be based on the angle of arrival (AoA) method. Therefore, while, in the third exemplary embodiment, in step S1008, the controller 100 "acquires and stores 'angle information' calculated from phase data obtained before and after the received advertising packets and antenna information", in the sixth exemplary embodiment, the controller 100 "acquires and stores 'angle information' calculated from phase data about advertising packets received by the respective antennas of the portable communication terminal and antenna information".

The present disclosure is not limited to the above-described exemplary embodiments and can be modified in various manners (including an organic combination of some of the above-described exemplary embodiments) based on the gist of the present disclosure, so that variations or modifications thereof are not intended to be excluded from the scope of the present disclosure. Thus, configurations obtained by combining each of the above-described exemplary embodiments and a modification example thereof are also included in the present disclosure.

Embodiments of the present disclosure can also be implemented by performing processing for supplying a program for implementing one or more functions of the above-described exemplary embodiments to a system or apparatus via a network or a storage medium and causing one or more processors in a computer of the system or apparatus to read out and execute the program. Moreover, embodiments of the present disclosure can also be implemented by a circuit which implements the above-mentioned one or more functions (for example, an application specific integrated circuit (ASIC)).

Figure 13B:
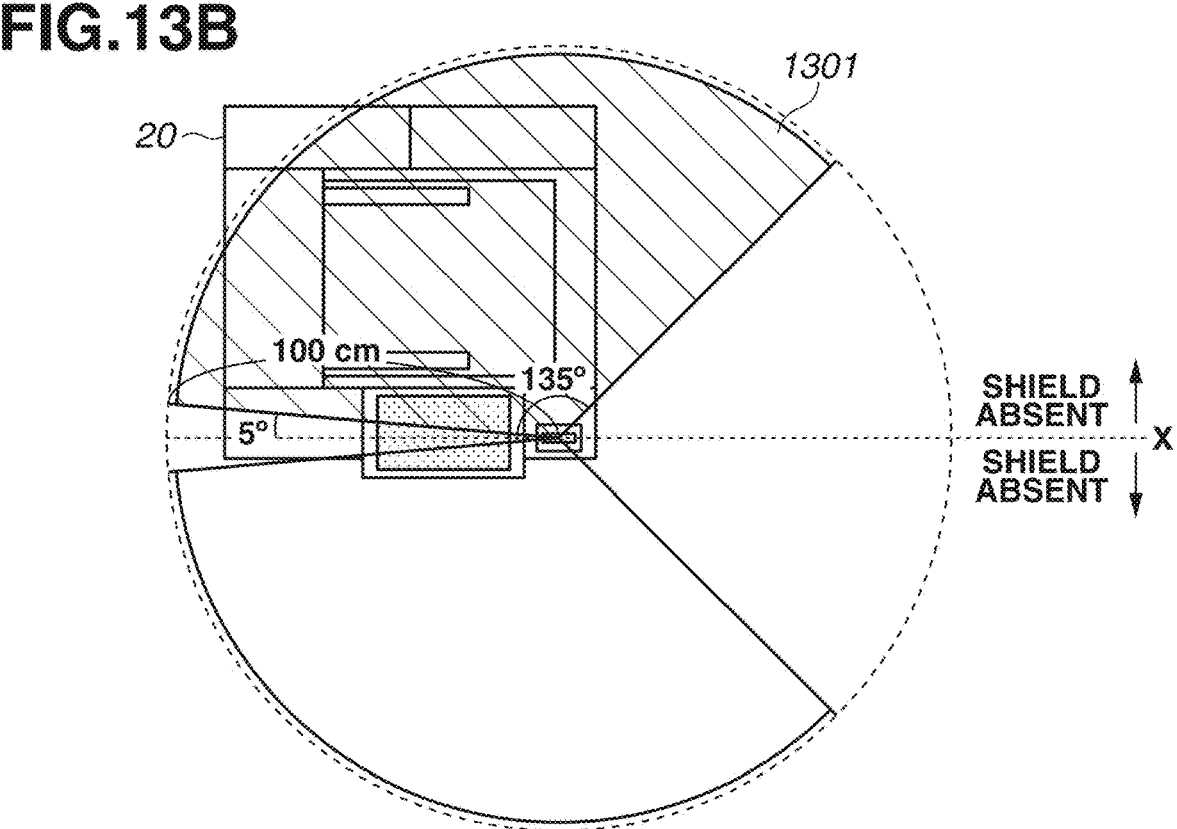
FIG. 13B is a diagram used to explain a communication establishment region formed in a mirror arrangement.

The first to third exemplary embodiments are premised on a configuration in which, as described with reference to FIG. 5C, the back surface of the substrate 49 is covered with the metallic plate 55. If the metallic plate 55 is configured not to cover the arrangement range of antennas, a different communication establishment region would be formed. The manner in which such a different communication establishment region is formed is illustrated in FIG. 13B. FIG. 13B is a diagram illustrating a communication establishment region formed in a mirror arrangement. Referring to FIG. 13B, in addition to the communication establishment region 1300, a sectoral communication establishment region 1301, which is indicated by hatched lines, is formed. The communication establishment region 1301 is formed at a position in a mirror arrangement to the communication establishment region 1300 with respect to a virtual line X parallel to the arrangement direction of antennas ($-135°≤θ≤-5°$). This is the result of radio waves which travel toward the back surface side of the substrate 49, including radio waves indicated by arrows 60 illustrated in FIG. 5D, spreading circumferentially. In the first to third exemplary embodiments, preventing or reducing the occurrence of such a communication establishment region in a mirror arrangement enables accurately implementing a communication establishment that is based on a detection area. However, such a configuration is not essential. For example, most of the communication establishment region 1301 is on the main body of the image forming apparatus 20 and is, therefore, not a region which the user may enter. Therefore, if the communication establishment region 1301 is considered to be ignorable, the back surface side of the substrate 49 does not need to be covered with the metallic plate 55.

While, in the first to third exemplary embodiments, an example in which information about the wavelength λ of a wireless radio wave is included in a scan response has been described, since this value is able to be acquired from frequency information about advertising packets, information about the wavelength λ does not necessarily need to be included in a scan response.

In the first to third exemplary embodiments, a case where, if a result of determining that the portable communication terminal 10 has entered a communication establishment region has been obtained at least once, communication establishment processing for BLE communication is proceeded with has been described. However, communication establishment processing for BLE communication can be proceeded with based on a plurality of results of determination. For example, a configuration of determining a direction of movement of the user carrying the portable communication terminal 10 based on a plurality of results of determination and proceeding with communication establishment processing for BLE communication based on the determined direction of movement being toward the image forming apparatus 20 can be employed.

Figure 22:
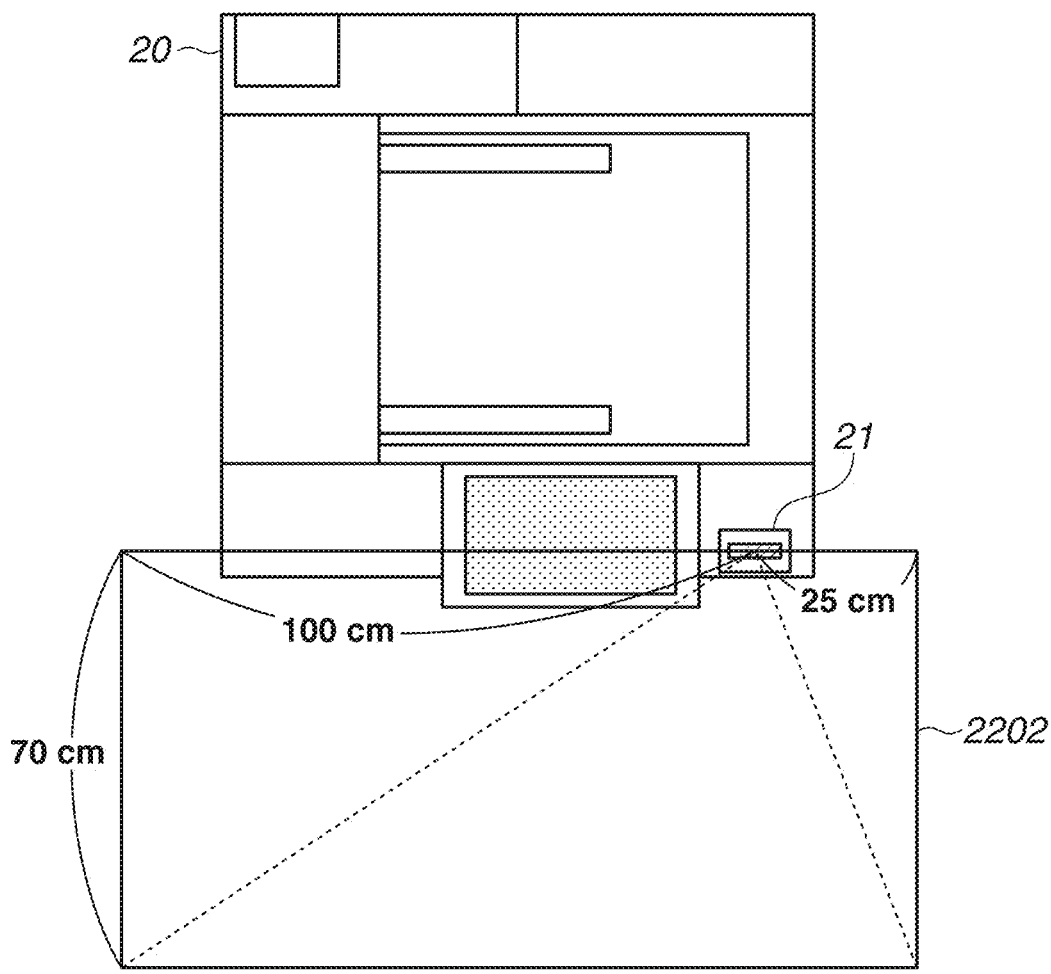
FIG. 22 is a diagram used to explain a communication establishment region in a further exemplary embodiment.

In the third exemplary embodiment, an example in which a communication establishment region determined by a calculation that is based on the virtual position is used has been described. Such a communication establishment region determined by the calculation can be applied to an area that is based on the physical position of the Bluetooth circuit 21. For example, as illustrated in FIG. 22, a condition can be set in such a manner that the communication establishment region becomes a square-shaped region 2202. FIG. 22 is a diagram illustrating a communication establishment region in a further exemplary embodiment. Such an anteriorly square-shaped region is effective, for example, in an environment in which a plurality of image forming apparatuses is laterally arranged side by side.

In the first to third exemplary embodiments, device information about the image forming apparatus 20 is treated as information included in a scan response. For example, device information (simplified), data for discriminating a device, such as an address or a universally unique identifier (UUID), a received signal strength indication (RSSI), and Tx power level are included in an advertising packet, and device information (detailed), machine model particulars, a function supported by an application, data specific in an application, the interval d between a plurality of antennas, the wavelength λ, of a wireless radio wave, and an advertising transmission interval are included in a scan response. However, if there is no problem in transfer capacity, a part or the whole of device information to be transmitted with a scan response can be included in an advertising packet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-232163, filed Dec. 23, 2019, No. 2019-236838, filed Dec. 26, 2019, and No. 2020-168733, filed Oct. 5, 2020, which are hereby incorporated by reference herein in their entirety.

What is claimed is:

1. A communication system including a communication apparatus and a communication terminal which are able to perform wireless communication with each other,
the communication apparatus comprising:
a first wireless communication interface conforming to a Bluetooth standard and including a substrate having a plurality of antennas on one surface side, and
the communication terminal comprising:
a second wireless communication interface conforming to the Bluetooth standard; and
one or more controllers configured to:
acquire angle information and radio field intensity information based on a result of a plurality of radio waves respectively emitted from the plurality of antennas having been received by the second wireless communication interface; and
in response to the angle information and the radio field intensity information having satisfied a predetermined condition, transmit a request for establishment of wireless communication conforming to the Bluetooth standard to the first wireless communication interface via the second wireless communication interface,
wherein the substrate is positioned so that the one surface side faces forward of the communication apparatus and another surface side faces a shield member for blocking a radio wave.

2. The communication system according to claim 1, wherein at least one radio wave which the first wireless communication interface emits includes information about any one of an address and a universally unique identifier (UUID) for discriminating the communication apparatus.

3. The communication system according to claim 1, wherein the one or more controllers included in the communication terminal are further configured to acquire distance information based on the radio field intensity information.

4. The communication system according to claim 1, wherein at least one radio wave which the first wireless communication interface emits includes information indicating the predetermined condition.

5. The communication system according to claim 1, wherein information indicating the predetermined condition is information indicating an area based on which to start establishment of connection.

6. The communication system according to claim 1, wherein at least one radio wave which the first wireless communication interface emits includes position information concerning positions of the plurality of antennas and a position serving as a reference for an area based on which to start establishment of connection.

7. The communication system according to claim 6, wherein the one or more controllers included in the communication terminal are further configured to acquire, based on the radio field intensity information, the angle information, and the position information, distance information and angle information that are based on the position serving as the reference.

8. The communication system according to claim 1, wherein the plurality of antennas is arranged side by side.

9. The communication system according to claim 1, wherein the other surface side is a surface side opposite to the position serving as the reference.

10. The communication system according to claim 6, wherein a member including a target mark is mounted near the position serving as the reference.

11. The communication system according to claim 10, wherein the communication apparatus further comprises a near field communication (NFC) unit configured to perform NFC communication, and
wherein the NFC unit is mounted near the member including the target mark.

12. The communication system according to claim 1, wherein the communication terminal transmits user authentication information to the communication apparatus via the established wireless communication.

13. The communication system according to claim 1, wherein the plurality of antennas includes four antennas.

14. The communication system according to claim 1,
wherein the communication apparatus further comprises a third wireless communication interface conforming to a Wi-Fi standard,
wherein the communication terminal further comprises a fourth wireless communication interface conforming to the Wi-Fi standard, and
wherein the communication terminal transmits information used for connecting the third wireless communication interface and the fourth wireless communication interface to each other to the communication apparatus via the established wireless communication.

15. The communication system according to claim 14, wherein the communication terminal transmits print data to the communication apparatus after connection between the third wireless communication interface and the fourth wireless communication interface is established.

16. The communication system according to claim 14,
wherein the communication apparatus further comprises a reading device configured to read an image on an original, and
wherein the communication apparatus transmits the image read by the reading device to the communication terminal after connection between the third wireless communication interface and the fourth wireless communication interface is established.

17. The communication system according to claim 14, wherein the communication terminal retains calibration information.

18. The communication system according to claim 1, wherein the shield member is configured to block the communication terminal positioned in a rear side area of the communication apparatus from communicating with the communication apparatus.

19. A communication terminal capable of performing wireless communication with a communication apparatus including a first wireless communication interface conforming to a Bluetooth standard and including a substrate having a plurality of antennas on one surface side, the communication terminal comprising:

a second wireless communication interface conforming to the Bluetooth standard; and one or more controllers configured to:
acquire angle information and radio field intensity information based on a result of a plurality of radio waves respectively emitted from the plurality of antennas having been received by the second wireless communication interface; and
in response to the angle information and the radio field intensity information having satisfied a predetermined condition, transmit a request for establishment of wireless communication conforming to the Bluetooth standard to the first wireless communication interface via the second wireless communication interface, wherein the substrate is positioned so that the one surface side faces forward of the communication apparatus and another surface side faces a shield member for blocking a radio wave.

20. A control method for a communication terminal capable of performing wireless communication with a communication apparatus including a first wireless communication interface conforming to a Bluetooth standard and including a substrate having a plurality of antennas on one surface side, the communication terminal including a second wireless communication interface conforming to the Bluetooth standard, the control method comprising:

acquiring angle information and radio field intensity information based on a result of a plurality of radio waves respectively emitted from the plurality of antennas having been received by the second wireless communication interface; and in response to the angle information and the radio field intensity information having satisfied a predetermined condition, transmitting a request for establishment of wireless communication conforming to the Bluetooth standard to the first wireless communication interface via the second wireless communication interface, wherein the substrate is positioned so that the one surface side faces forward of the communication apparatus and another surface side faces a shield member for blocking a radio wave.

* * * * *